US011060704B2

(12) United States Patent
Hines

(10) Patent No.: US 11,060,704 B2
(45) Date of Patent: Jul. 13, 2021

(54) ELECTRONIC DEVICE MOUNT WITH EXTENDABLE ARMS FIXED BY A MAGNET FOR LIGHT FIXTURES

(71) Applicant: Robert Hines, Irvine, CA (US)

(72) Inventor: Robert Hines, Irvine, CA (US)

(*) Notice: Subject to any disclaimer, the term of this patent is extended or adjusted under 35 U.S.C. 154(b) by 724 days.

(21) Appl. No.: 15/751,162

(22) PCT Filed: Aug. 12, 2016

(86) PCT No.: PCT/US2016/046922
§ 371 (c)(1),
(2) Date: Feb. 7, 2018

(87) PCT Pub. No.: WO2017/027859
PCT Pub. Date: Feb. 16, 2017

(65) Prior Publication Data

US 2018/0231220 A1 Aug. 16, 2018

Related U.S. Application Data

(60) Provisional application No. 62/216,554, filed on Sep. 10, 2015, provisional application No. 62/204,824, filed on Aug. 13, 2015.

(51) Int. Cl.
*F21V 21/096* (2006.01)
*F16M 11/26* (2006.01)
(Continued)

(52) U.S. Cl.
CPC .............. *F21V 19/003* (2013.01); *F21K 9/23* (2016.08); *F21S 8/02* (2013.01); *F21V 19/02* (2013.01);
(Continued)

(58) Field of Classification Search
CPC ............... F21V 19/003; F21V 19/0035; F21V 19/0045; F21V 21/096; F21V 21/22; F21V 21/34; F21V 21/35; F16M 11/26
See application file for complete search history.

(56) References Cited

U.S. PATENT DOCUMENTS

| | | | | |
|---|---|---|---|---|
| 825,182 A * | 7/1906 | Bonnella | F21S 6/001 | 439/124 |
| 1,145,383 A * | 7/1915 | McWilliams | F21V 17/00 | 362/408 |

(Continued)

FOREIGN PATENT DOCUMENTS

| | | |
|---|---|---|
| CN | 201709677 U | 1/2011 |
| JP | 2014-220178 | 11/2014 |

OTHER PUBLICATIONS

Byun, Sung Cheal; "International Search Report"; dated Dec. 16, 2016; International Application No. PCT/US2016/046922; 2 pages.

(Continued)

*Primary Examiner* — Ismael Negron
(74) *Attorney, Agent, or Firm* — Alford Law Group, Inc.

(57) ABSTRACT

A mounting system, for use in securing an electronic device to a recessed light fixture, includes a top hub with an electrical connector, a central hub with a magnet, a bottom hub configured to receive the electronic device, an upper mounting arm coupling the top hub to the central hub, and a lower mounting arm coupling the bottom hub to the central hub and configured to slide through the central hub to adjust the position of the bottom hub relative to the central hub. The magnet is configured to apply force to at least one of the upper and lower mounting arms to fix a position of the bottom hub with respect to the central hub.

20 Claims, 59 Drawing Sheets

(51) Int. Cl.

| | |
|---|---|
| ***F21V 19/00*** | (2006.01) |
| ***F21S 8/02*** | (2006.01) |
| ***F21V 19/02*** | (2006.01) |
| ***F21K 9/23*** | (2016.01) |
| ***F21V 23/06*** | (2006.01) |
| *F21Y 115/10* | (2016.01) |
| *F21Y 105/18* | (2016.01) |

(52) U.S. Cl.

CPC ........... *F21V 23/06* (2013.01); *F21Y 2105/18* (2016.08); *F21Y 2115/10* (2016.08)

(56) References Cited

U.S. PATENT DOCUMENTS 1,834,776 A * 12/1931 Halvorson .............. F21V 19/02 439/640
2,673,287 A * 3/1954 Elmer ..................... F21V 19/02 362/429
3,012,801 A * 12/1961 Cole ....................... F21V 21/22 403/52
4,046,448 A * 9/1977 Miller ................... F21V 19/006 439/640
4,093,974 A 6/1978 Wheeler
4,327,402 A * 4/1982 Aubrey ................... F21V 21/22 362/288
5,136,489 A * 8/1992 Cheng ....................... F21S 8/04 362/285
6,095,660 A 8/2000 Moriyama et al.
7,028,963 B1 4/2006 Silva et al.
7,320,537 B1 1/2008 Stillwaugh
7,762,515 B2 7/2010 Lin
7,771,085 B2 * 8/2010 Kim ........................ F21V 21/03 362/285
8,646,951 B2 2/2014 Kim et al.
8,979,044 B2 3/2015 Seidl et al.
2013/0265764 A1 10/2013 Holman et al.
2013/0294098 A1 11/2013 Yeh
2015/0233558 A1 8/2015 Ticktin et al.

OTHER PUBLICATIONS

Byun, Sung Cheal; "Written Opinion of the International Searching Authority"; dated Dec. 16, 2016; International Application No. PCT/US2016/046922; 16 pages.

* cited by examiner

ELECTRONIC DEVICE MOUNT WITH EXTENDABLE ARMS FIXED BY A MAGNET FOR LIGHT FIXTURES

CROSS-REFERENCE TO RELATED APPLICATIONS

This non-provisional United States (U.S.) patent application claims the benefit of International Patent App. No. PCT/US2016/064,922, titled MOUNTING SYSTEM FOR SECURING ELECTRONIC DEVICES TO A LIGHT FIXTURE, filed on Aug. 12, 2016 by Robert Hines. International Patent App. No. PCT/US2016/064,922 claims the benefit of priority of U.S. Provisional Patent App. No. 62/216,554, filed by Robert Hines on Sep. 10, 2015, and U.S. Provisional Patent App. No. 62/204,824, filed by Robert Hines on Aug. 13, 2015, both of which are incorporated herein by reference in their entireties for all intents and purposes.

FIELD

The embodiments herein relate generally to a mounting system for securing a device, such as an LED light or another electronic device, to a light fixture, such as an incandescent-style recessed light fixture or any other type of light fixture.

BACKGROUND

A recessed light, also known as a downlight, a can light, or a canister light is a light fixture that is installed in an opening in a ceiling or building surface. When installed, it appears to have light shining from a hole in the ceiling, concentrating the light in a downward direction as a broad floodlight or narrow spotlight. There are normally two parts to a recessed light, the trim and the housing. The trim is the visible portion of the light, not including the light bulb itself. The housing is the fixture itself that is installed inside the ceiling and contains a female light bulb socket and electrical connections to a power source. In some cases, the trim, housing, light element, and electronics are all included within a single unit. For example, all the components of the light housing may be molded together and incorporate the light source and the associated electronics.

Recessed light fixtures are made by many different manufacturers worldwide, however they are subject to some standardization for purposes of interoperability with Underwrites Lab (UL) rated light bulbs, primarily and historically, incandescent light bulbs, compact fluorescent bulbs or halogen bulbs, all using Exx, Dxx, Gxx, GUxx or BAxx female and male mounts. It has been estimated that as many as two billion recessed light fixtures are currently installed in buildings in the United States.

Although recessed light fixtures were originally designed for use with incandescent light bulbs, many consumers and businesses seek a more energy efficient lighting solution than incandescent bulbs without the need to remove or redesign already installed recessed light fixtures. Moreover, many consumers and businesses seek a lighting solution that uses existing installed recessed light fixtures but which provides more light, or different quality light, than can be provided by conventional incandescent bulbs. Other consumers and businesses seek a lighting solution that is more attractive than recessed lights with traditional incandescent bulbs.

Additionally, use of incandescent bulbs, which convert the majority of their used energy into heat, rather than light, can, in recessed light fixtures, cause fires if not properly insulated. Finally, as many governments institute regulation phasing out the manufacture and use of incandescent bulbs, many consumers and businesses will be forced to obtain alternative light sources that can be used with existing can light fixtures, or they will be forced to remove these existing can light fixtures and install new fixtures at great expense.

Various attempts have been made to address these needs, largely without commercial success. In some cases, compact fluorescent light bulbs are used in recessed light fixtures.

However, such uses are either impossible, or at best unsightly, because compact fluorescent bulbs often do not fit well in existing recessed light fixtures and project below the bottom edge of the trim of existing light fixtures. Additionally, the electrical circuitry (e.g., driver) necessary to run a compact fluorescent or light emitting diode (LED) bulb is often greater in diameter than the diameter of existing installed can lights, making it impossible to insert the compact fluorescent bulb into the can tight fixture.

Others have attempted to solve these problems using LED panel lights. Such LED panel lights are generally highly energy efficient and can provide significantly higher lumens and/or better light quality for a given amount of energy. However, prior art mounting systems for such LED panel lights have significant weaknesses and drawbacks. In general, prior art mounting systems consist of either spring arm devices that press against inside edges of the can light fixture, or mounts that must be drilled or screwed into the sides of the can light fixture.

Moreover, such prior art mounts often require wire cutting and splicing in order to complete the electrical connections between the can light fixture and the LED light panel. These prior art mounts are often difficult to install for the average homeowner, requiring use of drill and electrical work involving wire cutting and splicing, and necessitating that the installer turn off the power at a circuit breaker for installation. Even for skilled electrical installers, use of these prior art devices takes time.

Moreover, such prior art devices often hold limited weight, thereby the size and types of LED devices that the prior art mount can hold.

Still further, such prior art mounts often do not fit easily or well in existing recessed light fixtures. Such prior art mounts are often either too long, too short, too great in diameter or too small in diameter, to engage the sides of the can light fixture or to fit within the length of the existing can light fixture. Then, even if they fit generally, such prior art devices often have problems with adjustability, and are not easy or able to be adjusted so that they fit snugly against the lower edge or trim portion of the existing recessed light fixture. Indeed, such prior art mounting systems can leave gaps of ½ inch or more between the mounted LED panel and the ceiling surface, which are unsightly and can detrimentally allow airflow to pass through the light fixture from the plenum or floor above the light fixture, thereby reducing the efficiency of insulation and weatherproofing efforts overall.

As such, there is a need in the industry for a mounting system for securing a device, such as an LED panel light or other electronic device, to a recessed light fixture, such as an existing recessed light fixture, that includes one or more of the following features: it is easy to install, it does not require wire splicing or cutting, it does not require drilling or screwing into the existing light fixture, it does not require turning off power at the circuit breaker, it readily fits existing recessed light fixtures, it is easily adjustable in length, or it has a simplicity of design requiring few parts and easy assembly.

SUMMARY

A mounting system is provided for use in securing a device, such as an LED light, a flat panel LED, or other electronic device, to a light fixture, such as an existing incandescent recessed light fixture. The electronic device can be any of a variety of devices, including, but not limited to, a light, an LED panel light, a microphone, a speaker, an audio component, a light fixture, a motor, a pump, a fan, a thermostat, a radio, a wireless transmitter, a wireless receiver, a Bluetooth device, a communications hub, a phone, a router, a switch, a display, etc. In various embodiments, the mounting system comprises a central hub, containing an adjusting magnet interposed between two metallic (e.g., steel) mounting arms. The top mounting arm has a male light bulb socket for physical and electrical connection to a female light bulb socket in an existing recessed lighting fixture. The bottom mounting arm has a mount for securing to an electronic device, such as an LED panel or any other electronic device.

In one embodiment, a mounting system adapted to secure an electronic device to a light fixture includes: a top hub; an electrical connector coupled to the top hub an tipper mounting arm coupled to the top hub; a central hub coupled to the upper arm; a magnet position within the central hub; a lower mounting arm coupled to the central hub; and a bottom hub adapted to be secured to an electronic device. The lower mounting arm is configured to slide through the central hub to adjust the mounting system from an extended configuration to a collapsed configuration, and the magnet applies magnetic three to at least one of the upper mounting arm or the lower mounting and to control movement of at least one of the upper mounting arm or the lower mounting arm through the central hub.

In one embodiment, the electrical connector includes a male lightbulb socket. In another embodiment a space defined by the top hub, the upper arm, and the central hub, is configured to hold an electronic circuit. In another embodiment the space is configured to hold an LED driver. In another embodiment the central hub comprises a housing cavity, and wherein the magnet is positioned within the housing cavity. In another embodiment the housing cavity further comprises first and second mounting arm slots, and the upper mounting arm is secured to the first mounting arm slot, and the lower mounting arm is positioned such that it can slide through the second mounting arm slot.

In another embodiment the magnet comprises a cylindrical shape having first and second opposite, parallel, planar faces, and the magnet is positioned within the central hub such that the first planar face is parallel to a planar surface of the lower mounting arm. In another embodiment the magnet is positioned between the upper mounting arm and the lower mounting arm. In another embodiment the magnet comprises one or more of a neodymium magnet or a printed poly-magnet. In another embodiment the magnet has a strength between N40 and N52. In another embodiment the magnet comprises one or more of a friction layer, a rubber material, a silicone material, a plastic material, a polymer material, or an encapsulation. In another embodiment the electronic device comprises one of more of a light, an LED panel light, a microphone, a speaker, an audio component, a light fixture, a motor, a pump, a fan, a thermostat, a radio, a wireless transmitter, a wireless receiver, a Bluetooth device, a communications hub, a phone, a router, a switch, or a display.

A method of securing an electronic device to a light fixture includes: providing a mounting system, wherein the mounting system comprises: a top hub; an electrical connector coupled to the top hub; an upper mounting arm coupled to the top hub; a central hub coupled to the upper arm; a magnet position within the central hub; a lower mounting arm coupled to the central hub; and a bottom hub adapted to be secured to an electronic device. The lower mounting arm is configured to slide through the central hub to adjust the mounting system from an extended configuration to a collapsed configuration, and the magnet applies magnetic force to at least one of the upper mounting arm or the lower mounting arm to control movement of at least one of the upper mounting arm or the lower mounting arm through the central hub. The method also includes securing an electronic device to the bottom hub; and coupling the top hub to a light fixture.

In another embodiment the electrical connector comprises a male lightbulb socket. In another embodiment a space defined by the top hub, the upper arm, and the central hub, is configured to hold an electronic circuit. In another embodiment the central hub comprises a housing cavity, and the magnet is positioned within the housing cavity. In another embodiment the housing cavity further comprises first and second mounting arm slots, the upper mounting arm is secured to the first mounting arm slot, and the lower mounting arm is positioned such that it can slide through the second mounting arm slot.

In another embodiment the magnet comprises a cylindrical shape having first and second opposite, parallel, planar faces, and the magnet is positioned within the central hub such that the first planar face is parallel to a planar surface of the lower mounting arm. In another embodiment the magnet is positioned between the upper mounting arm and the lower mounting arm. In another embodiment the magnet comprises one or more of a neodymium magnet or a printed poly-magnet. In another embodiment the magnet has a strength between N40 and N52. In another embodiment the magnet comprises one or more of a friction layer, a rubber material, a silicone material, a plastic material, a polymer material, or an encapsulation. In another embodiment the electronic device comprises one of more of a light, an LED panel light, a microphone, a speaker, an audio component, a light fixture, a motor, a pump, a fan, a thermostat, a radio, a wireless transmitter, a wireless receiver, a Bluetooth device, a communications hub, a phone, a router, a switch, or a display.

BRIEF DESCRIPTION OF THE DRAWINGS

The detailed description of some embodiments of the invention will be made below with reference to the accompanying figures, wherein the figures disclose one or more embodiments of the present invention.

DETAILED DESCRIPTION

Figure 4:
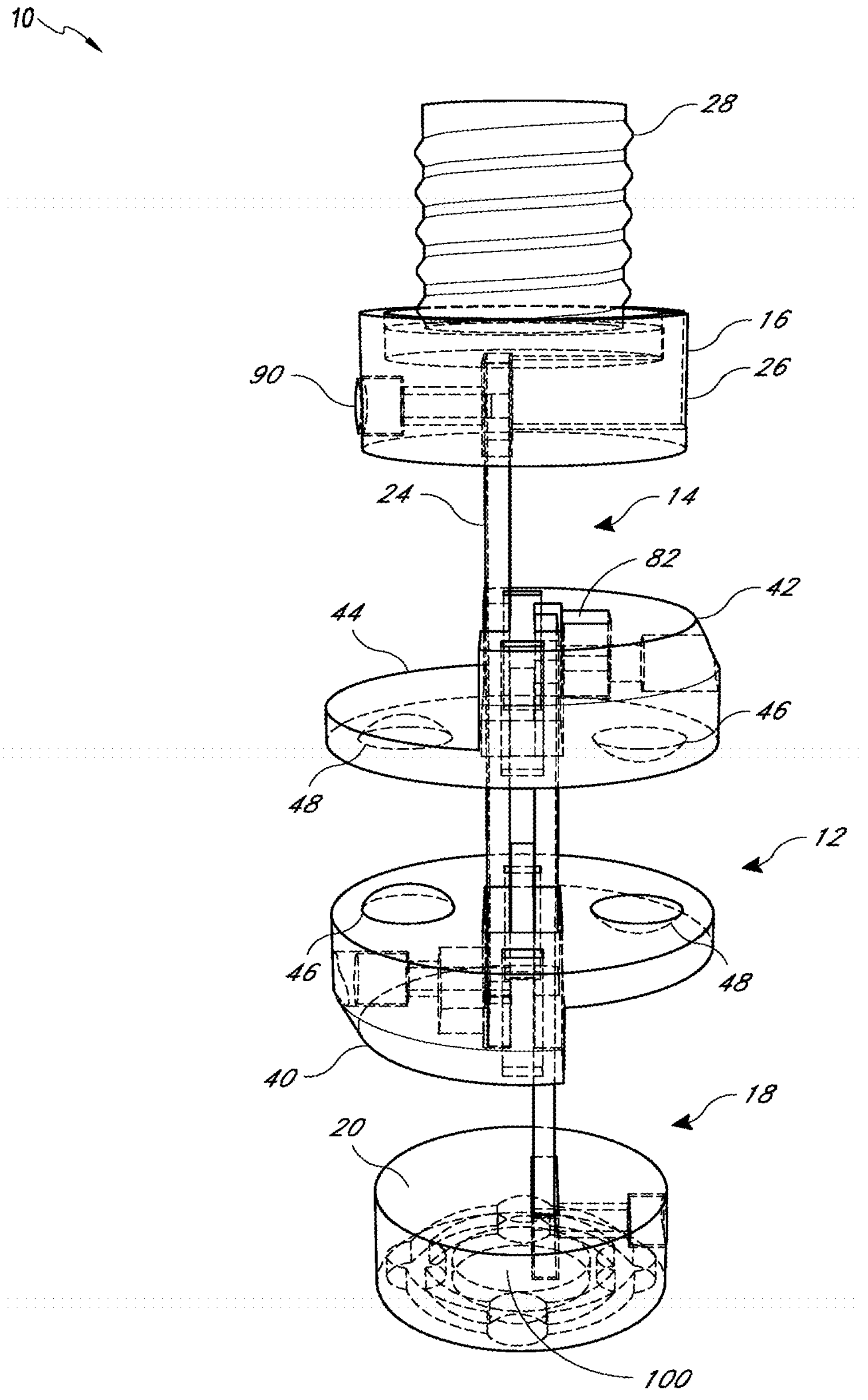
FIG. 4 depicts a transparent interior front perspective assembly view of an embodiment of the mounting system, with the central hub shown detached into two hub components.
Figure 5:
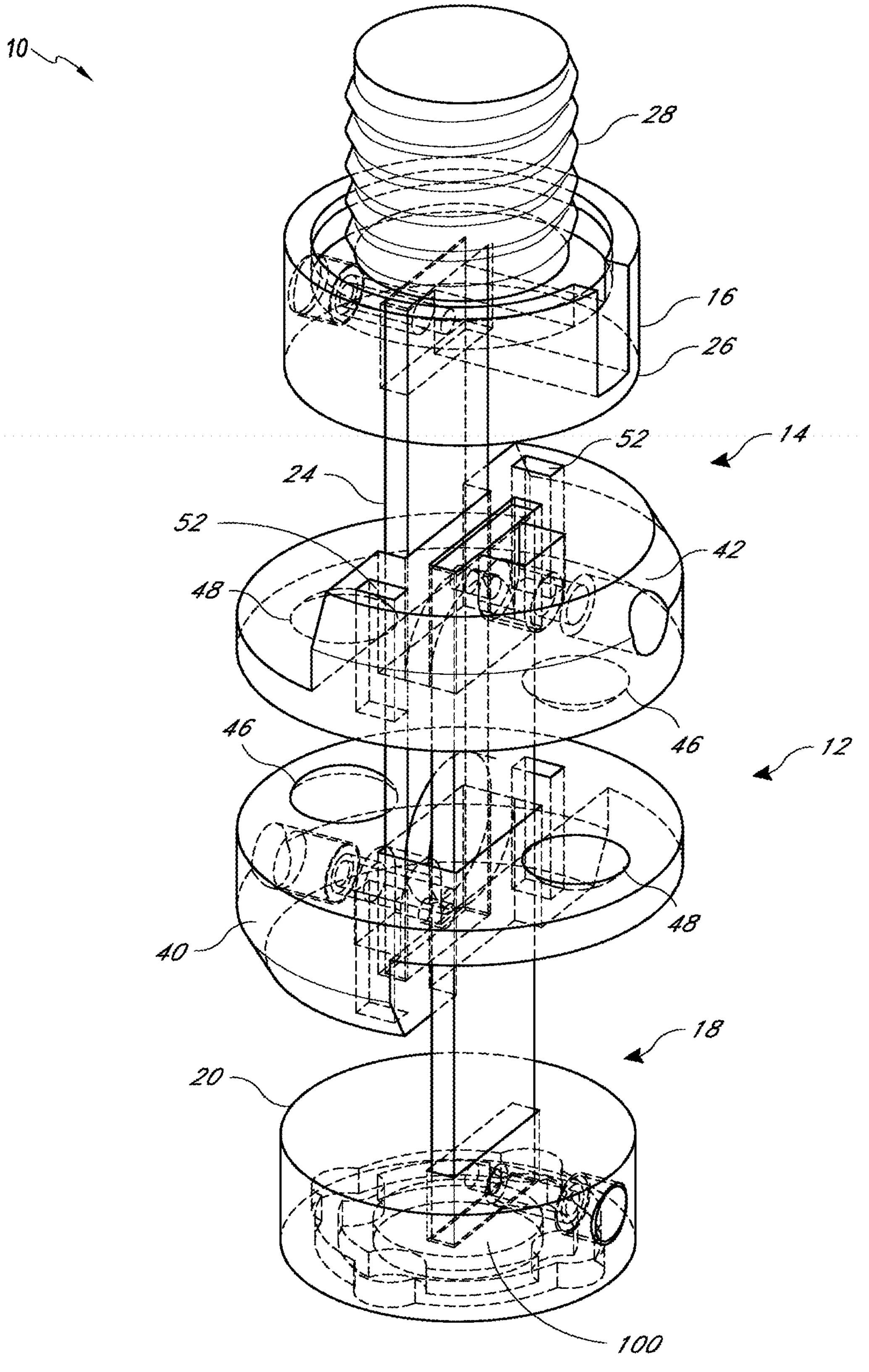
FIG. 5 depicts a transparent interior perspective front right assembly view of an embodiment of the mounting system with the central hub shown detached into two hub components.
Figure 6:
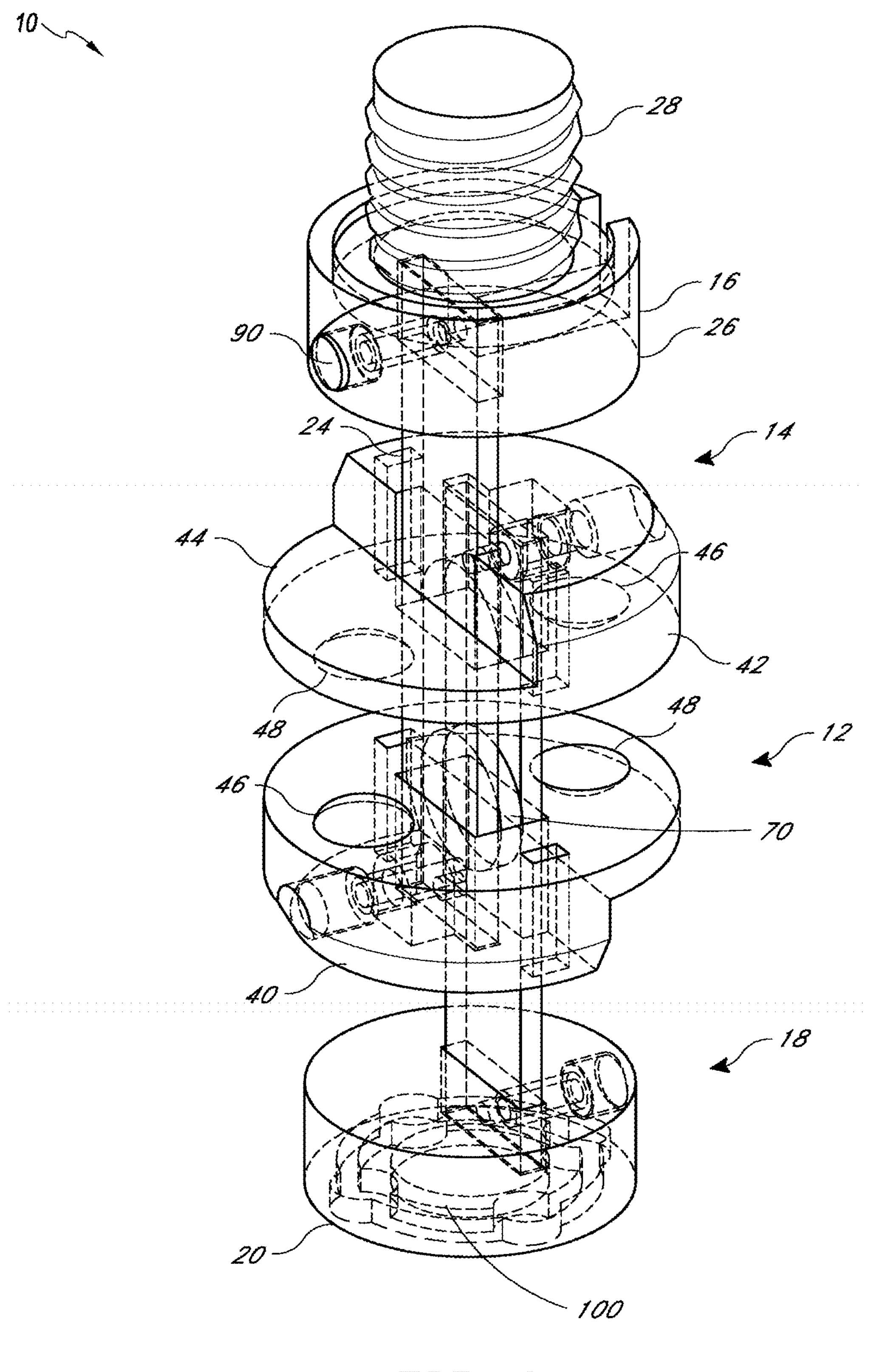
FIG. 6 depicts a transparent interior perspective front left assembly view of an embodiment of the mounting system with the central hub shown detached into two hub components.
Figure 7:
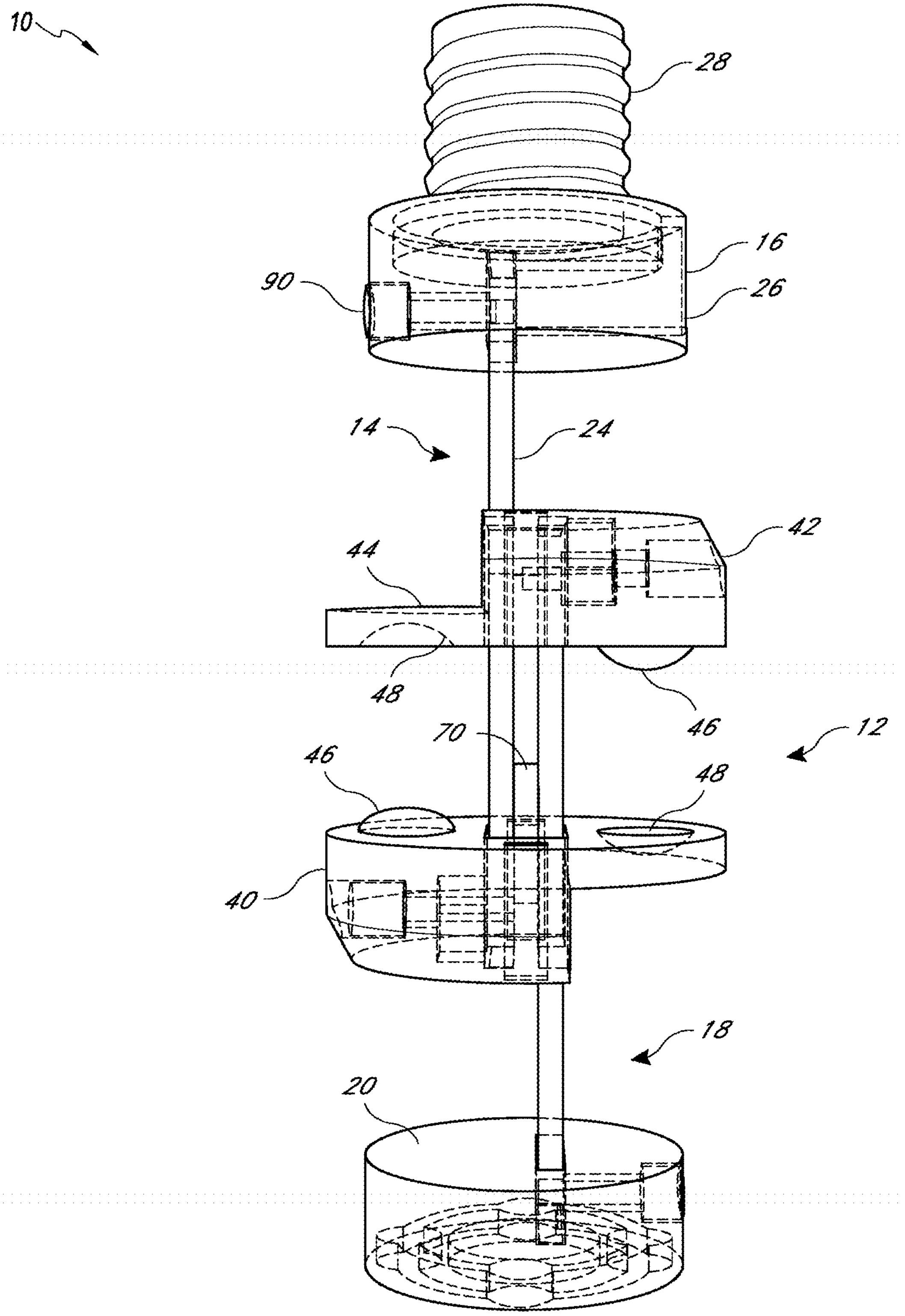
FIG. 7 depicts a transparent interior right assembly view of an embodiment of the mounting system with the central hub shown detached into two hub components.
Figure 8:
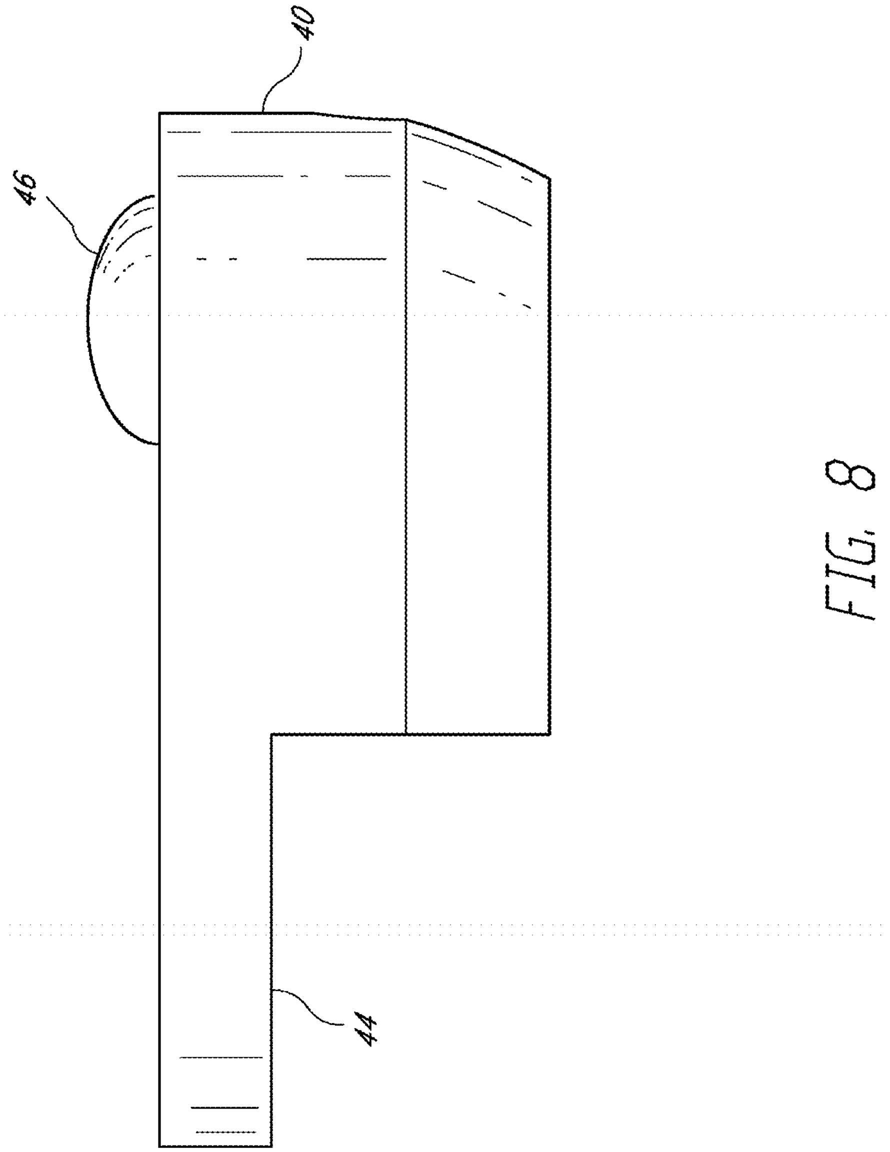
FIG. 8 depicts a front view of a hub component of an embodiment of the mounting system.
Figure 9:
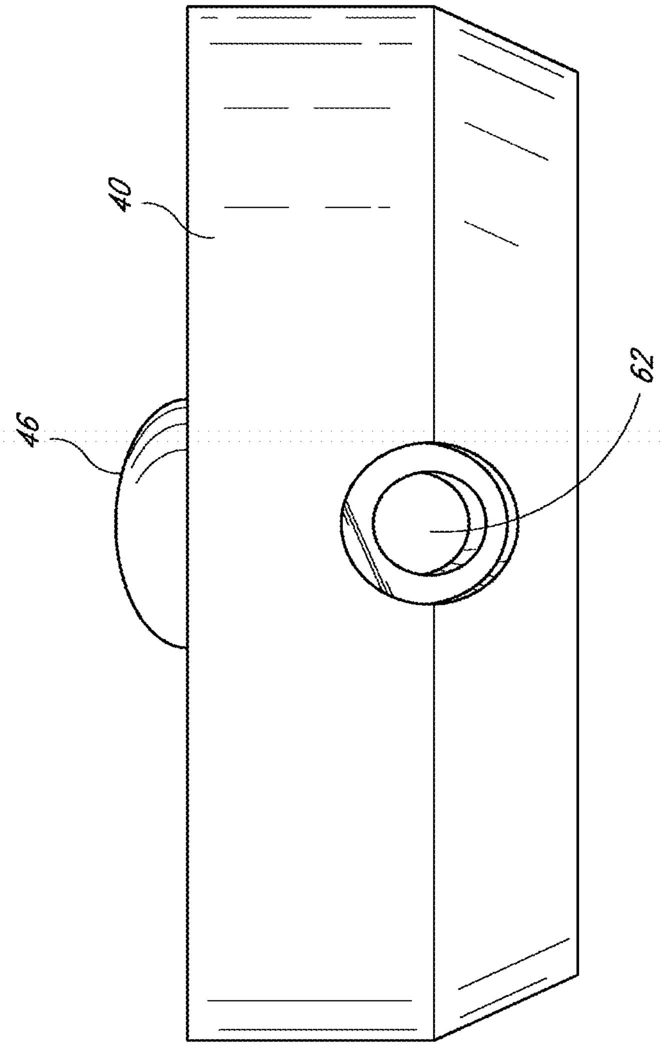
FIG. 9 depicts a right view of a hub component of an embodiment of the mounting system.
Figure 10:
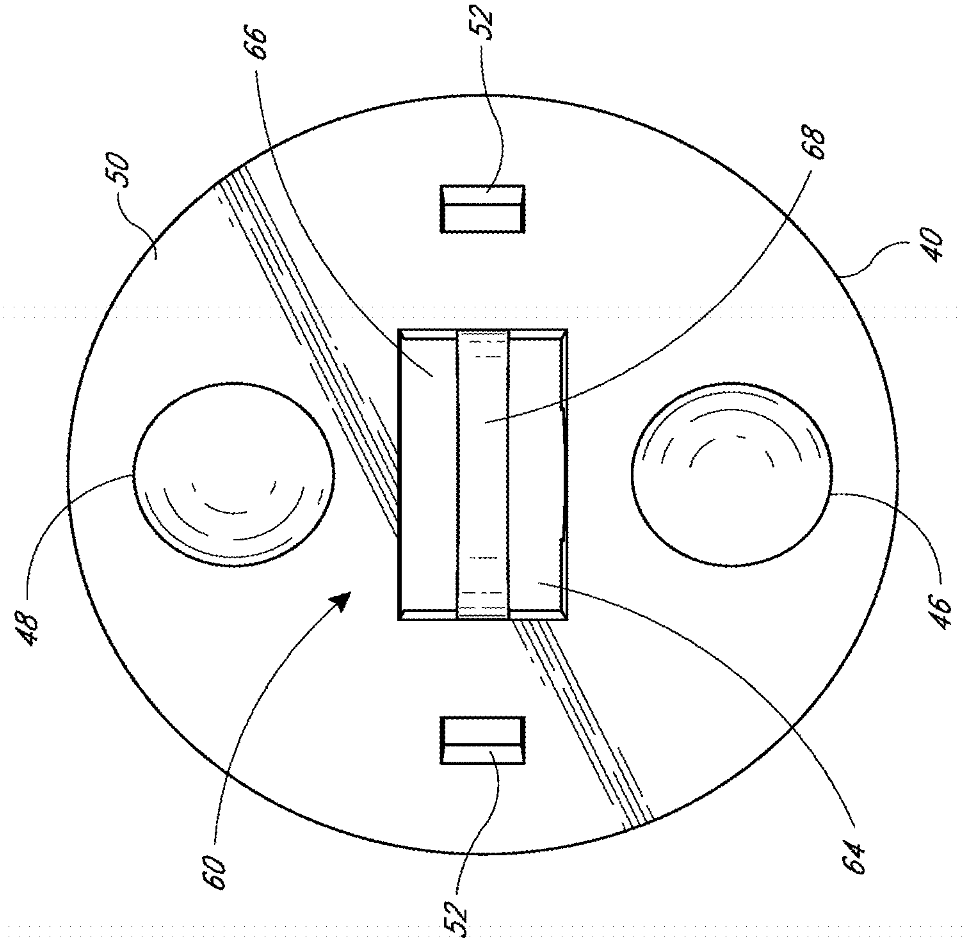
FIG. 10 depicts a top view of a hub component of an embodiment of the mounting system.
Figure 11:
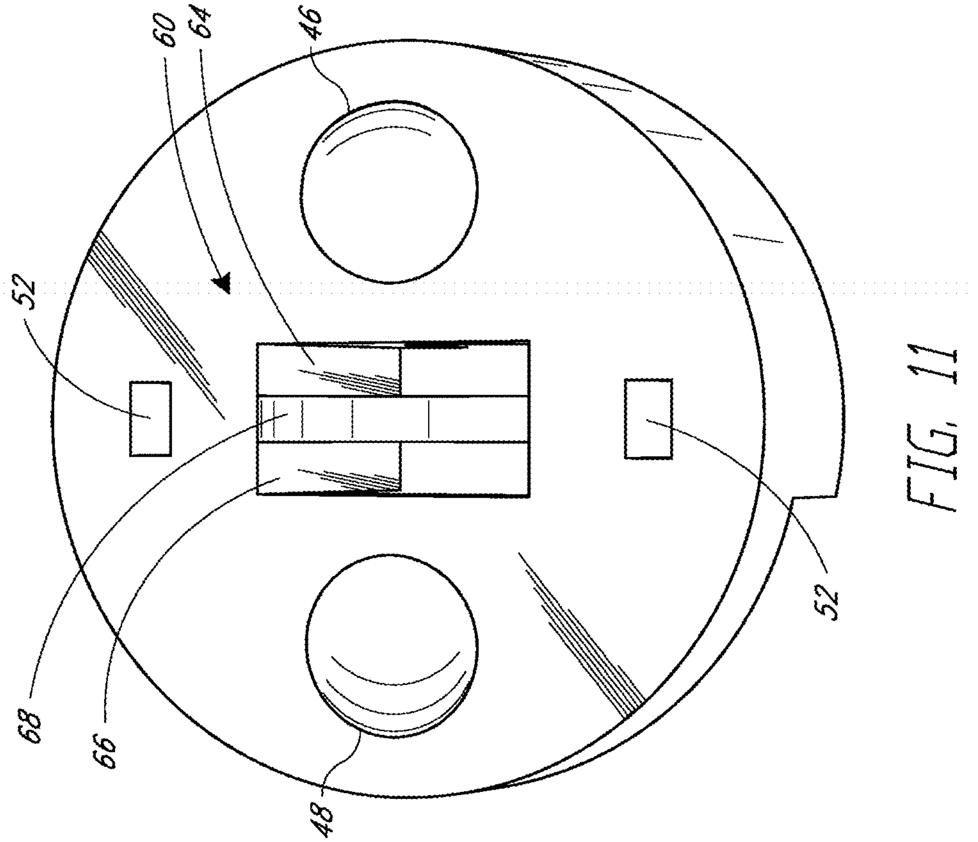
FIG. 11 depicts a perspective front top view of a hub component of an embodiment of the mounting system.

A mounting system is provided for use in securing an electronic device 100 (see FIGS. 4-6), such as an LED light, flat panel LED, or other electronic device, to a light fixture, such as an existing incandescent recessed light fixture. As used in the industry and herein, a recessed light fixture is also referred to as a "can light fixture." Although many of the embodiments are described in terms of mounting an LED light, such as a flat panel LED or other LED light, it should be understood that any electronic device 100, including but not limited to the particular electronic devices described above, may be mounted using any of the devices or methods described herein. For example, the electronic device 100 can be any of a variety of electronic devices, including, but not limited to, a light, an LED panel light, a microphone, a speaker, an audio component, a light fixture, a motor, a pump, a fan, a thermostat, a radio, a wireless transmitter, a wireless receiver, a Bluetooth device, a communications hub, a phone, a router, a switch, a display, etc.

As depicted in FIGS. 1-19, the mounting system 10 generally includes a central hub 12, a top mounting arm 14, with a top hub 16, and a bottom mounting arm 18, with a bottom hub 20. The three hubs 12, 16, 20 of the mounting system are generally sized to fit comfortably within the diameter and circumference of a can light fixtures. A container space 22 is also provided to house electronics or other components, such as an LED driver and other electronic components. In some embodiments, the top mounting arm 14 comprises an arm 24 and a top hub component 26. A male lightbulb socket 28 is affixed to project upwardly from the top hub component 26. The male lightbulb socket 28 may have electrical connection wires, not shown, extending downwardly therefrom, for connection to an electronic device 100 (e.g., an LED driver, an LED panel, or other electronic device). The top mounting arm 14 is affixed to the central hub 12. The bottom mounting arm 18 is movably attached to the central hub 12 by an arm 25 (see FIGS. 1-2), enabling the bottom mounting arm 18 to be moved longitudinally toward or away from the central hub 12.

Figure 1:
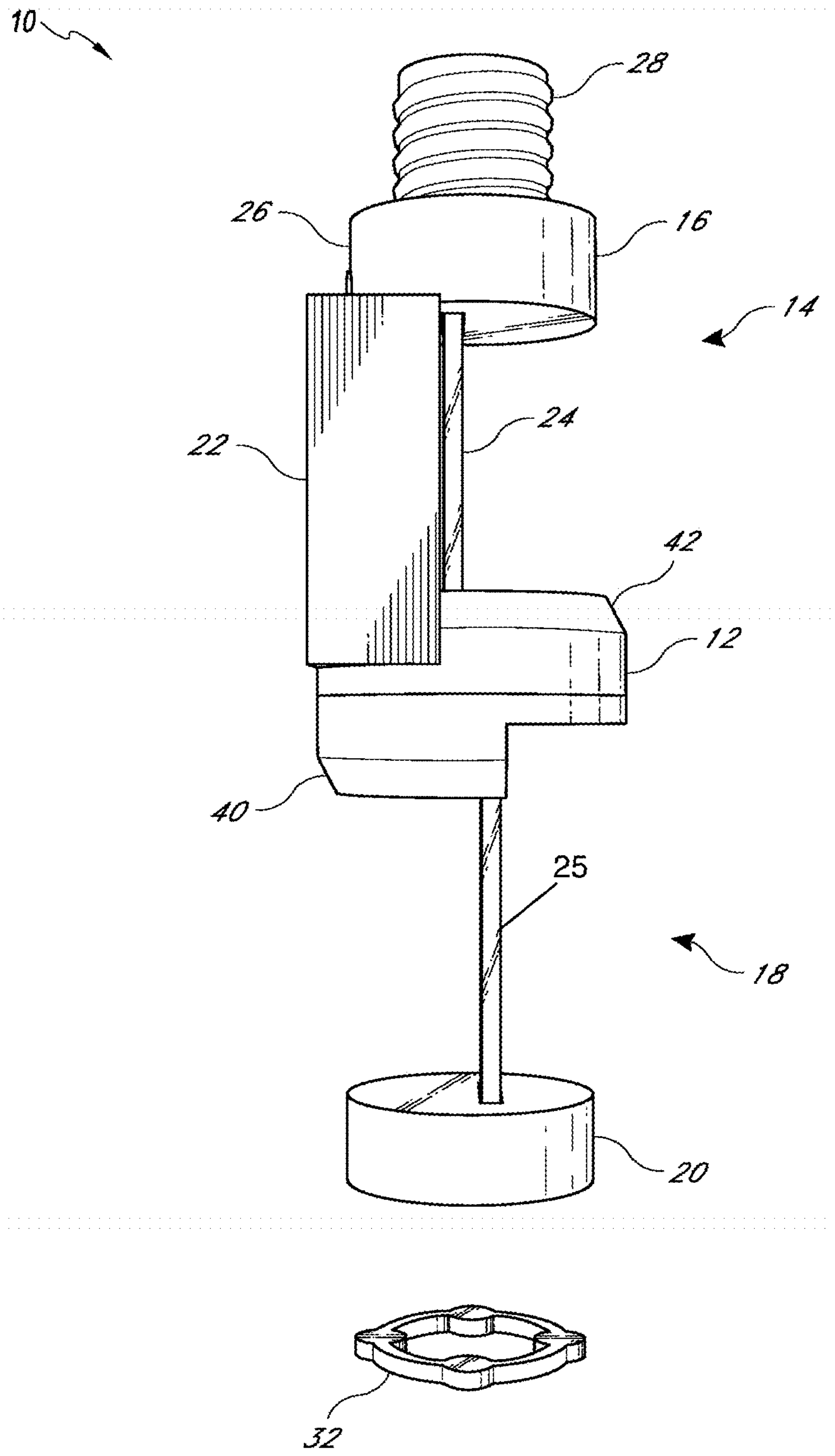
FIG. 1 depicts a front perspective view of an embodiment of the mounting system, with the lower mounting aria shown in a fully extended position.
Figure 2:
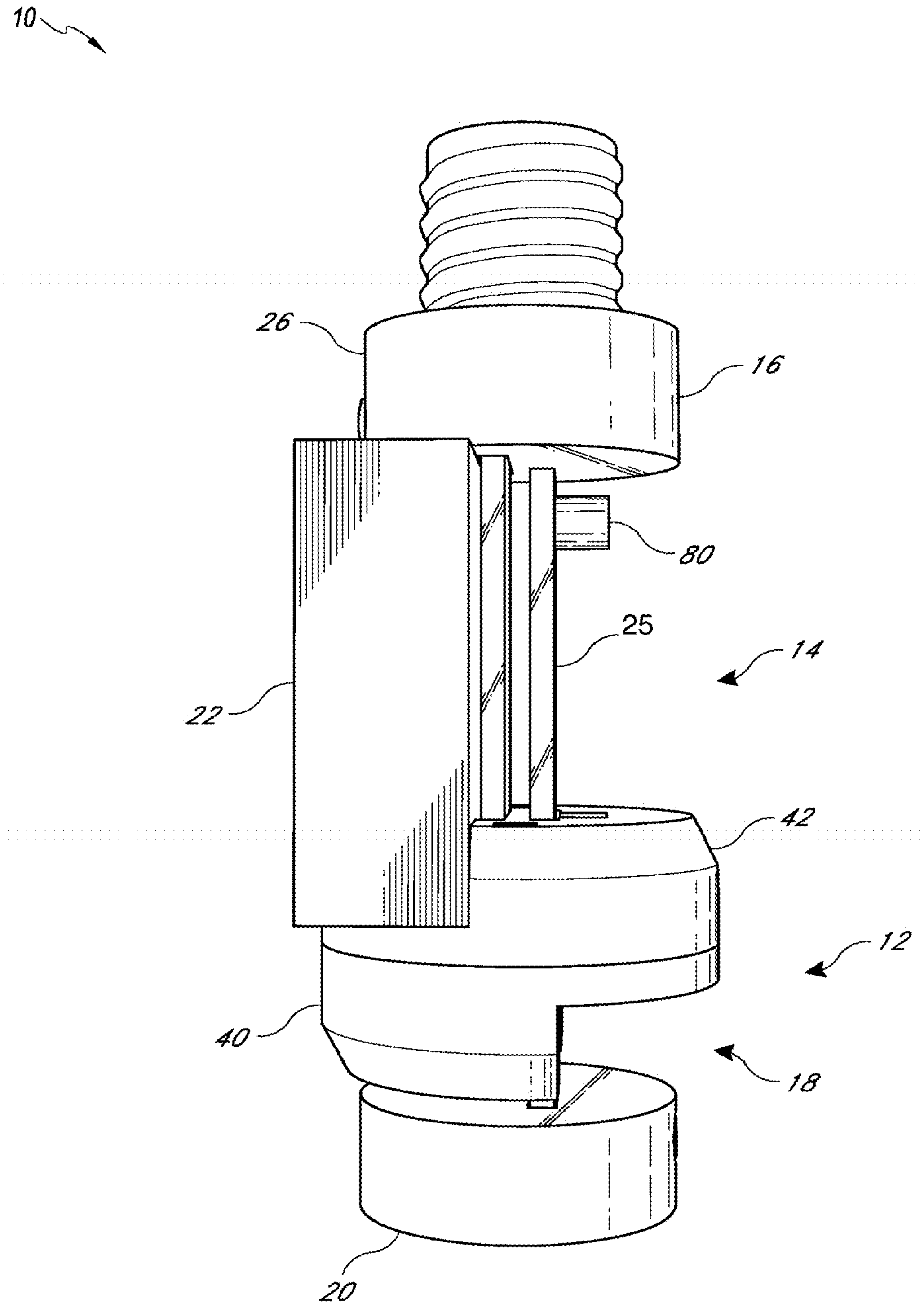
FIG. 2 depicts a front perspective view of an embodiment of the mounting system, with the lower mounting arm shown in a fully compressed position.
Figure 3:
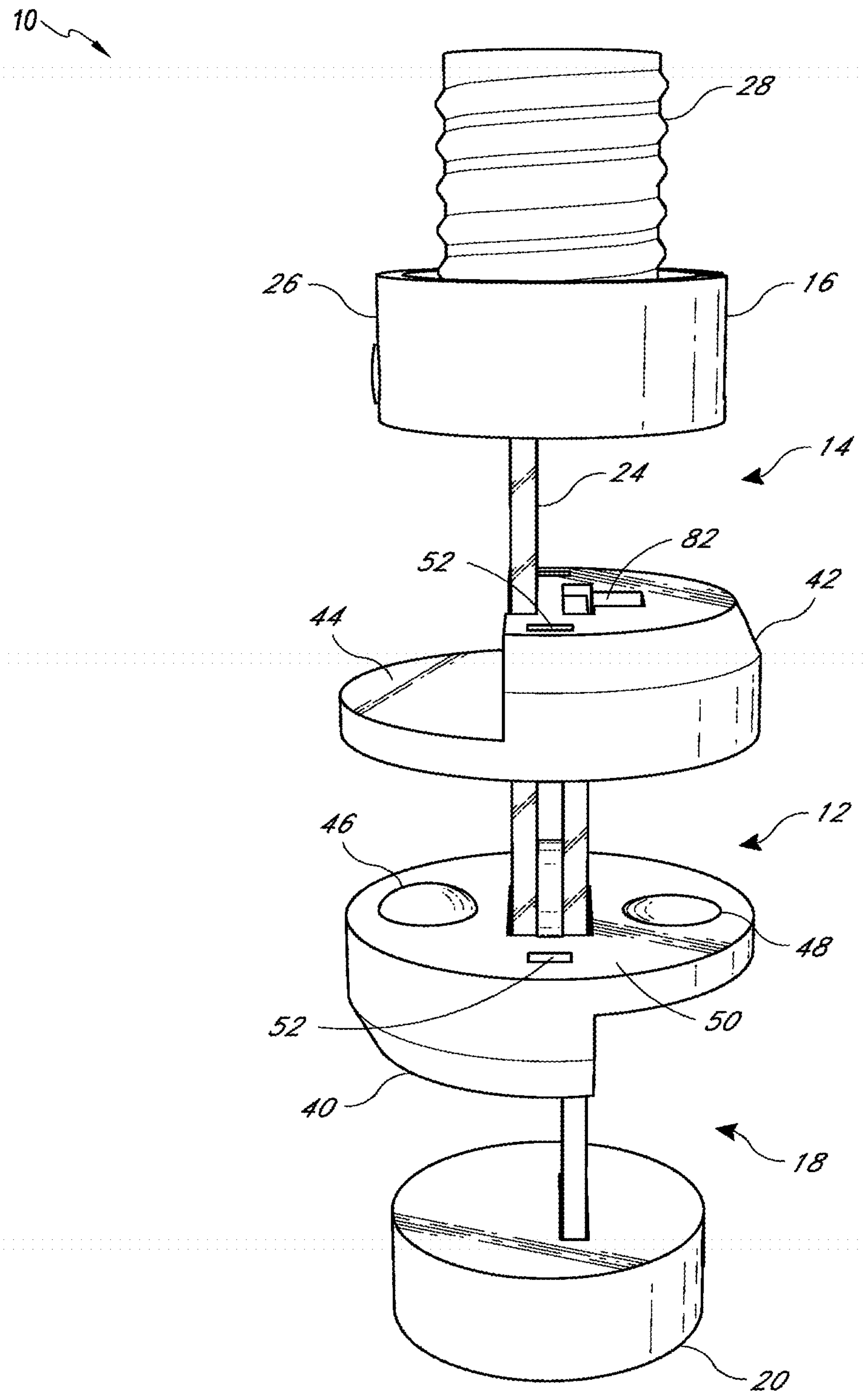
FIG. 3 depicts a front perspective assembly view of an embodiment of the mounting system, with the central hub shown detached into two hub components.

In one embodiment, the bottom mounting arm 18 may be moved between an extended position, as shown in FIG. 1, and a compressed position as shown in FIG. 2. Moreover, in one embodiment, the range of motion is continuous between the extended position and compressed position, such that the bottom mounting arm 18 can be moved or adjusted to any position between the fully extended position and the fully retracted position, and is not limited any particular increments of adjustment. This continuous adjustability of the length of the mounting system allows it to be easily used in can light fixtures of various lengths, as the bottom mounting arm 18 of the mounting system may be quickly and easily moved to secure the electronic device 100 (such as an LED light) tightly against the bottom of the can light fixture and the surrounding ceiling structure, when installed. The bottom mounting arm 18 further comprises a bottom hub 20 coupled to the arm 25 for attachment to an electronic device 100, such as an LED panel light. The arms 24, 25 of the mounting arms 14, 18 respectively may be formed of metal and referred to herein as metal arms 24, 25

In use, the mounting system 10 is attached to a light fixture, such as an incandescent can light fixture, by screwing the male light bulb socket 28 of the top hub 16 into a female light bulb socket of the incandescent can light fixture (not shown). The mounting system 10 is attached to an electronic device, such as an LED panel (not shown) at the bottom hub 20 of the bottom mounting arm 18. In one embodiment, the bottom hub 20 affixes to a mounting ring 32 affixed to the electronic device (e.g., LED panel light (not shown)). In some embodiments, the bottom hub 20 includes one or more magnets (not shown), which magnetically secures to the metal underside of the electronic device (e.g., LED panel light). In some embodiments, the bottom hub 20 can be secured to an electronic device by screws, glue or other readily understood fastening means. The central hub 12 can include two hub components 40, 42, embodiments of which are discussed below. The mounting system 10 can also include a mounting ring 32, as discussed below.

FIGS. 3-7 show an embodiment of the mounting system 10 in further detail. The mounting system central hub 12 is comprised of two interlocking central hub components 40, 42. In some embodiments, each of the central hub components 40, 42 is identical to the other hub component. Each of the central hub components 40, 42 has a generally circular circumference. On one side of each of the central hub components 40, 42, a cut-away 44 has been made to create space for the insertion of an LED driver component or other electronics as illustrated in FIGS. 1-2. Each of the central hub components 40, 42 also comprises a detent sphere 46 and a detent cavity 48. The detent sphere 46 is a partial-sphere projecting upwardly from the left side of the inside face of the bottom central hub component 40, and likewise, projecting downwardly from the inside face of the right side of the top central hub component 42. When assembled, the two central hub components 40, 42, are pressed tightly against one another, causing the detent sphere 46 of each central hub component to project into and tightly engage the detent cavity 48 of the other central hub component. When the two hub central components 40, 42 are in close-fit relationship and secured, the interaction of the detent sphere 46 and detent cavity 48 serve to prevent rotation of one central hub component 40 with respect to the other central hub component 42, thus resulting in a substantially secured central hub 12. The interaction of the respective detent sphere 46 and detent cavity 48 of each of the central hub components 40, 42, provides a strong lock between the central hub components 40, 42, and therefore substantial ability to resist twisting, turning or torsion on the central hub 12 caused by screwing the mounting system 10 into the recessed light fixture. In some embodiments, other rotation-preventing structures are provided instead of detent spheres. For example, one or more pins, tabs, projections or other interlocking structure may be provided. The top central hub component 42 can be affixed to the bottom central hub component 40 by glue at any point on the detent sphere 46, the detent cavity 48 or the inner face 50 of the respective central hub component. The two central hub components 40, 42 can also be affixed to one another by screws, pins, zip ties or wires through pre-formed or pre-drilled holes 52 (which are optionally provided). In one embodiment, the two central hub components 40, 42, as well as the top hub component 16 and bottom hub component 20, are formed from a sturdy plastic, such as phenolic plastic, but can also be formed from polyurethane, polystyrene, polypropylene, polyvinyl chloride, polycarbonate, PLA, nylon, ABS, or carbon fiber. In some embodiments, the mounting system 10 further includes a stopping cavity 82 (see FIGS. 3-4) a hole 90 (see FIGS. 4, 6, 7) and magnet mount cavity 85 (see FIGS. 4-6), as further described below.

FIGS. 8-16 show an embodiment of the central hub component in further detail, illustrating features discussed above. Each central hub component 40, 42 includes a housing cavity 60 (see FIGS. 10-12, 15) and a pre-formed hole 62 (see FIGS. 9, 14) for attachment to the top mounting arm 14. The central housing cavity 60 has two mounting arm slots 64, 66 (see FIGS. 10-13, 15) formed there-through. Each of the mounting arm slots 64, 66 is configured to be the same size as the width and thickness of its respective mounting arm, or sized to receive a mounting arm such that the mounting arm can slide therethrough. As discussed further below, in one embodiment, each mounting arm is a flat steel lever arm approximately ⅛ inch thick by ¾ inch wide, with a variable length for different can sizes. The central housing cavity 60 also has a center support 68 (see FIGS. 10-12, 15) forming the inside edges of the mounting slots 64, 66.

Figure 12:
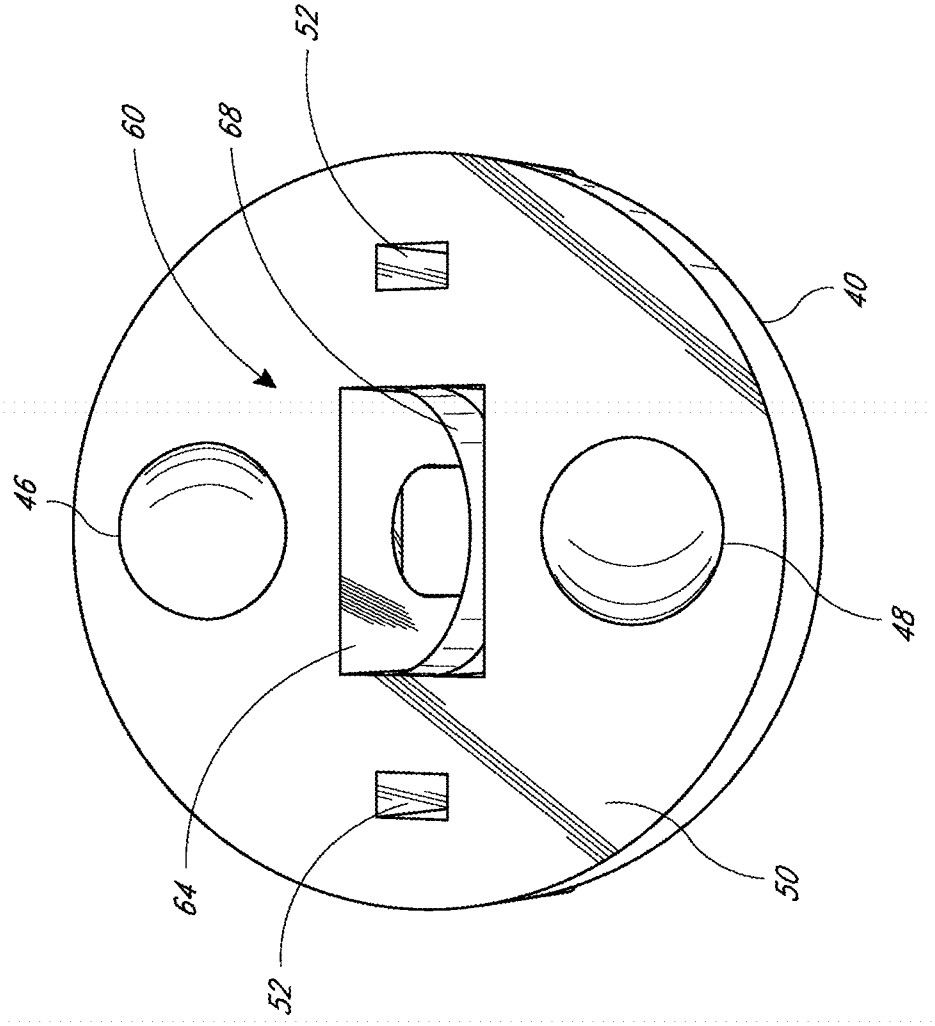
FIG. 12 depicts a perspective left top view of a hub component of an embodiment of the mounting system.
Figure 13:
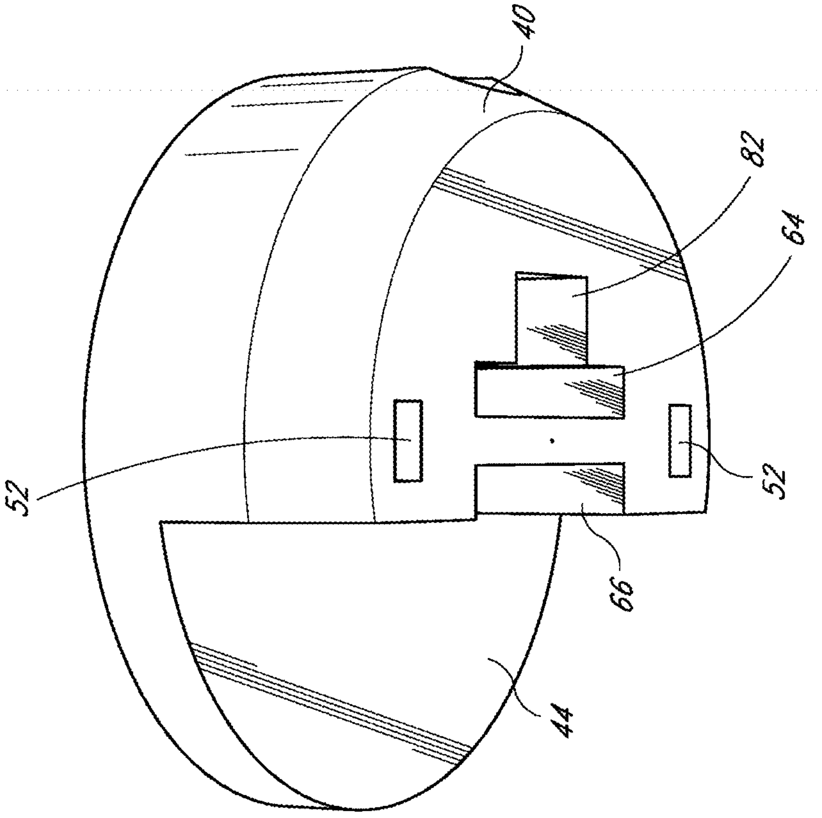
FIG. 13 depicts a perspective front bottom view of a hub component of an embodiment of the mounting system.
Figure 14:
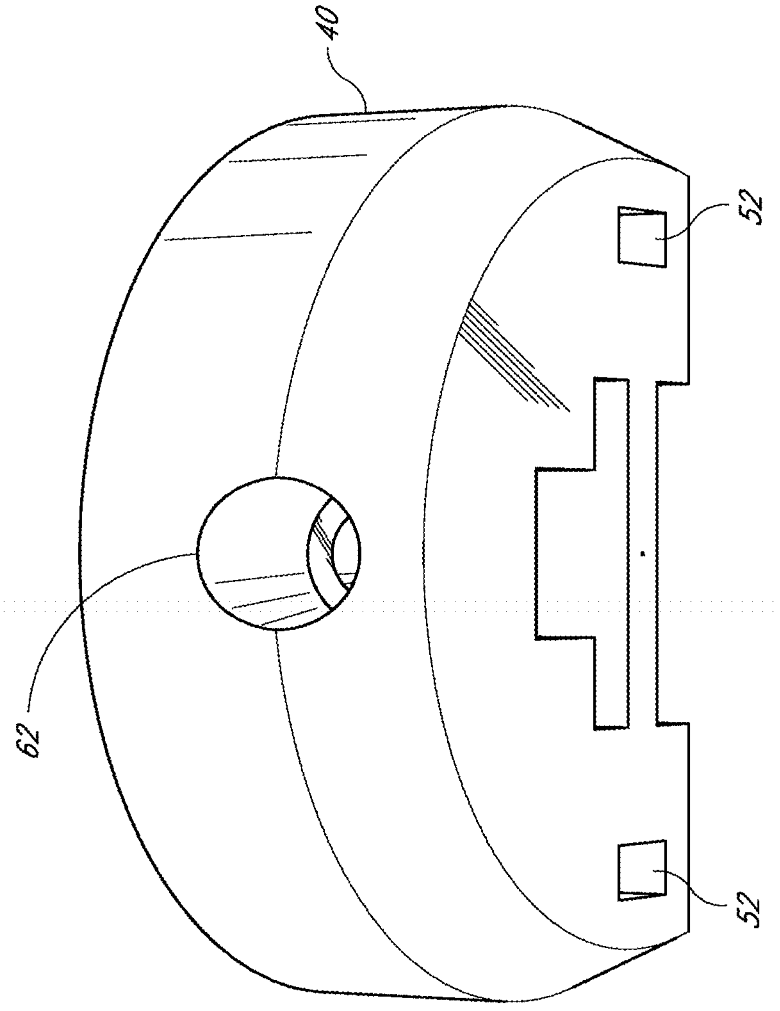
FIG. 14 depicts a perspective right bottom view of a hub component of an embodiment of the mounting system.
Figure 15:
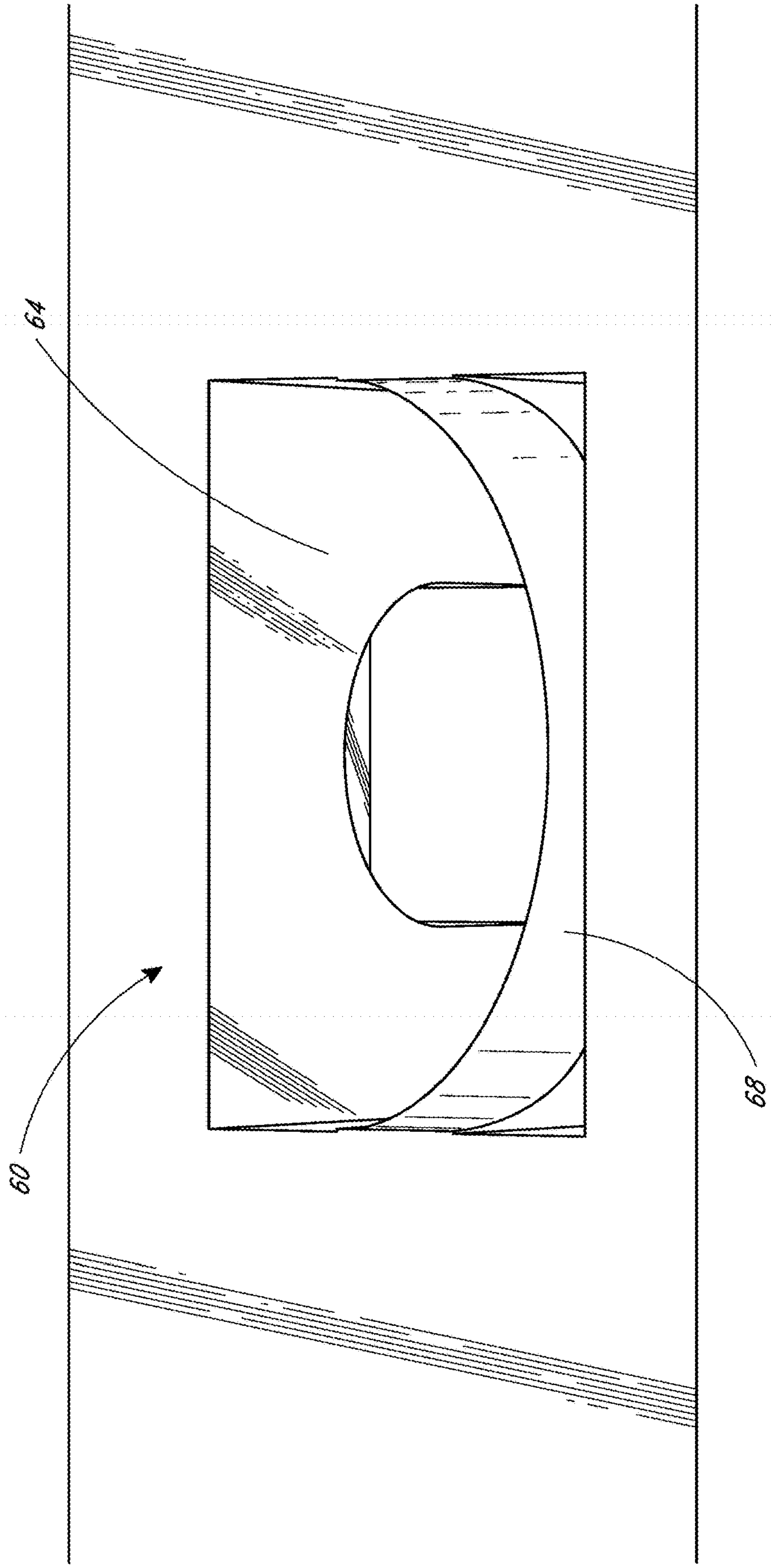
FIG. 15 depicts an enlarged perspective top right view of the housing cavity for the mounting arms and adjusting magnet.
Figure 16:
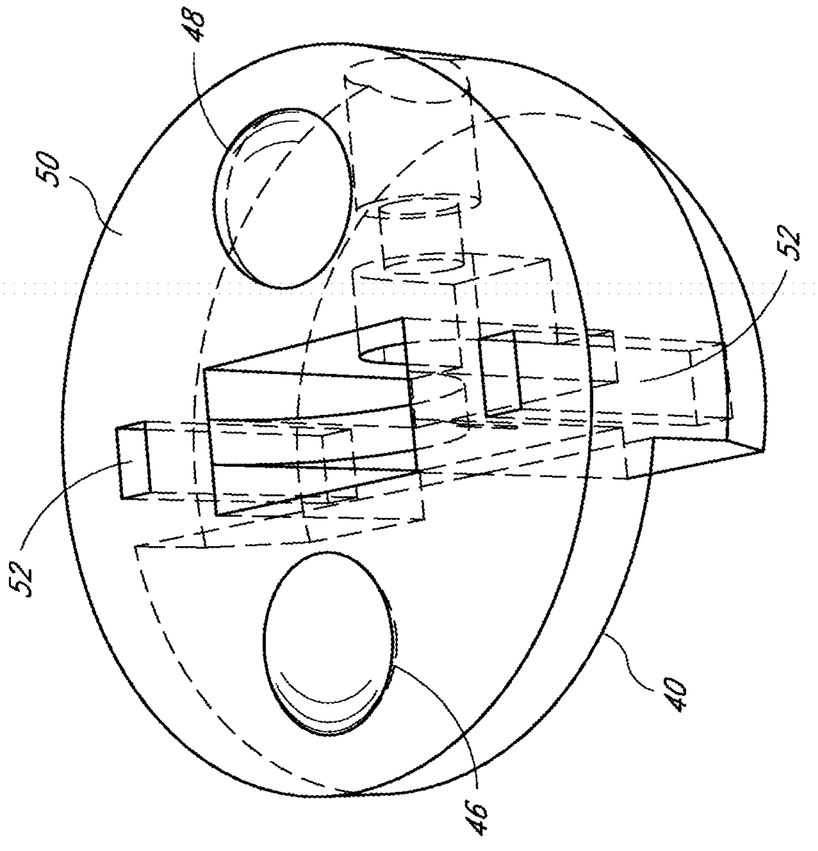
FIG. 16 depicts a transparent interior front right top view of a hub component of an embodiment of the mounting system.

In one embodiment, the center support 68 forms a half-cylindrical ledge, most clearly shown in FIGS. 12 and 15. The half-cylindrical ledge is configured to have the same half-circumference and radius of curve as an adjusting magnet 70 (see FIGS. 6-7, and 19). In one embodiment, the adjusting magnet is a flat cylindrical magnet. At assembly, the adjusting magnet 70 is placed in the central housing cavity 60 such that the adjusting magnet 70 is oriented so that the curve of the magnet's cylinder circumference is supported by and generally touching the half-cylindrical ledges of the center supports 68 of both the respective bottom central hub component 40 and the top central hub component 42. Thus oriented, the flat sides of the adjusting magnet 70 are positioned toward the inside edges of the mounting slots 64, 66. The adjusting magnet 70 may be secured in place on the half-cylindrical ledges of the center supports 68 with glue, but such securement is not required, as a tight close-fit relationship is achieved by minimizing tolerance between the curved edge of the adjusting magnet 70 and the half-cylindrical ledges of the center support 68 each of the respective top and bottom central hub components 40, 42. Further, when assembled, a top mounting arm 14 and bottom mounting arm 18 are inserted through each of the mounting arm slots 64, 66, thereby placing the wide flat metal portion of each metal arm 24, 25 in proximity to and, in some embodiments, in contact with, either side of the secured adjusting magnet 70. This placement, and in some embodiments, contact, results in a strong magnetic attraction between the adjusting magnet 70 and each of the respective metal arms 24, 25 of the mounting arms 14, 18.

In some embodiments, the magnet 70 includes a friction layer, such as rubber or polymer covering. For example, the magnet 70 may be encapsulated within or otherwise include a rubber, silicone, plastic, or other polymer material to increase the friction forces applied to the mounting arms 14, 18. In some embodiments, the magnet 70 attracts and pulls the elongated metal slide 308 into the friction layer, which increases resistance of movement of the mounting arms 14, 18.

In one embodiment, each of the mounting arms 14, 18 is made from steel. However, it will be understood by one of skill in the art that the mounting arms may be composed of any ferrous metal, so that the adjusting magnet may magnetically adhere to or attract the mounting aims 14, 18.

The adjusting magnet 70 may be any suitably strong magnet to hold the weight of the electronic device (e.g., LED panel) in a steady position, but still allow the bottom mounting arm 18 to slide with respect to the adjusting magnet 70 when a suitable force is applied. Such motion enables the bottom mounting arm 18 to be adjusted upwardly when the mounting system 10 is screwed into a can light fixture. In one embodiment, the adjusting magnet 70 is a neodymium magnet, of strength ranging from N40 to N52. The adjusting magnet 70 may also be a so-called printed poly-magnet, which is a type of neodymium magnet that is magnetized in a selected pattern. It will be appreciated that the adjusting magnet 70 must be able to be strongly attracting to the two metal arms 24, 25 of the respective mounting arms 14, 18 in order to hold the weight of the electronic device and prevent the bottom mounting arm 18 from sliding downward under the weight of the electronic device, while at the same time enabling the bottom mounting arm 18 to slide against the adjusting magnet 70 when a user presses the mounting arm 18 upward in order to secure an electronic device against the bottom of the can light fixture and ceiling.

The bottom component 40 of the central hub 12 may be secured to the top mounting arm 14 by a screw or pin (or other fastener) inserted through the pre-formed hole 62 on the side of the bottom component 40 of the central hub 12. This securement fixes the position of top mounting arm 14 with respect to the central hub 12. In contrast, the bottom mounting aim 18 is moveable, between an extended position and a compressed position in any desired increment, due to the bottom mounting arm 18 sliding within the mounting slot and against the adjusting magnet 70. In one embodiment, the top end of the bottom mounting arm 18 has a small projecting pin 80 (see FIG. 2), screw or hook (or other motion limiting structure) that catches on the top hub component 42 of the central hub 12, in order to prevent the bottom mounting arm 18 from being pulled completely through and out of the bottom of the mounting slot 64. In one embodiment, the top hub component 42 of the central hub 12 has a stopping cavity 82 (see FIGS. 3, 4, 13) formed in the bottom side of the hub component (which is therefore oriented upwardly when the top hub component is in place) such that the small projecting pin 80 may enter and then engage the bottom of the stopping cavity 82, thereby stopping and preventing further downward motion of the bottom mounting arm.

Figure 17:
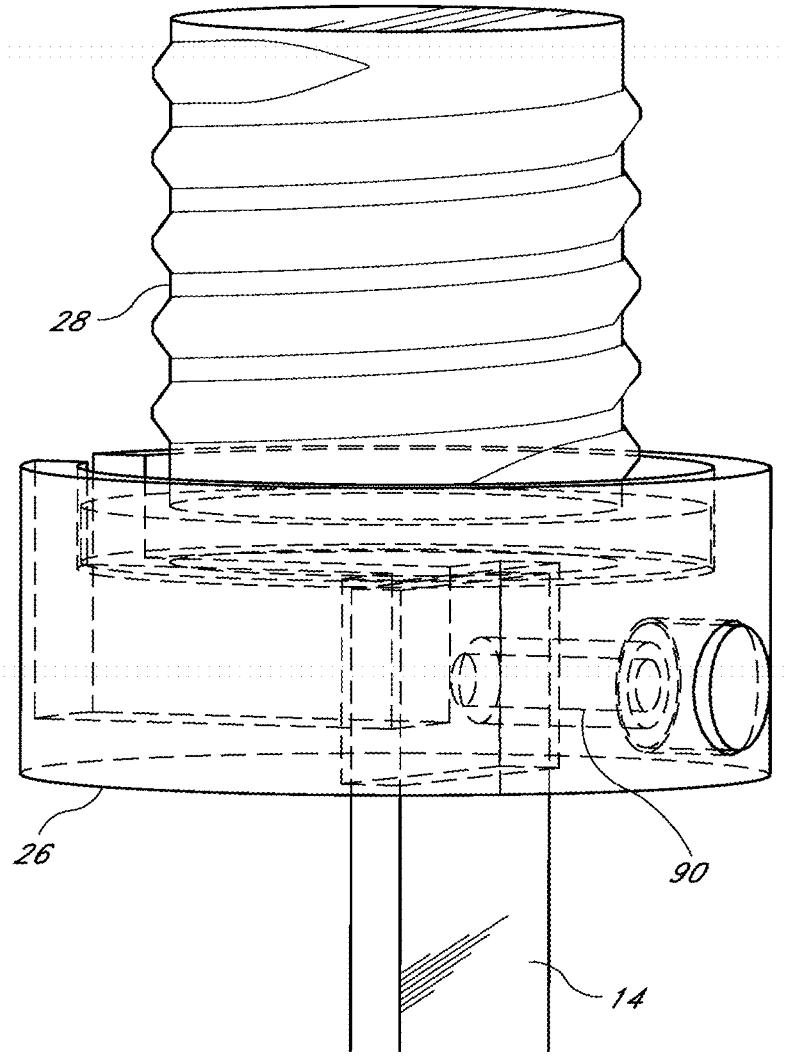
FIG. 17 depicts a transparent interior enlarged perspective view of the top hub and male socket connector.

As illustrated in FIG. 17, the top hub component 26 is affixed to the top mounting arm 14 by a screw or pin inserted through a pre-formed hole 90 in the side of the top hub component 26 and into a pre-drilled hole in the metal top mounting arm. A male light bulb socket 28 is affixed to the upper side of the top hub component 26, using glue screws or pins or other fastening technique. The male light bulb socket 28 has positive and negative electrical connections as normally found in conventional male light bulb sockets. However, the male light bulb socket 28 does not have any bulb or filament, and instead the positive and negative connections are connected to electrical wires (not shown) that can be directed through the bottom or sides of the top hub component 26 through pre-formed holes (not shown) and into the electronic device (e.g., LED driver in the LED driver compartment, or if the driver is mounted to the LED panel itself directly downward to the driver mounted to the LED panel). These electrical connections and wires serve to provide power to the electronic device for operation (e.g., to the LED driver so that the LED panel can be illuminated) when the mounting system is screwed into a conventional recessed light fixture.

Figure 18:
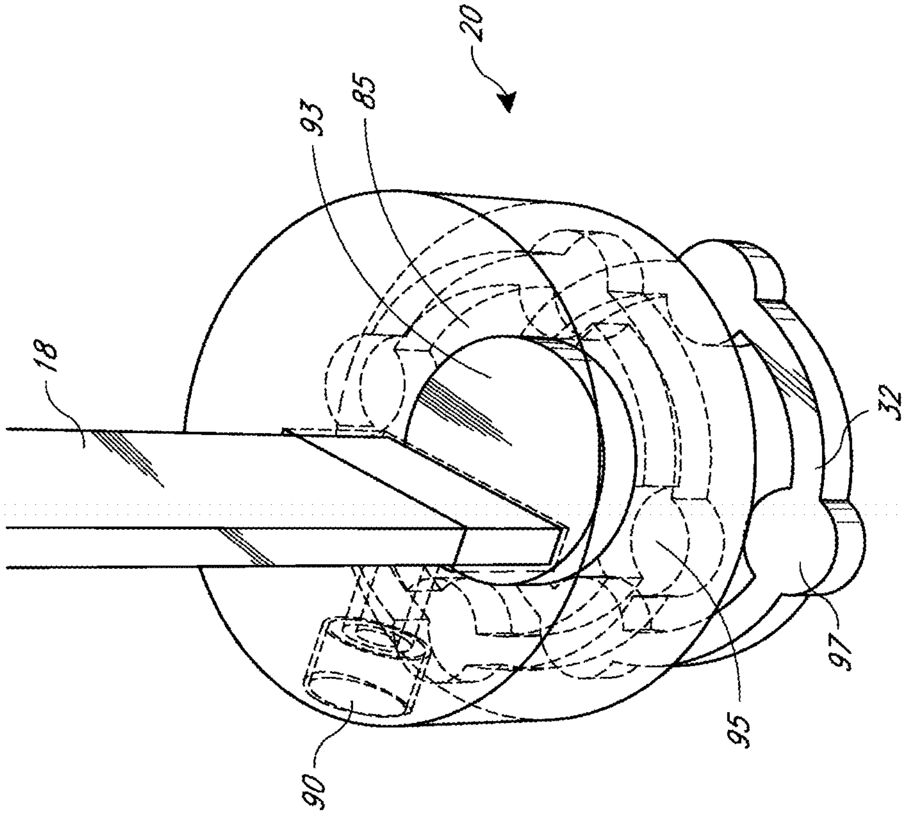
FIG. 18 depicts a transparent interior enlarged perspective view of the bottom hub and LED plate mounting apparatus.

As illustrated in FIG. 18, the bottom hub 20 is affixed to the bottom mounting arm 18 by a screw or pin or other fastener inserted through a pre-formed hole 90 in the side of the bottom hub 20 and into a pre-drilled hole or cavity in the metal bottom mounting arm. In one embodiment, the bottom hub 20 has a magnet mount cavity 85 in the bottom of the bottom hub 20. A flat cylindrical attachment magnet 93 is mounted into the magnet mount cavity 85. In some embodiments, the attachment magnet 93 is also a neodymium magnet similar to the adjustment magnet 70 discussed above. The attachment magnet 93 may be secured to the bottom hub 20 by either glue, or a tight, close-fit relationship (e.g., compression fit) between the magnet mount cavity 85 edges and the edges of the attachment magnet 93. The attachment magnet 93 is magnetically strong enough to strongly attract the metal base of the electronic device (e.g., the LED panel) and hold its weight in place when the mounting system is screwed into a can light and sufficient to resist sliding or spinning when screwed in place. The bottom hub 20 may also have a separate ring mounting cavity 95 configured to receive a mounting ring 32, with round stops 97, that is affixed to the electronic device so that the close-fit relationship of the round stops 97 of the mounting ring 32 and the ring mounting cavity 95 serve to prevent rotation of the electronic device when it is mounted and screwed into place in a can light fixture.

Figure 19:
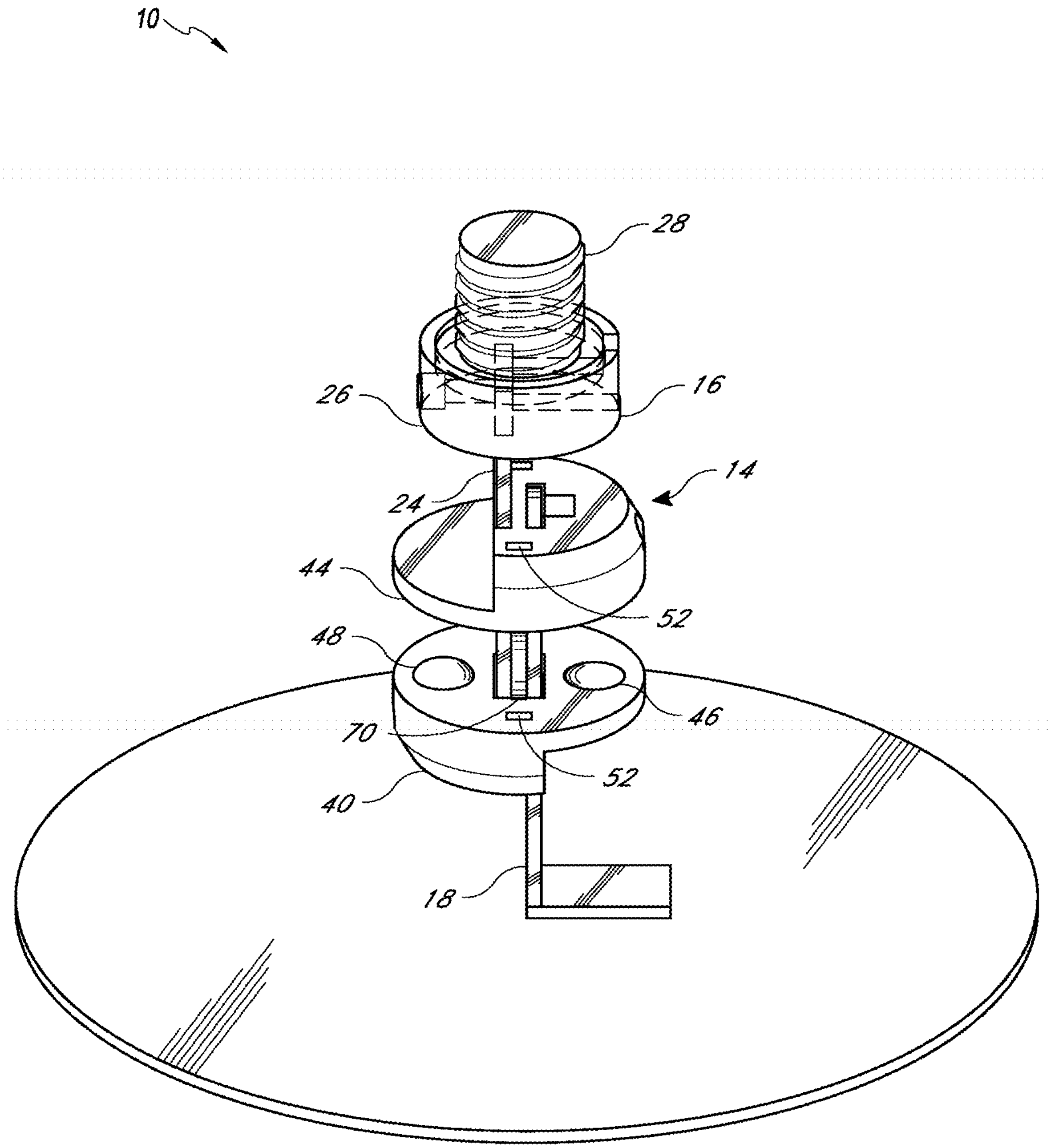
FIG. 19 depicts a simplified assembly view of an embodiment of the mounting system, with an alternate embodiment LED mount affixed to an LED panel.

Finally, as shown in FIG. 19, the bottom mounting arm 18 may include a simple flange mount that can be glued to, or secured by screws to, the electronic device (e.g., an LED panel plate).

As for manufacture and assembly, it will be appreciated, based on the foregoing disclosure and drawings, that the design of the two central hub components as identical and interlocking will simplify manufacture and assembly of the device. It will also be appreciated that the plastic hub components of the mounting system can be manufactured using a variety of known techniques, including injection molding. The described hub components can also be readily manufactured with 3-D printing. The metal and magnetic parts can be easily and quickly assembled by low-skill assembly workers or machinery.

When used, a user attaches the electronic device (e.g., LED panel) to the bottom mount using the mounting ring, a mounting magnet, or both. The user then attaches the LED driver (when used) or other electrical connections to the electronic device, typically by a simple male-female plugging-in action. The user then extends the bottom mounting arm downward to its fullest extended position. Then user then screws the male light bulb socket of the top mounting hub 16 into a female light bulb socket (e.g., in a can light fixture) by rotating the whole mounting system, with electronic device (e.g., LED panel) attached. This action is similar in nature to the twisting action consumers are familiar with to replace existing light bulbs, and requires no wire cutting, wire splicing, drilling or turning off of the power at the circuit breaker. Then, the user pushes the LED panel upward, thereby causing the bottom mounting arm 18 to slide upward relative to the adjusting magnet 70 and the central hub 12, until the electronic device (e.g., LED panel) is snugly fit against the trim or ceiling as desired.

In other embodiments, the bottom mounting arm 18 is rigidly affixed to the central and bottom hubs 12, 20, and the central hub 12 slides along the upper arm 23 to expand or compress the mounting system 10. The adjustment magnet 70 provides sufficient pulling force against one or both mounting arms 14, 18 to allow the user to push or pull the electronic device upwardly or downwardly with respect to the top hub 16 to adjust the overall length of the mounting system 10, while also providing enough holding force to prevent the electronic device from moving downwardly under the force of gravity once installed. The adjustment magnet strength and/or encapsulation may be selected to provide the appropriate balance of movement and resistance based upon the weight of the electronic device attached to the mounting system 10. The encapsulation material, thickness, texture, etc. may also be selected (when encapsulation is provided with the adjustment magnet 70) to provide the balance of movement and resistance, as well.

Referring now to FIGS. 20-40, in various embodiments a mounting system is provided for use in securing an electronic device (e.g., any of the electronic devices discussed above, an LED light, such as a flat panel LED, including but not limited to an "edge-lit" LED panel, or any other electronic device), to a light fixture, such as an incandescent recessed light fixture. As used in the industry and herein, a recessed light fixture is also referred to as a "can light fixture." As depicted in FIGS. 20-40, the mounting system 110 generally includes a barrel 112, a mounting sleeve 114, a locking ring 116, a top cap 118, and an upwardly projecting male light bulb socket 120. The male light bulb socket 120 is affixed to, or secured by, the top cap 118. The mounting system 110 is generally sized to fit within the diameter and circumference of can light fixtures. The male lightbulb socket 120 may have electrical connection wires, not shown, extending downwardly therefrom, for connection to electronics, such as an LED driver or LED panel, or other electronics. These electrical connection wires pass through the barrel 112. In one embodiment, the electronics (e.g., LED driver) is located within the barrel 112, and additional electrical connection wires pass from the electronics down through the mounting sleeve 114 and into another electronic device (e.g., an LED panel light). In another embodiment, in which the LED driver is located on the LED panel, the electrical connection wires may pass through the mounting sleeve 114 for connection outside of the mounting system 110. In one embodiment, in which the LED driver is located on the LED panel, and the LED panel has a standard male light bulb socket already in place (not shown) the electrical connection wires are connected directly between the male light bulb socket 120 and a female light bulb socket 122 (see FIGS. 22-23) that is rigidly affixed inside of the bottom portion of the mounting sleeve 114. Although the following discussion describes the electronic device as an LED panel light, the following embodiments may be applied to any electronic device, including any electronic device described above with respect to FIGS. 1-19.

Figure 20:
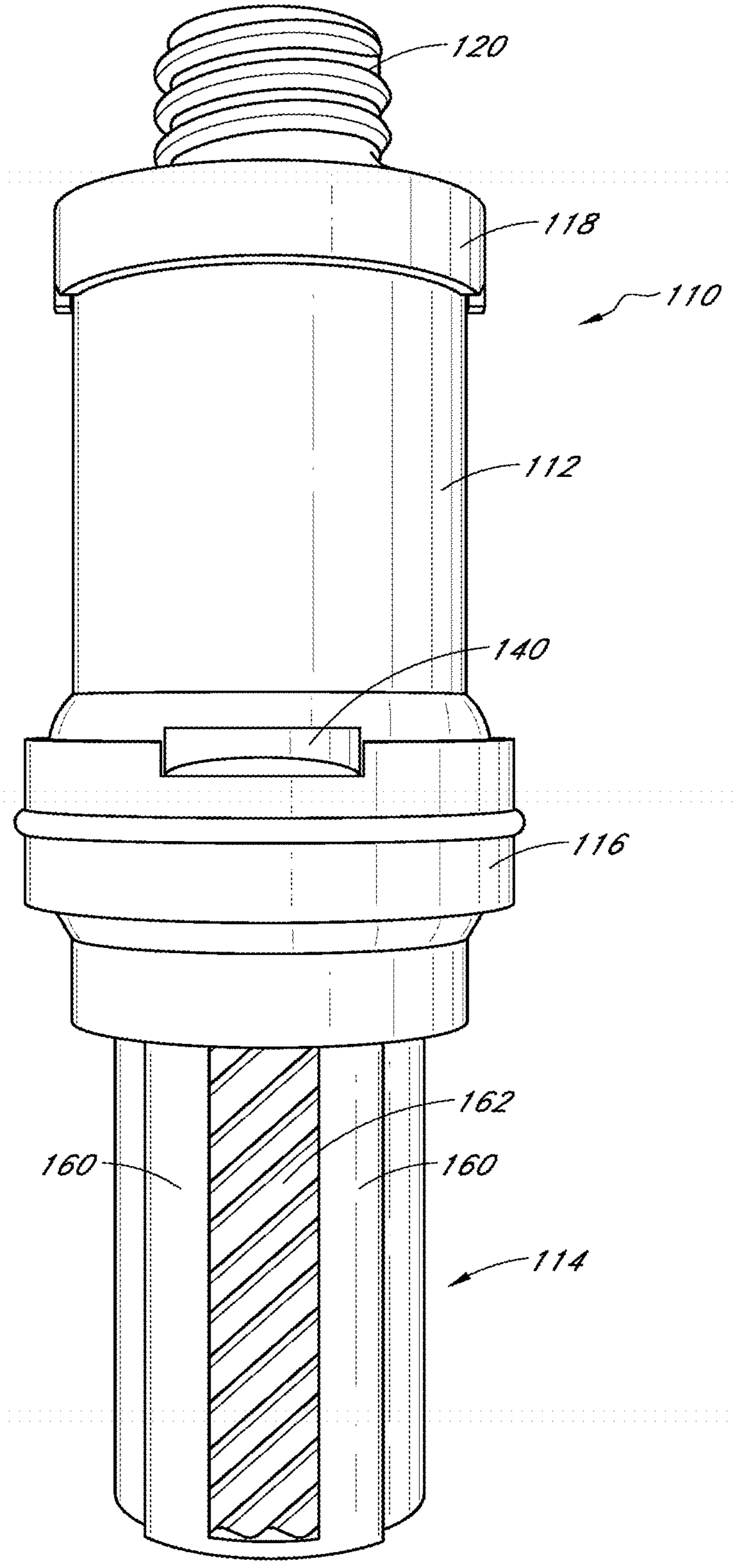
FIG. 20 depicts a front view of an embodiment of a mounting system, with the mounting sleeve shown in a fully extended position.
Figure 21:
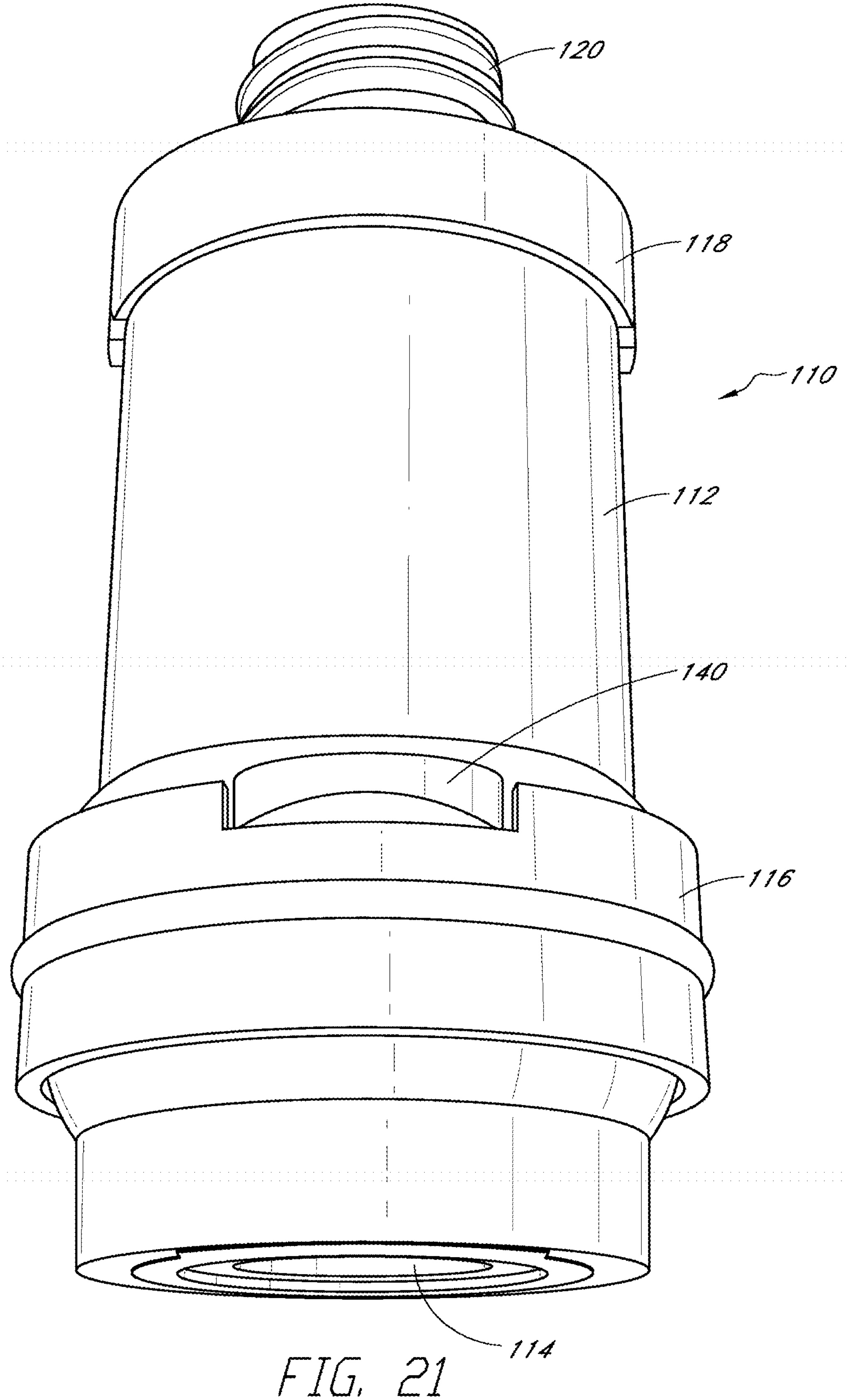
FIG. 21 depicts a front perspective view of an embodiment of the mounting system, with the mounting sleeve in a fully compressed position.

The mounting sleeve 114 fits within the barrel 112 and is moveable between an extended position as show in FIG. 20 and a compressed position as shown in FIG. 21. In one embodiment, the mounting sleeve 114 may be set to a plurality of intermediate positions between the fully extended and fully compressed positions shown in FIGS. 20 and 21. As described further below, the locking ring 116 is removable. When in place, the locking ring 116 engages both the barrel 112 and the mounting sleeve 114. As described further below, the locking ring uses a ratchet and pawl type structure that allows the mounting sleeve to be moved upwardly, toward the compressed position, but prevents the mounting sleeve from moving downwardly toward the extended position. This one-way adjustability of the length of the mounting system allows it to be easily used in can light fixtures of various lengths, as the bottom of the mounting sleeve 114 may be quickly and easily attached to an LED panel light, and then, when the mounting system 110 has been secured to the can light fixture, the mounting sleeve 114 may be moved upwardly using its one-way adjustability to secure the LED panel light tightly against the bottom of the can light fixture and the surrounding ceiling structure.

In use, the mounting system 110 is attached to an incandescent can light fixture by screwing the male light bulb socket 120 into a female light bulb socket of the incandescent can light fixture (not shown). The mounting system 110 is attached to an LED panel at the bottom of the mounting sleeve 114. In one embodiment, a female light bulb socket 122 is rigidly affixed inside the mounting sleeve 114. An LED panel light (not shown) that has an upwardly projecting male light bulb socket can be simply screwed into the female light bulb socket 122.

Alternatively, the bottom edge of the mounting sleeve 114 can be secured to an LED panel light by screws, a mounting bracket, glue, or other readily understood fastening means.

FIGS. 22-37 show an embodiment of the mounting system 110 in further detail, both in assembled and disassembled views. In the embodiment shown, the barrel 112, mounting sleeve 114 and locking ring 116 interact to enable the mounting system 110 to hold very heavy loads, likely up to 120 pounds, but still allow the mounting sleeve, and any LED panel or other component attached to it, to be adjusted upwardly, using the one-way adjustability feature resulting from the structure described further as follows.

The barrel 112 is generally hollow. The inside diameter of the barrel 112 includes two opposed shoulders 124, 126, on the left and right sides of the barrel 112, thus forming two opposed interior grooves 128, 130 on the back and front insides of the barrel 112. The inside diameter of the barrel 112 also includes a projecting stop 132. The barrel 112 also has an engagement window 134 on the front side of the barrel 112. The engagement window 134 is centered on a locking groove 136, which is formed into a locking bulge 138, on the outer face of the barrel 112. The barrel 112 also has an orientation tab 140 projecting outwardly from the top of the locking bulge 138. The barrel 112 also has a plurality of, and in some embodiments, three, top cap orientation tabs 142, 144, 146.

The mounting sleeve 114 is generally hollow. The mounting sleeve 114 has a top 148 and bottom 150. Near the bottom 150 of the mounting sleeve 114, a female light bulb socket 122 is affixed into the interior diameter of the mounting sleeve 114. The female light bulb socket 122 may be affixed by generally known means, such as glue or press-mounting. In one embodiment, the interior diameter of the bottom of the mounting sleeve 114 has a lip or flange that engages the edge of the female light bulb socket 122 to hold the female light bulb socket 122 in place and prevent it from moving downwardly. The back side of the mounting sleeve 114 has two lands 152, 154, running the full length of the mounting sleeve 114. These lands 152, 154 are split by a slot 156 running from the bottom 150 of the mounting sleeve 114 most of the way to the top 148 of the sleeve. However, a horizontal top land 158 is present at the top 148 of the mounting sleeve 114, cutting off the slot 156. The front of the mounting sleeve 114 has a front land 160 running the full length of the mounting sleeve 114. The front land 160 has, indented into it, a plurality of laddered ratchet teeth 162. Each of the laddered ratchet teeth 162 is angled at approximately 45 degrees with respect to the length of the mounting sleeve 114. Further, each of the laddered ratchet teeth has a top face 164 and a bottom face 166. The top face 164 of each of the laddered ratchet teeth 162 is angled inwardly and upwardly toward the top 148 of the mounting sleeve 114 at approximately 45 degrees. The bottom face 166 of each of the laddered ratchet teeth 162 is angled inwardly, but not downwardly, making the bottom face 166 of each of the laddered ratchet teeth 162 perpendicular to the plane of the front land 160.

Figure 24:
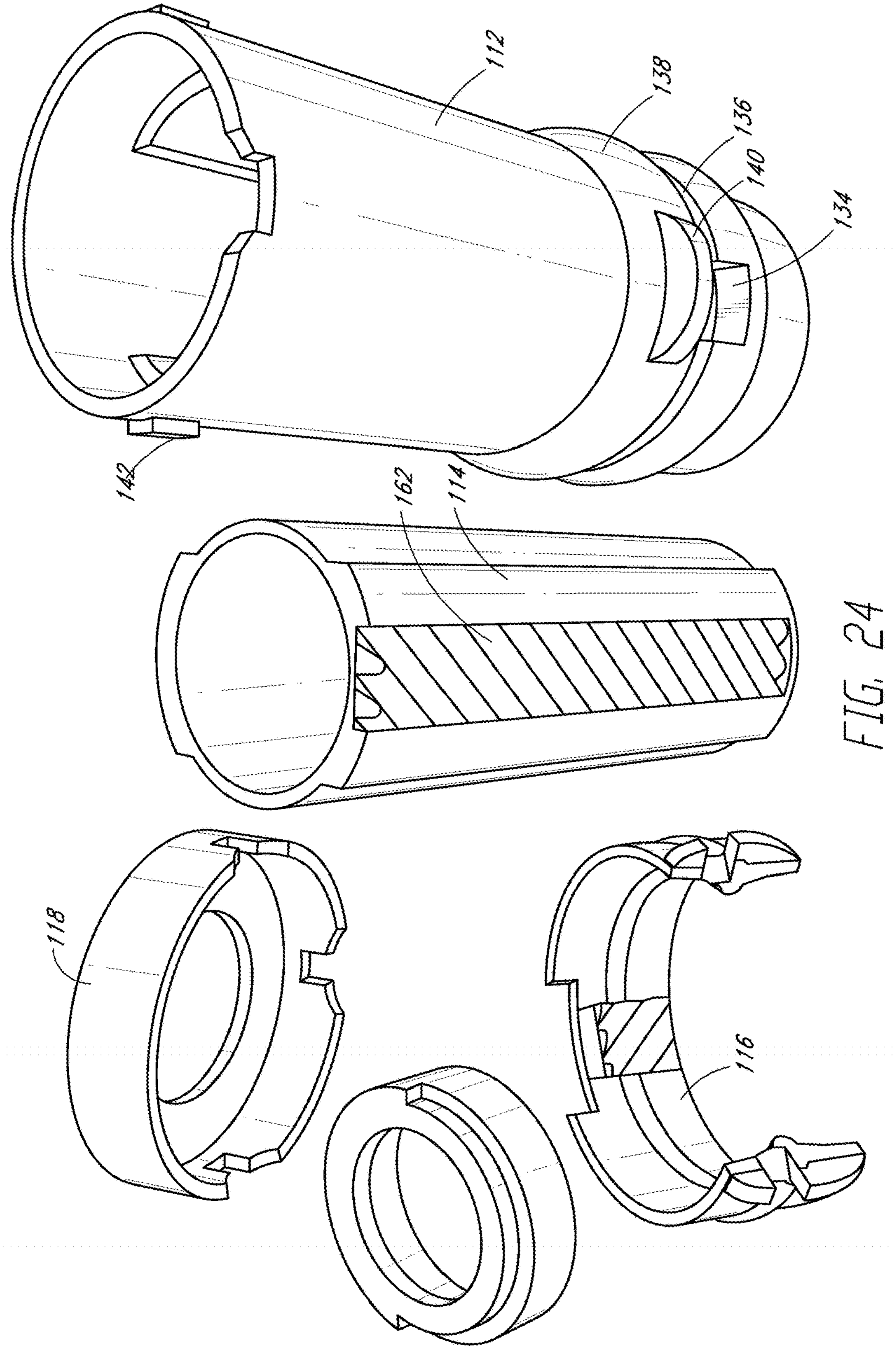
FIG. 24 depicts a top perspective view of each of the separated non-electrical components of an embodiment of the mounting system.
Figure 25:
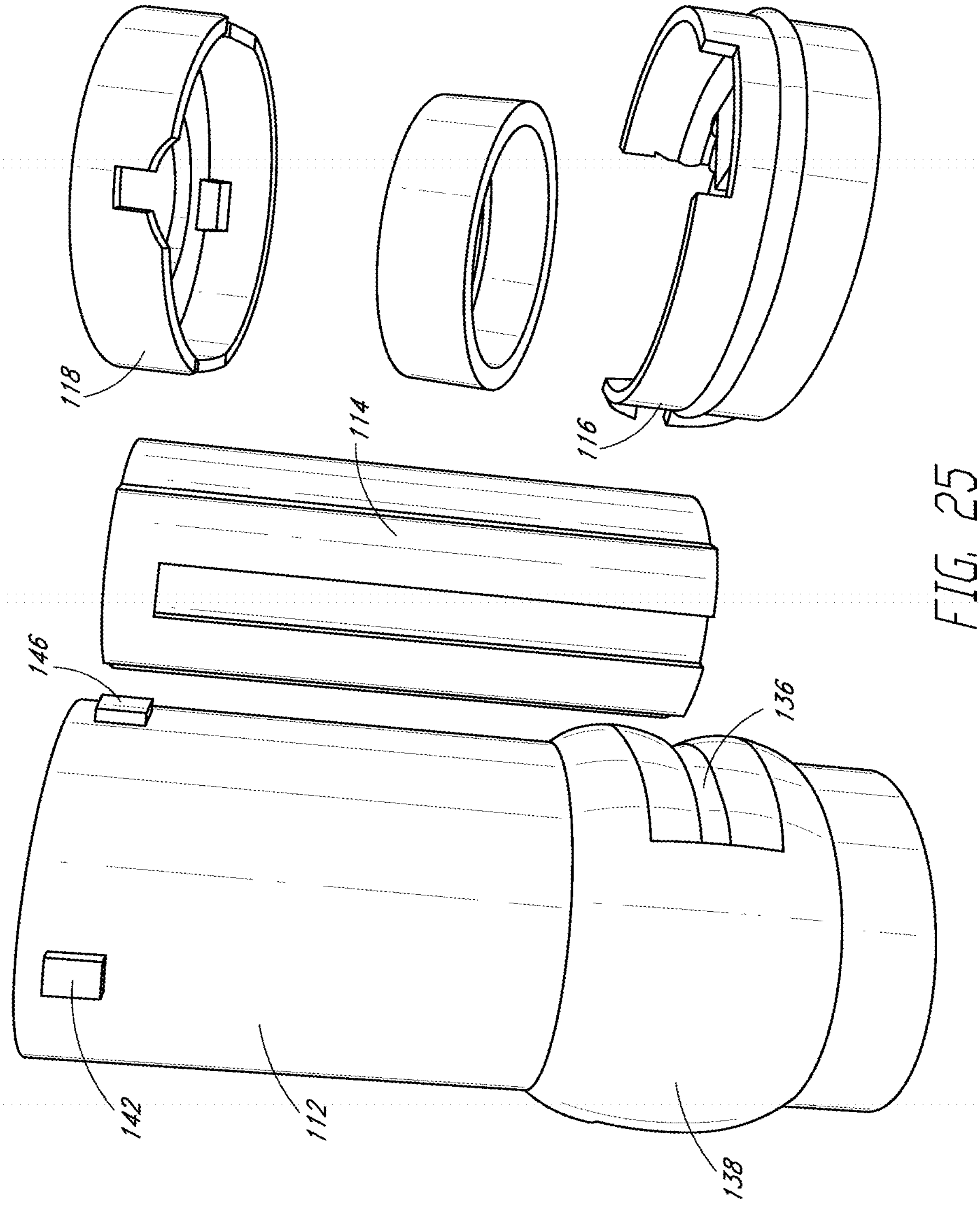
FIG. 25 depicts a left side perspective view of each of the separated non-electrical components of an embodiment of the mounting system.
Figure 26:
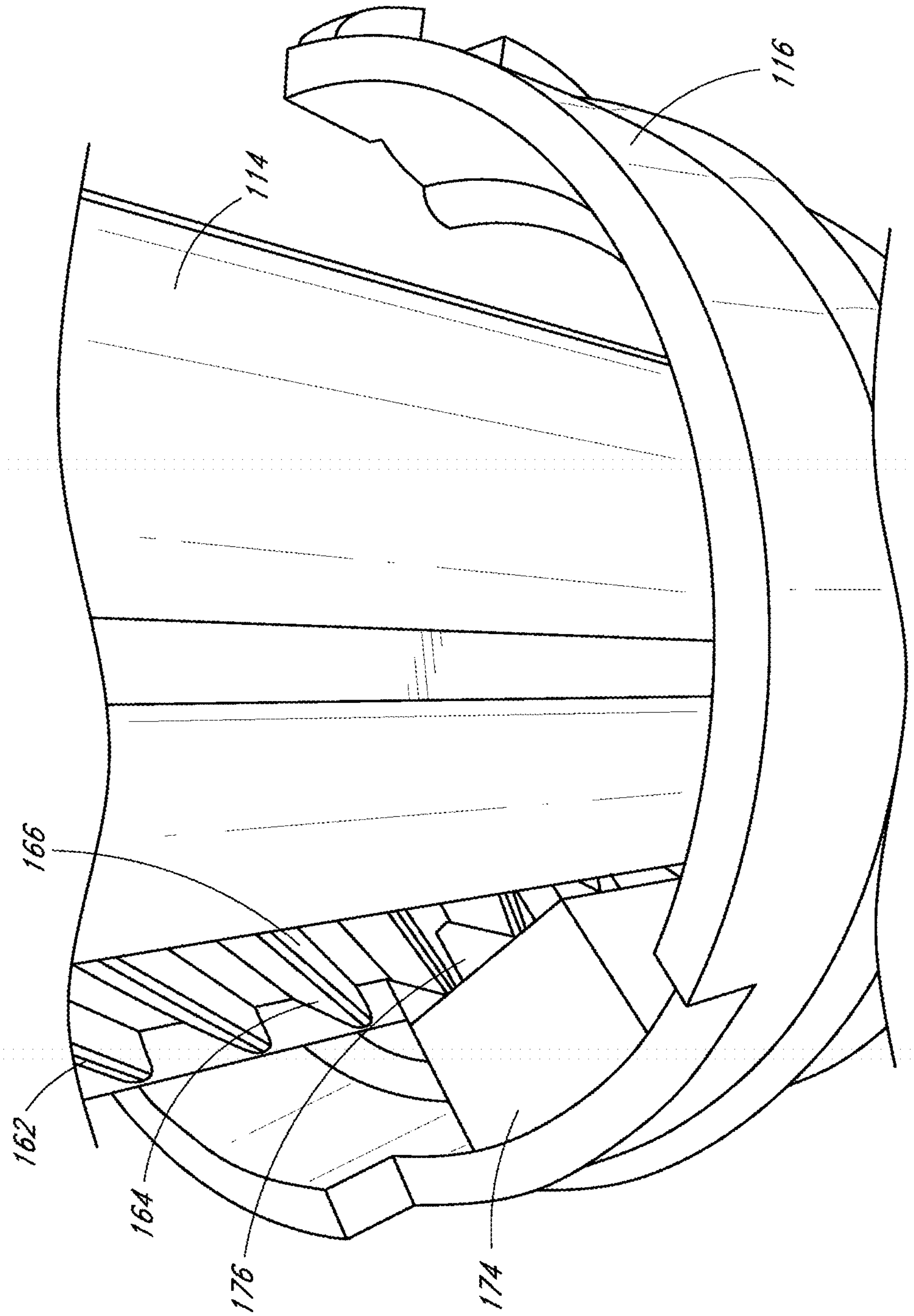
FIG. 26 depicts an enlarged top perspective view of the locking ring and the mounting sleeve of an embodiment of the mounting system.
Figure 27:
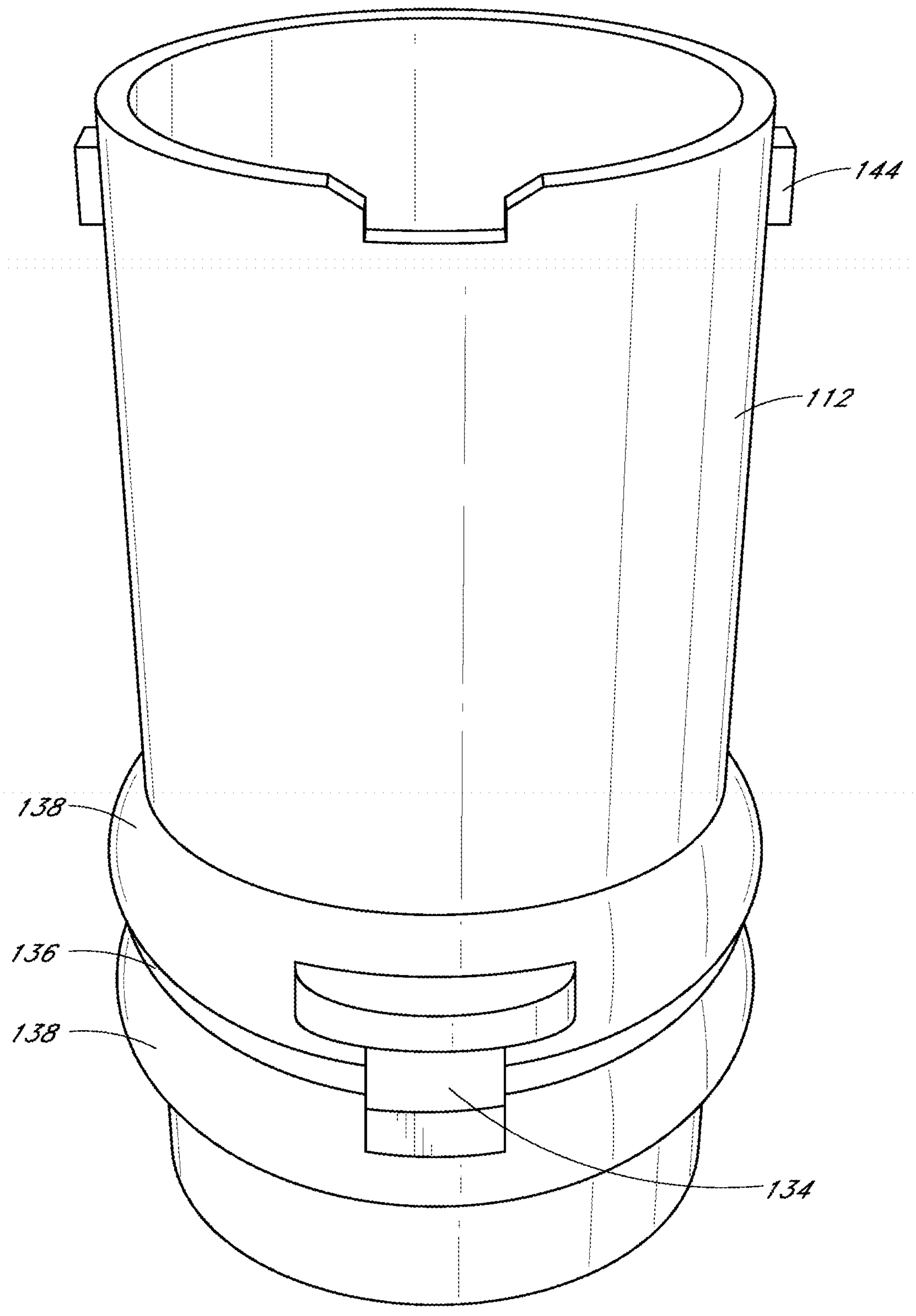
FIG. 27 depicts a front top perspective view of the barrel of an embodiment of the mounting system.
Figure 28:
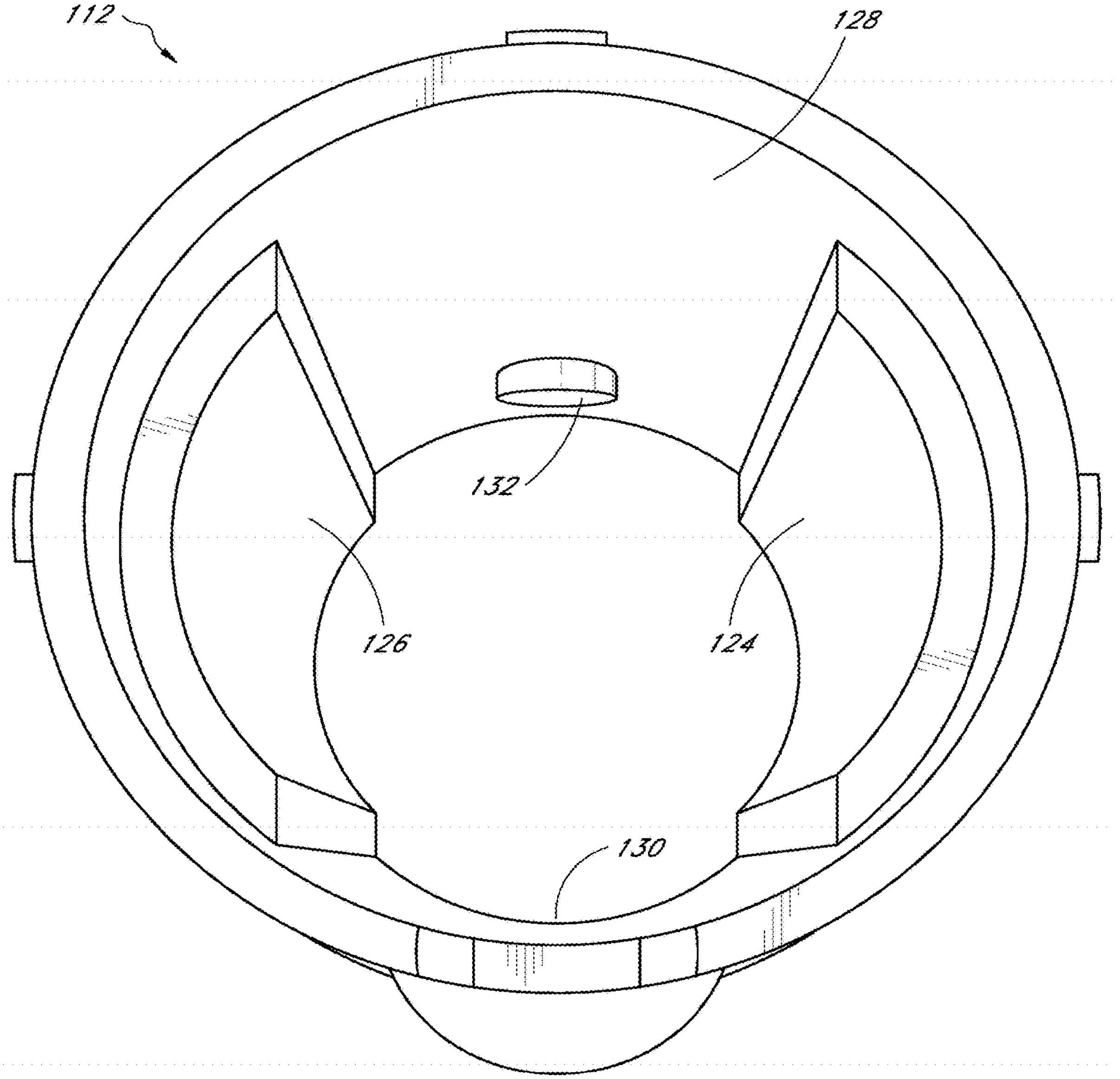
FIG. 28 depicts a top perspective view of the barrel of an embodiment of the mounting system.
Figure 29:
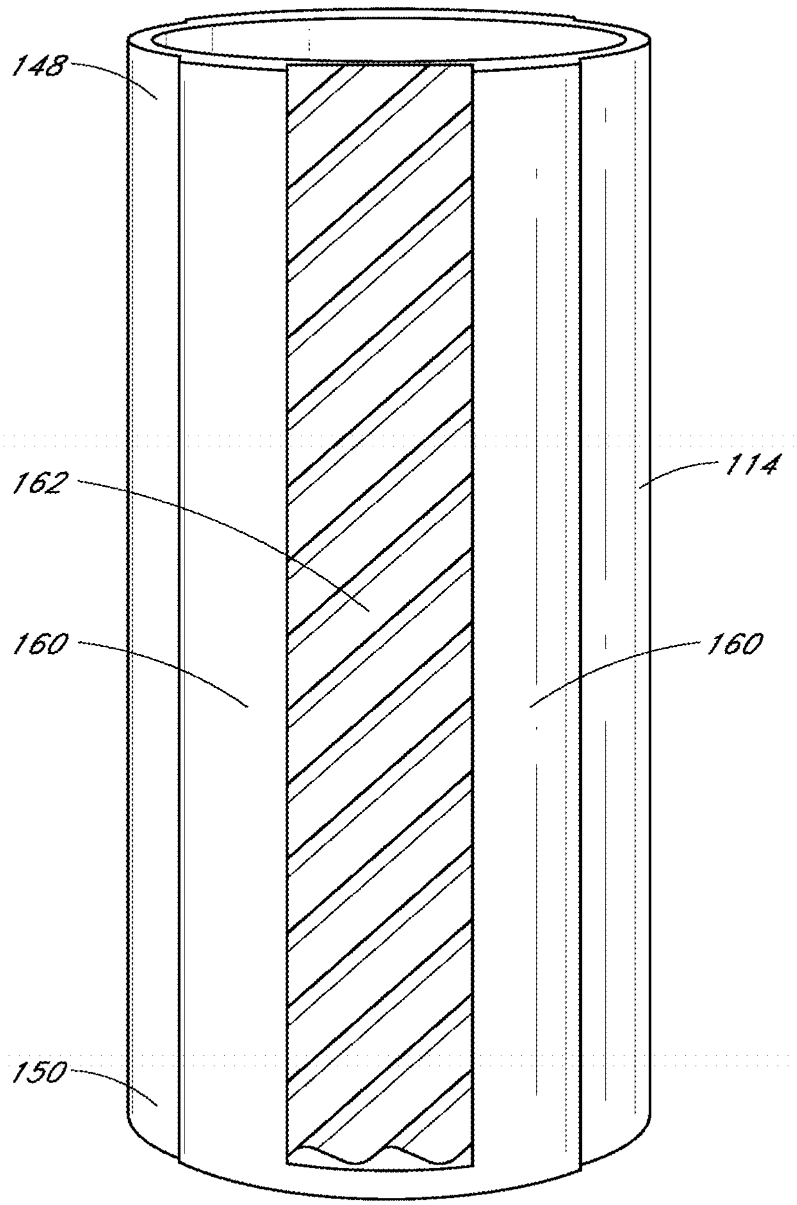
FIG. 29 depicts a front perspective view of the mounting sleeve of an embodiment of the mounting system.
Figure 30:
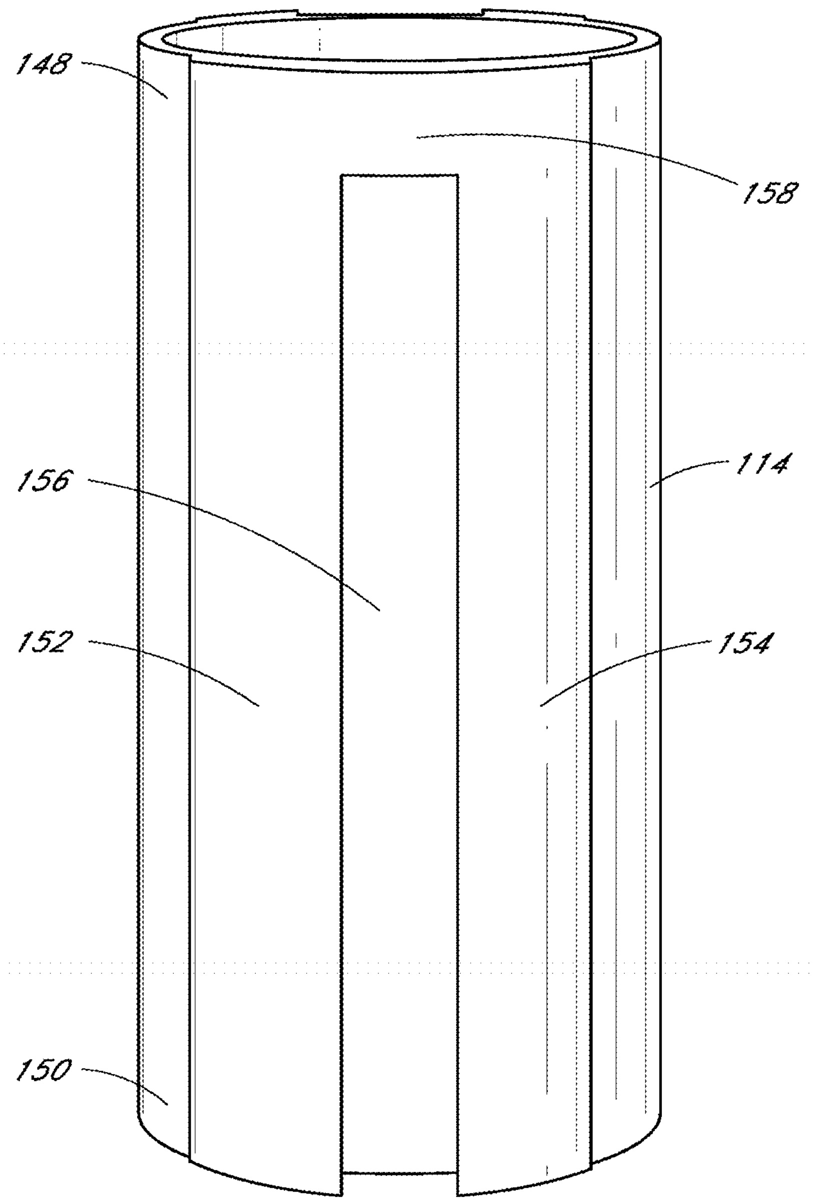
FIG. 30 depicts a rear perspective view of a the mounting sleeve of an embodiment of the mounting system.
Figure 31:
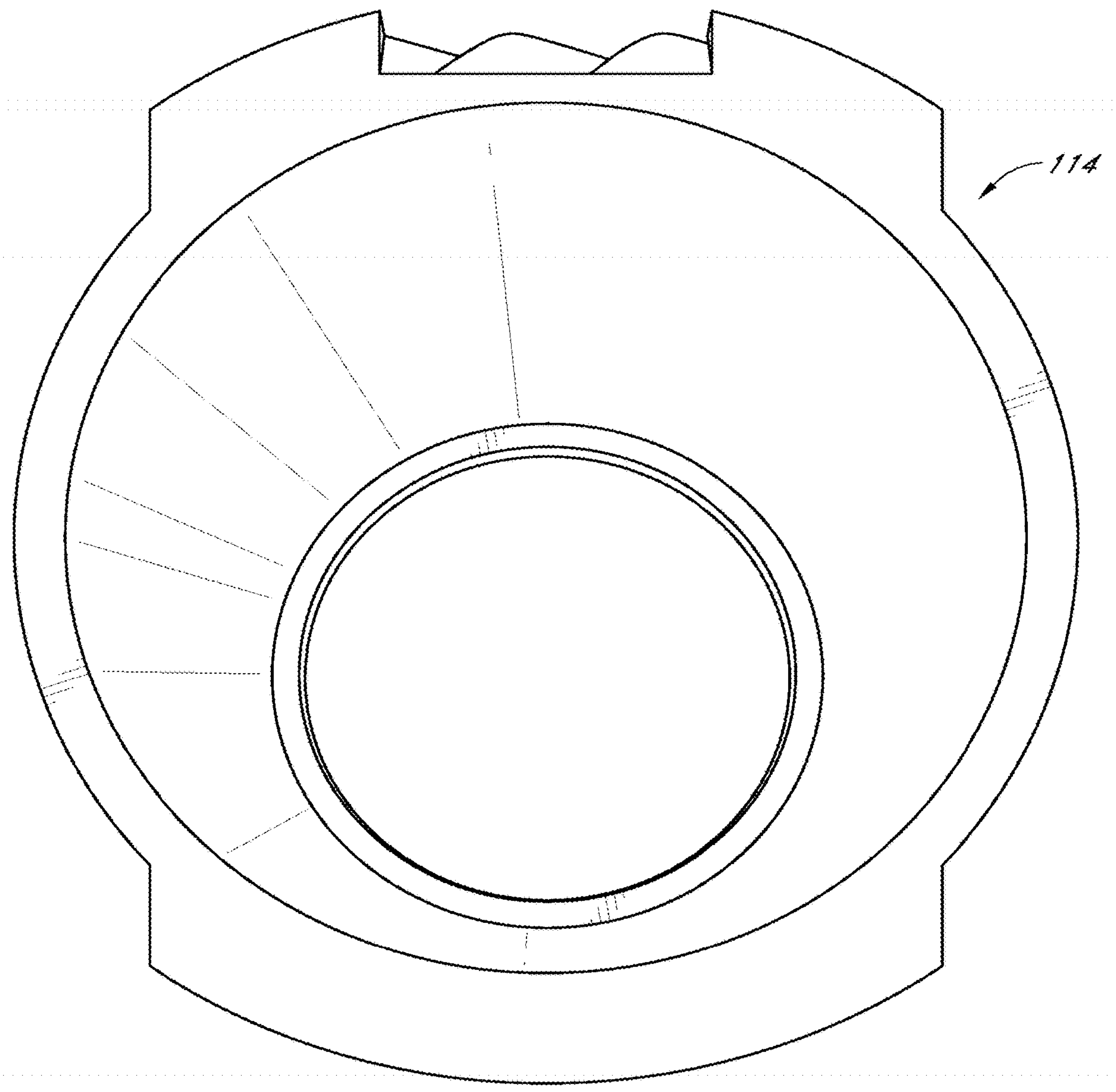
FIG. 31 depicts a top perspective view of the mounting sleeve of an embodiment of the mounting system.

This configuration of the laddered ratchet teeth 162 on the front land 160 is illustrated throughout the drawings, but with particular detail in FIGS. 24 and 26.

Figure 32:
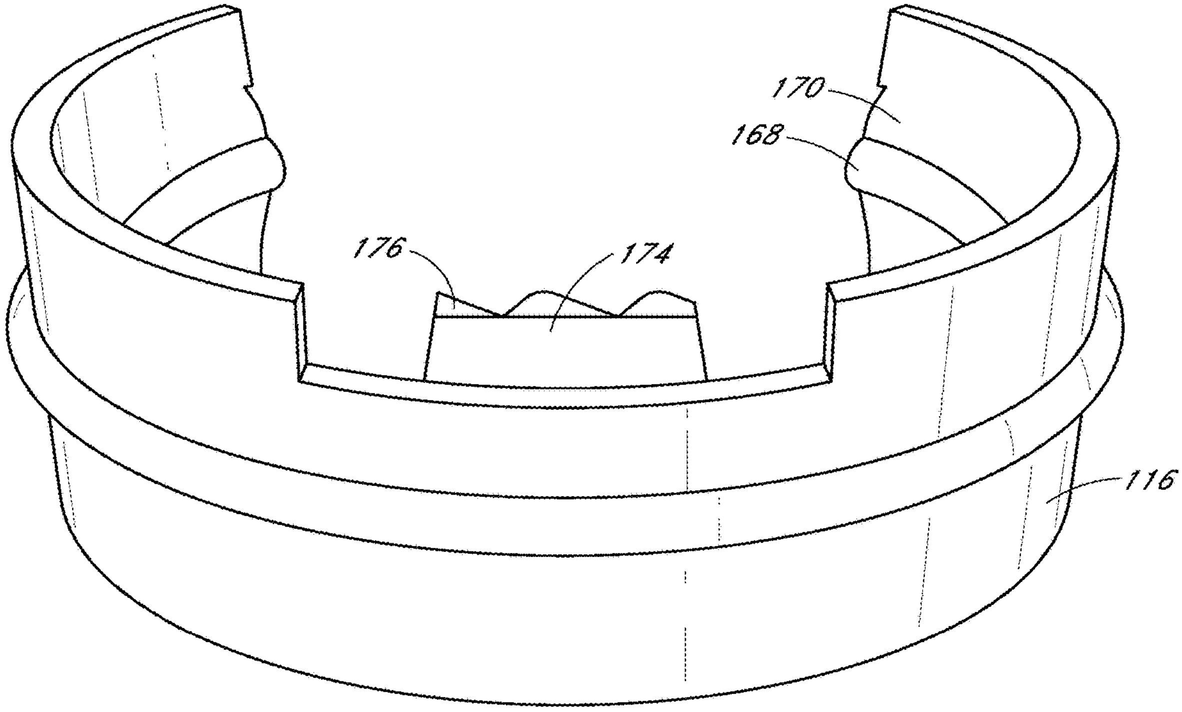
FIG. 32 depicts an enlarged front perspective view of the locking ring of an embodiment of the mounting system.
Figure 33:
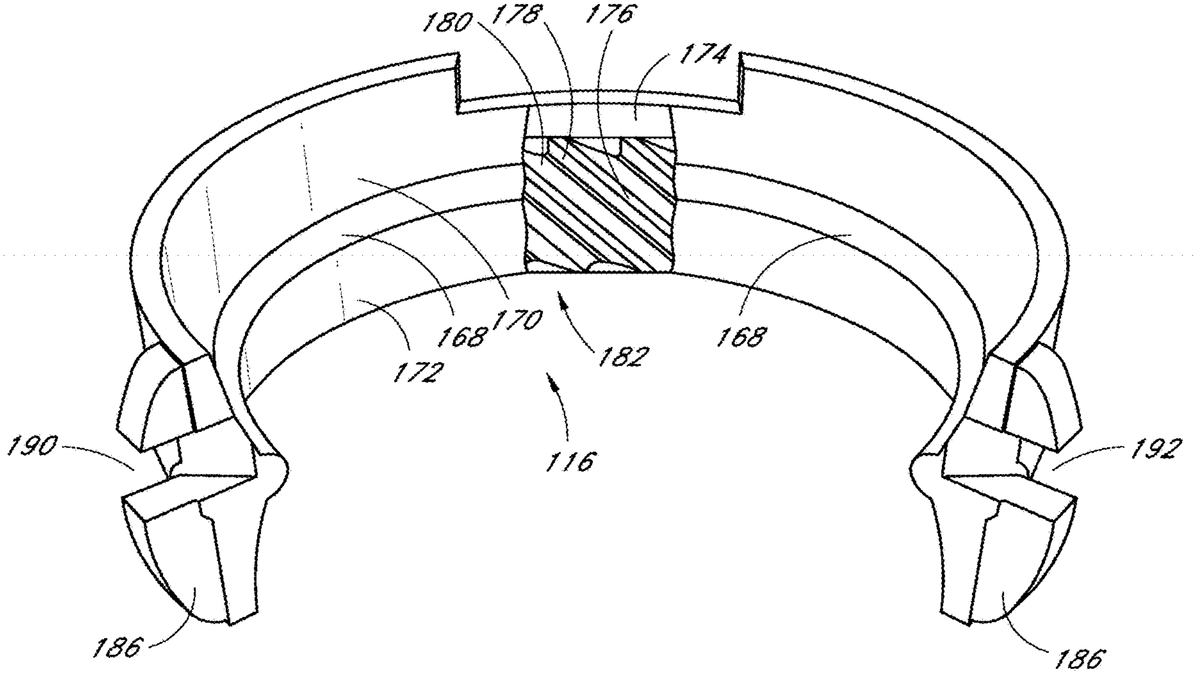
FIG. 33 depicts an enlarged rear perspective view of the locking ring of an embodiment of the mounting system.

As illustrated throughout the drawings, but most particularly in FIGS. 32-33, the locking ring 116 comprises a semi-circular ring that has a radius of curvature of approximately the same radius of curvature as the locking bulge 138 of the barrel 112. In the embodiment shown, the locking ring 116 has a circumference of three-quarters of the circumference of locking bulge 138 of the barrel 112. The remaining one-quarter circumference of the locking ring 116 is left open, to enable the locking ring 116 to be locked onto, and removed from, the locking bulge 138. As explained further below, while this one-quarter to three-quarters ratio is, in one embodiment, the locking ring 116 may be either a more complete semi-circle, or a little as slightly over half a circle. The locking ring 116 has a rounded land 168 projecting outwardly from and encircling most of the inner diameter of the locking ring 116. In one embodiment, the inside diameter of the locking ring 116 is sloped inwardly on the top and bottom sides 170, 172 of the rounded land 168. The locking ring also has an engagement block 174 projecting inwardly from the inside diameter. The engagement block 174 is approximately the same shape and size as the engagement window 134 of the barrel 112. The engagement block 174 further comprises a plurality of engagement teeth 176 projecting inwardly from the inside face 178 of the engagement block 174. The engagement teeth 176 each have a top face 178 and a bottom face 180. The bottom face 180 of each of the engagement teeth 176 is angled inwardly and downwardly toward the bottom 182 of the engagement block 174 at approximately 45 degrees. The top face 178 of each of the engagement teeth 176 is angled inwardly, but not downwardly, making the top face 178 of each of the engagement teeth 176 perpendicular to the plane of the inside face 178 of the engagement block 174. Above the engagement block 174, the locking ring 116 has an orientation cut-out 184. The locking ring 116 also has, at each end, a gripping tab 186. Each gripping tab 186 has a tie-off cut-out 190, 192 at the same relative height, respectively.

As illustrated throughout the drawings, but most particularly in FIGS. 20, 22, 36, and 37, the top cap 118 is configured to fit over the top of the barrel 112 and secure the male light bulb socket 120 in place. The top cap 118 has an inside diameter that is slightly greater than the outside diameter of the barrel 112, so that the top cap 118 can fit over and be secured to the outside of the barrel 112. The top cap 118 has a plurality, and in one embodiment, three, orientation slots 196, 198, 200. Each top cap orientation slot 196, 198, 200 is sized and placed to accommodate a top cap orientation tab 142, 144, 146 of the barrel 112. The interaction of the top cap orientation tabs 142, 144, 146 and slots 196, 198, 200, when engaged with one another, prevents rotation of the top cap 118, and therefore prevents rotation of the male light bulb socket 120, when the mounting system 110 is in use. As explained further below, the interaction of the top cap orientation tabs 142, 144, 146 and slots 196, 198, 200 also serves to aid assembly of the mounting system 110 by properly positioning the top cap 118. It will be appreciated that other structures and techniques may be used to secure the male light bulb socket 120 in place with respect to the barrel, including crimping machines, glue, screws or pins. The top cap 118 also has, at its inside diameter, a front orientation tab 208.

Figure 22:
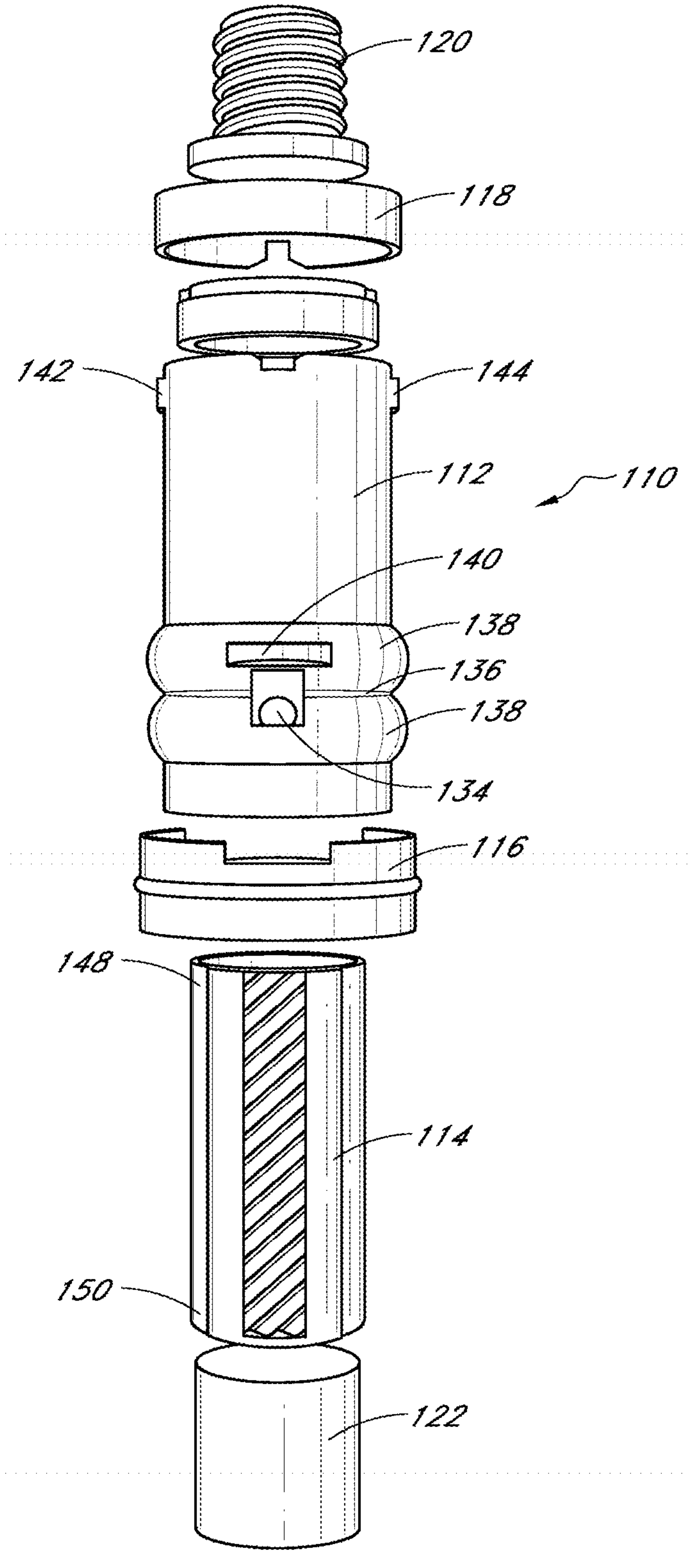
FIG. 22 depicts a front assembly view of an embodiment of the mounting system.
Figure 23:
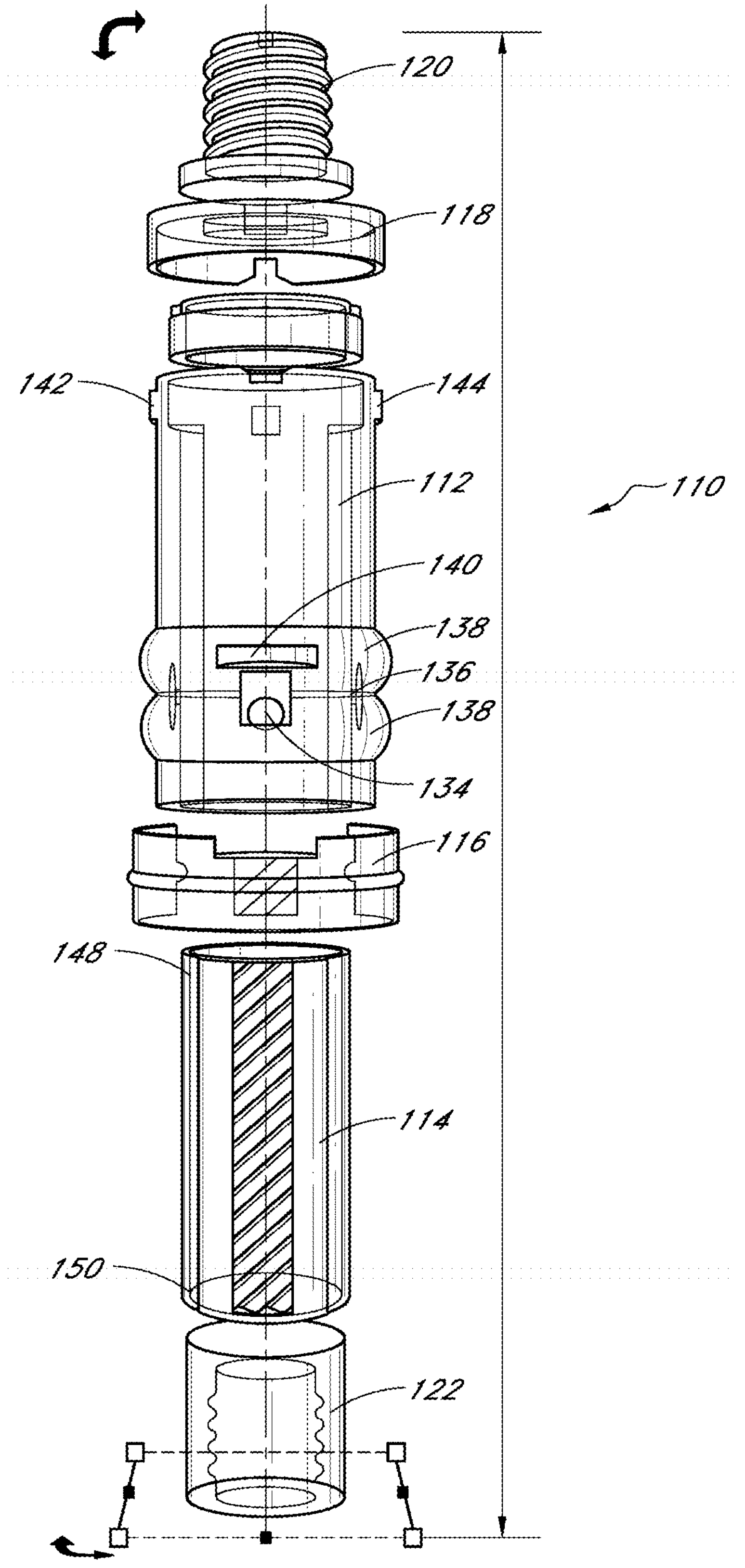
FIG. 23 depicts a transparent interior front assembly view of an embodiment of the mounting system.
Figure 34:
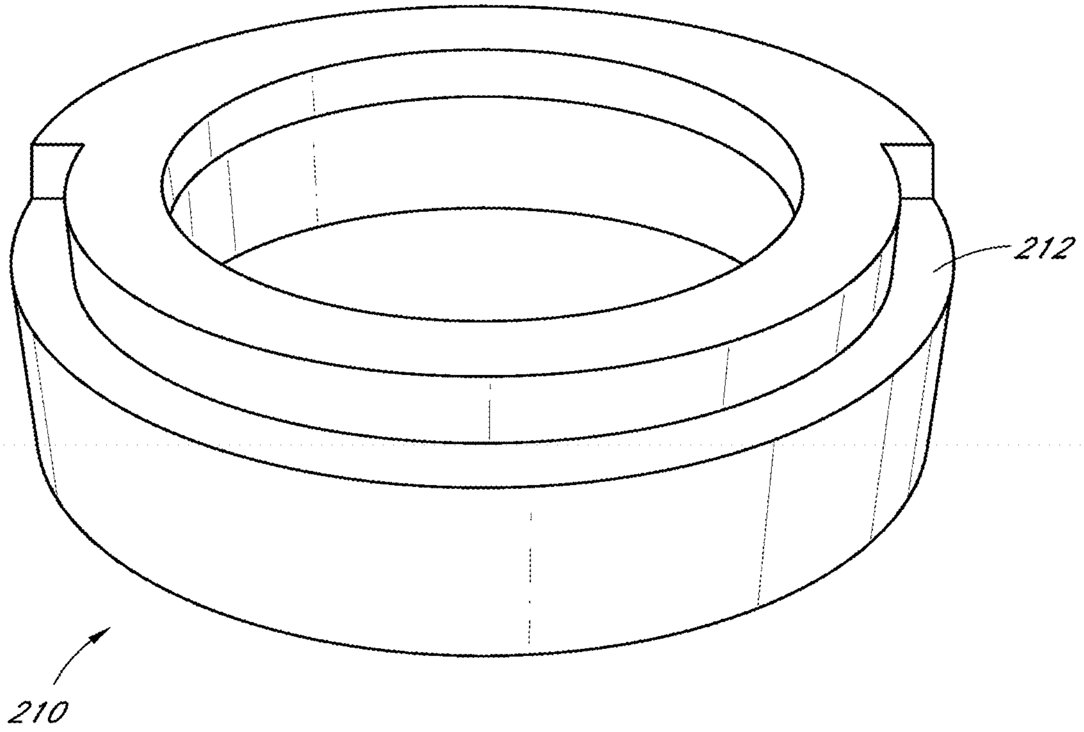
FIG. 34 depicts an enlarged front perspective view of the interior support ring of an embodiment of the mounting system.
Figure 35:
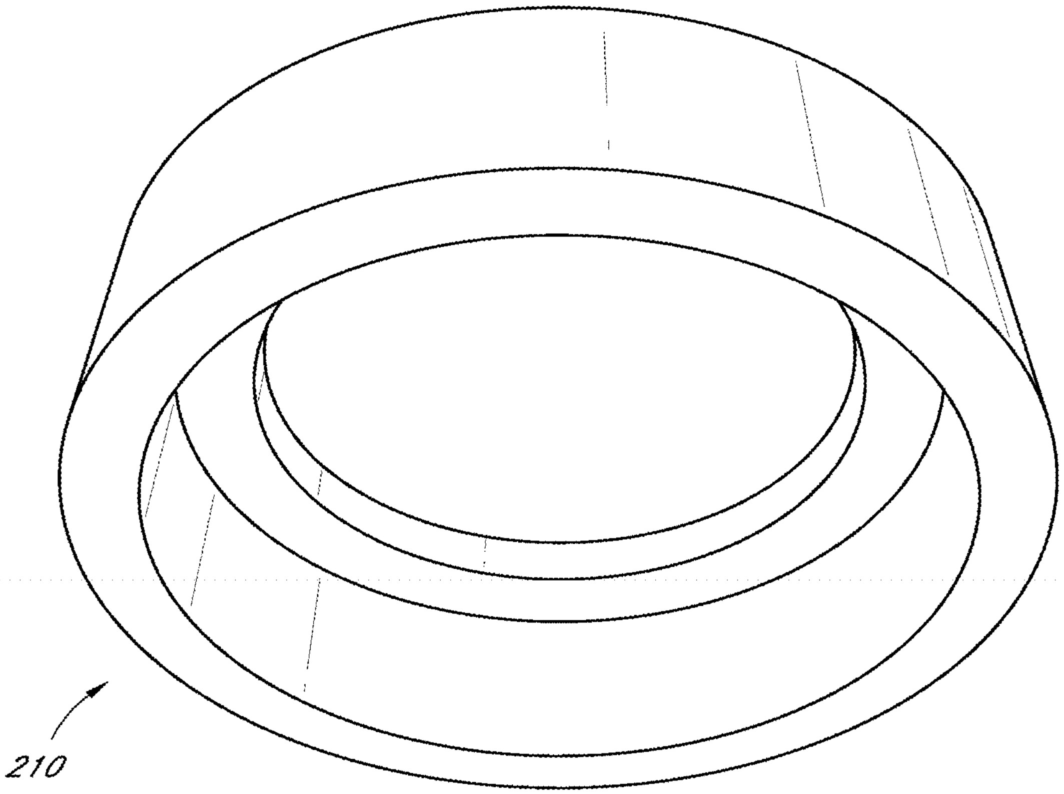
FIG. 35 depicts a bottom perspective front view of the interior support ring of an embodiment of the mounting system.
Figure 36:
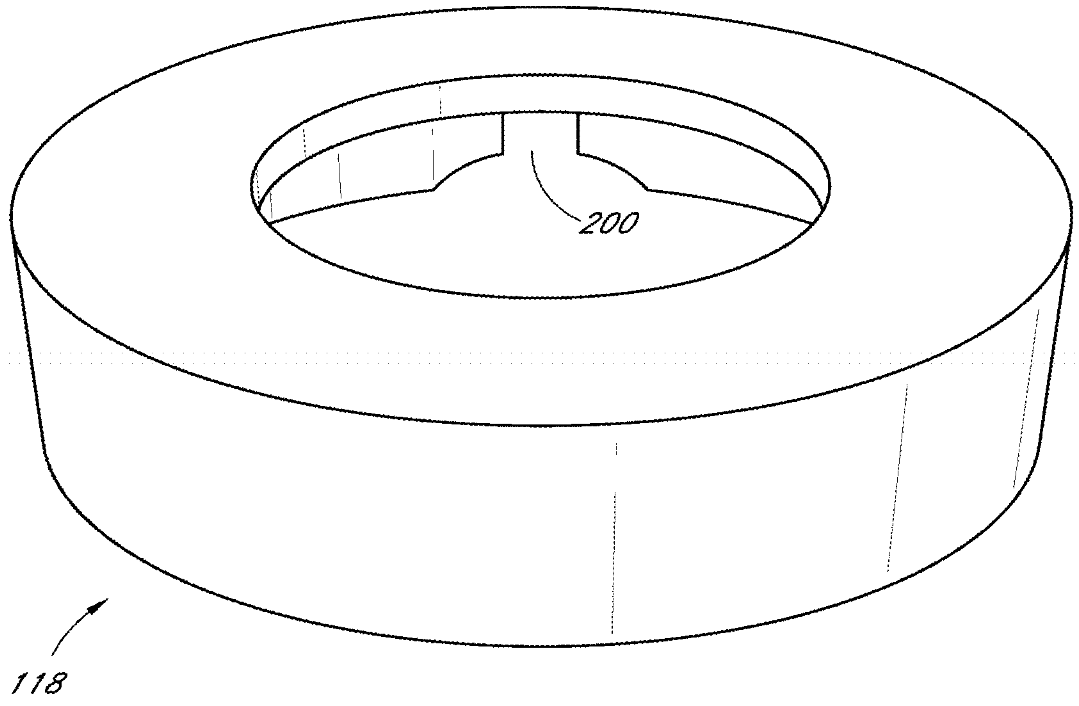
FIG. 36 depicts a front top perspective view of the top cap ring of an embodiment of the mounting system.
Figure 37:
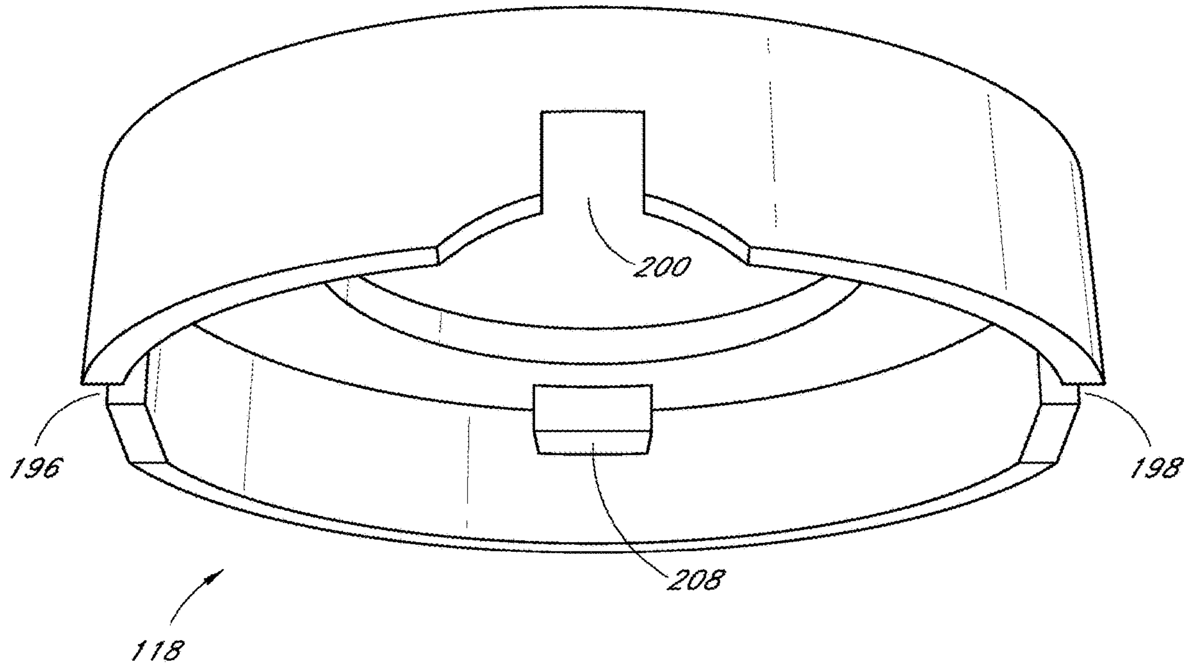
FIG. 37 depicts a bottom rear perspective view of the top cap ring of an embodiment of the mounting system.

As illustrated throughout the drawings, but most particularly in FIGS. 22, 34, and 35, the support ring 210 serves the function of holding the male light bulb socket 120 in the barrel 112 and preventing it from moving downwardly in the barrel 112. The support ring 210 has an outside diameter that is slightly smaller than the inside diameter of the barrel 112. When the mounting system 110 is assembled, the support ring 210 contacts and rests on the two opposed shoulders 124, 126 of the inside diameter of the barrel 112. As such, the support ring 210 cannot move downward into the barrel 112. The bottom end of the male light bulb socket 120, when placed against the top of the support ring, will likewise not be able to move downward into the barrel 112. The support ring 210 also has an inset orientation shelf 212 on the front of the support ring 210.

When the mounting system 110 is assembled for use, the mounting sleeve 114 is movably positioned inside the barrel 112. In assembly, the mounting sleeve 114 should be inserted into the top of the barrel 112. The mounting sleeve 114 is oriented inside the barrel 112 so that the two lands 152, 154 and slot 156 on the back of the mounting sleeve 114 are aligned with the back interior groove 128 of the barrel 112. The projecting stop 132 of the barrel 112 fits within the slot 156 of the mounting sleeve 114. Also with this orientation, the front land 160 of the mounting sleeve 114 is aligned with the front interior groove 130 of the barrel. This alignment further positions the laddered ratchet teeth 162 toward the engagement window 134. When free, the mounting sleeve 114 can slide downwardly in the barrel 112 until the top horizontal land 158 of the mounting sleeve 114 contacts the projecting stop 132 of the barrel 112. The top horizontal land 158, in contact with the projecting stop 132 of the barrel 112, also serves as a fail-safe to prevent the mounting sleeve 114 from failing out of the bottom of the barrel, in the event that the laddered ratchet teeth 162 or engagement teeth 176 fail. It will be noted that, due to the configuration of the lands 152, 154, slot 156 and front land 160 of the mounting sleeve 114, and the interior grooves 128, 130 and projecting stop 132 of the barrel 112, the mounting sleeve 114 cannot be inserted incorrectly into the barrel 112. For example, if an assembler should try to insert the mounting sleeve 114 upside down, the horizontal top land 158 will not pass the projecting stop 132. Likewise, if an assembler should try to insert the mounting sleeve 114 backwards, the front land 160, with its laddered ratchet teeth 162, will also not pass the projecting stop 132.

During assembly, the male light bulb socket 120 is affixed in e barrel 112, against downward motion and rotational motion. The support ring 210 is inserted into the barrel 112. The support ring 210 contacts and rests against the opposed interior shoulders 124, 126 of the barrel 112. The male light bulb socket 120 is then placed on top of the support ring 210. In one embodiment, the electrical connection wires (not shown) of the male light bulb socket 120 are fed downward through the support ring 210 and through the length of the barrel 112. The male light bulb socket 120 may be affixed to the support ring 210 with glue, but need not be. Next, the top cap 118 is placed over the male light bulb socket 120 and oriented so that the top cap orientation slots 196, 198, 200 line up with the top cap orientation tabs 202, 204, 206 of the barrel 112. Further, such an orientation will also align the top cap front orientation tab 208 of the top cap 118 with the inset shelf 212 of the support ring 210. The top cap 118 may then be secured in place with glue or other readily known means.

When in use, the locking ring 116 will prevent the mounting sleeve 114 from moving downward, but allow it to move upward. The locking ring 116 is manually pressed or clipped into place such that the rounded land 168 of the locking ring 116 fits into and engages the locking groove 136 of the barrel 112. When in such a locked position, the engagement block 174 of the locking ring 116 will pass through the engagement window 134 of the barrel 112. As a result, the engagement teeth 176 on the engagement block 174 of the locking ring 116 will fit into and engage the laddered ratchet teeth 162 on the front land 160 of the mounting sleeve 114. Specifically, the top face 178 of each of the teeth on engagement block 174 form a close fit relationship with the bottom face 166 of the laddered ratchet teeth 162, and vice versa. Similarly, the bottom face 180 of each of the teeth on the engagement block 174 form a close fit relationship with the top face 164 of the laddered ratchet teeth 162. The bottom face 180 of the engagement teeth 176 and the top face 164 of the laddered ratchet teeth 162 are at opposed 145 degree angles, thereby allowing them to press against and slide relative to one another when the mounting sleeve 114 is pressed upwardly. As a result, when the mounting sleeve 114 is pressed upward, the teeth will “click” against each other and act as a ratchet and pawl structure to allow the mounting sleeve 114 to move upward. It will be understood that the angle of the teeth may be less than or more than 45 degrees, and may range from 15 degrees to 75 degrees. A greater tooth angle will generally result in a greater holding weight for the mounting system, but will also make it more difficult to press the mounting sleeve 114 upward. In one embodiment, the locking ring must be able to give or push outwardly slightly, to enable the ratchet and pawl type action discussed above. In one embodiment, the locking ring 116 has enough rigidity, and is formed to closely fit the locking groove 136, to hold the locking ring 116 in place on the barrel 112, and not be entirely dislodged when the mounting sleeve 114 is moved upwardly, thereby causing the laddered ratchet teeth 162 to move against the engagement teeth 176, but not so much rigidity that the slight lateral motion of the locking ring 116 is inhibited, thereby preventing the laddered ratchet teeth 162 from moving relative to the engagement teeth 176. The amount of lateral motion of the locking ring 116 can be reduced—and thus the holding weight of the mounting system 110 can be increased—by securing the locking ring 116 in place using a zip tie or wire (not shown) around the circumference of the locking ring 116 and barrel 112. The zip tie can be positioned using the tie-off cut-outs 190, 192.

Conversely, when downward motion of the mounting sleeve 114 is attempted, the locking action of the teeth will prevent such downward motion. The top face 178 of the engagement teeth 176 and the bottom face 166 of the laddered ratchet teeth 162 are parallel, so that when the mounting sleeve 114 is pulled downwardly, as by the weight of a mounted LED panel light, the laddered ratchet teeth 162 and the engagement teeth 176 will lock against one another and prevent downward motion. In this way, the engagement teeth 176 on the engagement block 174 act like the pawl of a ratchet and pawl set, allowing movement of the sleeve 114 in a single upward direction.

Each tooth of both the engagement teeth 176 and the laddered ratchet teeth 162, is approximately 3 millimeters in width, thereby giving the mounting sleeve 112 upward adjustment increments of 3 mm per upward click. This distance can be increased or decreased by increasing or decreasing the size and/or angle of the teeth.

With respect to use of the locking ring 116, it will be noted that it cannot be installed incorrectly. When installed properly, the orientation cut-out 184 will pass the orientation tab 140 of the barrel 112, and thereby allow the engagement block 174 to pass through the engagement window 134. If the locking ring 116 is clipped to the barrel 112 upside down—thereby putting the engagement teeth 176 in an incorrect upside down orientation such that they will not properly engage the laddered ratchet teeth 162 of the mounting sleeve 114—the orientation tab 140 of the barrel 112 will contact the locking ring 116 thus preventing the engagement block 174 from passing through the engagement window 134.

In one embodiment, the barrel 112, mounting sleeve 114, locking ring 116, top cap 118 and inner support ring 210, are formed from a sturdy plastic, such as phenolic plastic, but can also be formed from polyurethane, polystyrene, polypropylene, polyvinyl chloride, polycarbonate, PLA, nylon, ABS and carbon fiber, aluminum or steel.

Figure 38:
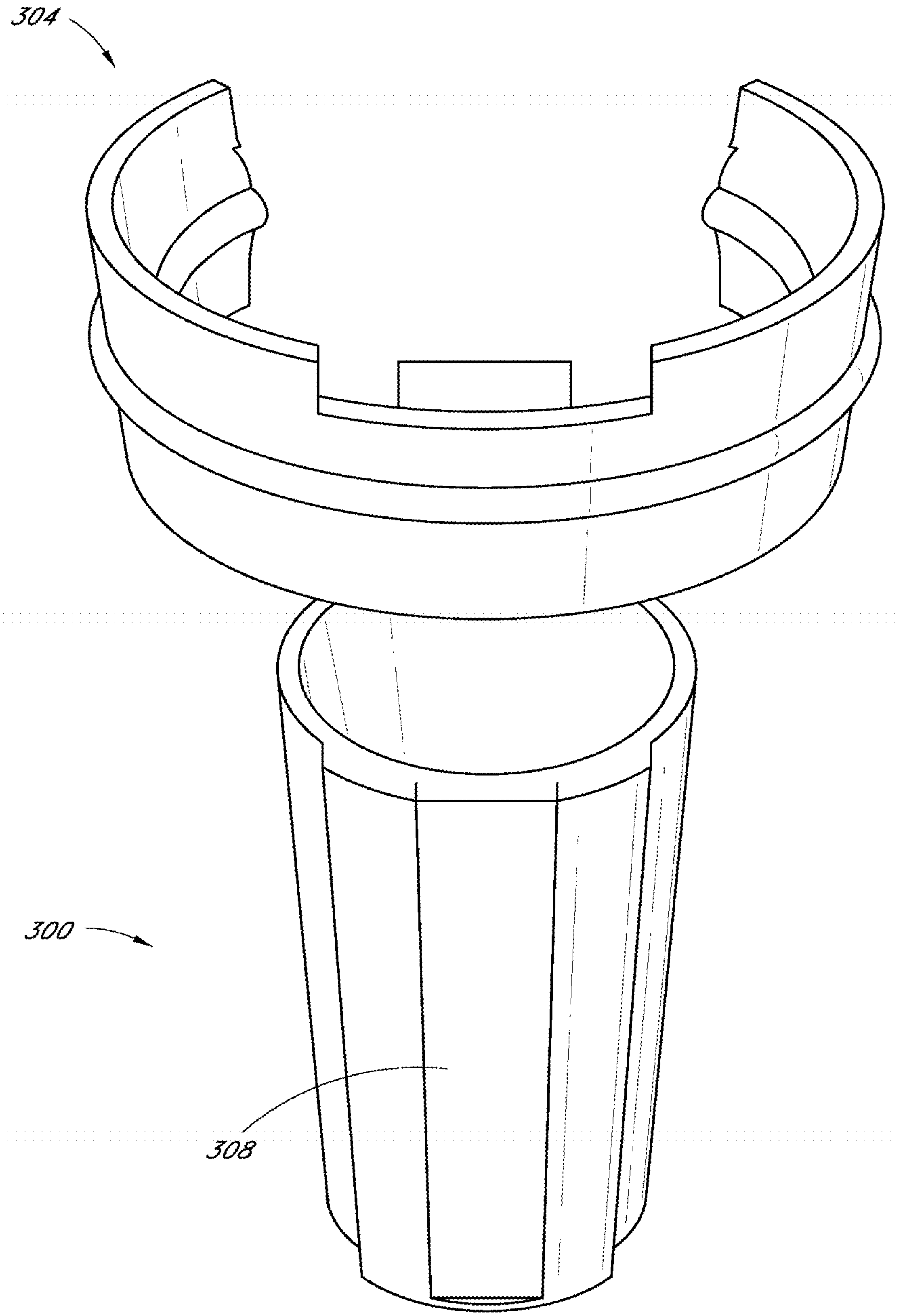
FIG. 38 depicts a front top perspective view of the locking ring and mounting sleeve of an alternative magnetic embodiment of the mounting system.
Figure 39:
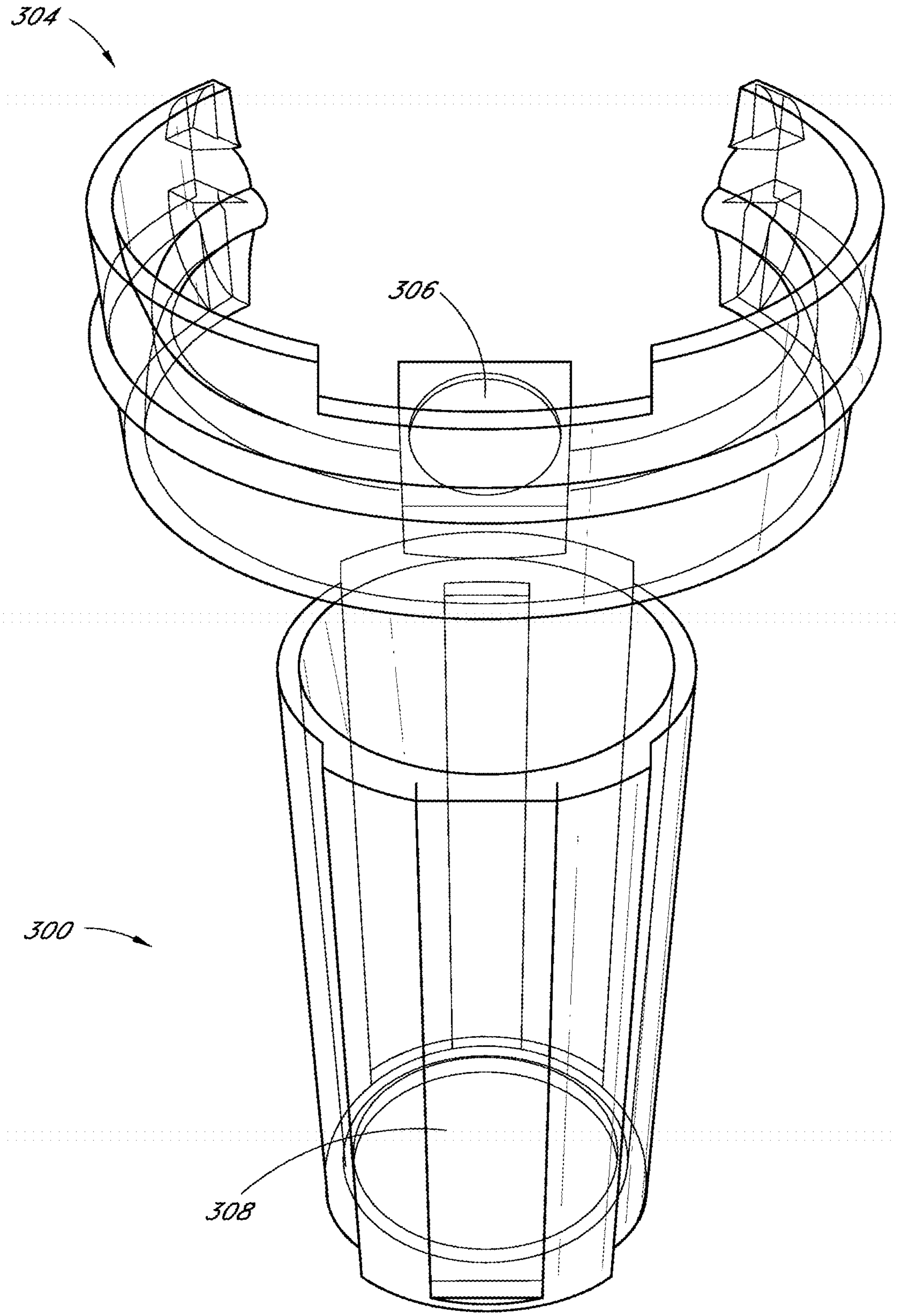
FIG. 39 depicts a transparent front top perspective view of the locking ring and mounting sleeve of an alternative magnetic embodiment of the mounting system.
Figure 40:
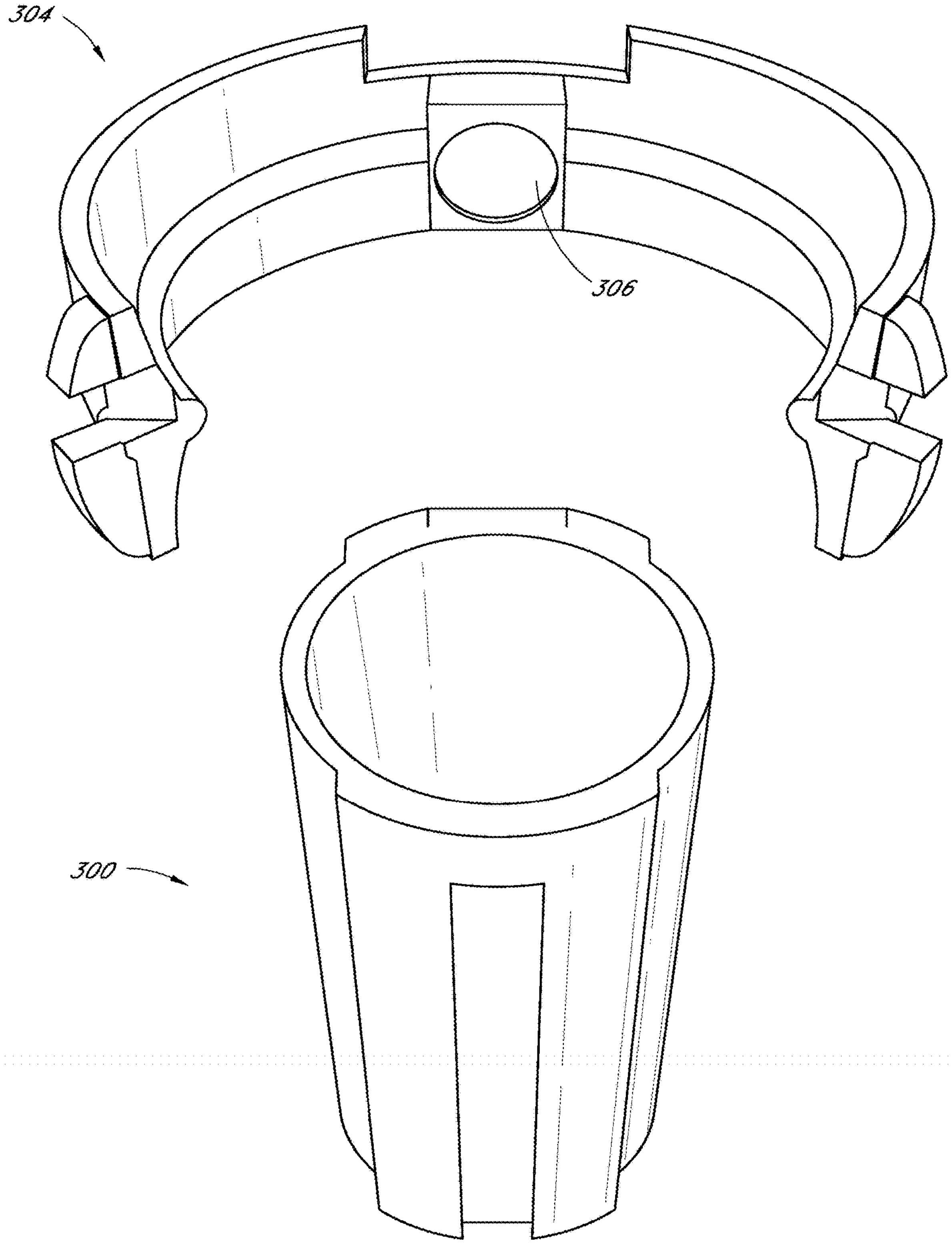
FIG. 40 depicts a rear top perspective view of the locking ring and mounting sleeve of an alternative magnetic embodiment of the mounting system.

With reference to FIGS. 38-40, an alternative embodiment mounting sleeve 300 and locking ring 302 are illustrated. Specifically, in place of the mechanical ratchet and pawl action described above, engagement is accomplished by magnetic attraction. As shown in FIGS. 38-40, the locking ring 302 of the engagement block 304 contains a magnet 306, rather than engagement teeth. The mounting sleeve front land 306 contains an elongated metal slide 308, rather than the laddered ratchet teeth. The elongated metal slide 308 may be affixed to the front land 306 by known means such as glue, or the plastic front land 306 may be formed around the metal. When assembled in use, the magnet 306 magnetically engages the elongated metal slide 308 to hold the mounting sleeve 300 in place. It will be appreciated that, in this alternative embodiment, the mounting sleeve 300 may be moved downward as well as upward, given sufficient force applied to slide the elongated metal slide 308 with respect to the magnet 306. This alternative embodiment also provides the advantage of continuous adjustment, in that it is not limited to adjustment intervals that are the size of each engagement tooth. In one embodiment, material for the elongated metal slide 308 is steel. However, it will be understood by one of skill in the art that the elongated metal slide 308 may be composed of any ferrous metal, so that the magnet may magnetically adhere to the elongated metal slide 308.

The magnet 306 may be any suitably strong magnet to hold the weight of the LED panel in a steady position, but still allow the elongated metal slide 308 to slide with respect to the magnet 306. Such motion enables the mounting sleeve 300 to be adjusted upwardly when the mounting system 110 is screwed into a can light fixture. In one embodiment, the magnet 306 is a neodymium magnet, of strength ranging from N40 to N52. The magnet 306 may also be a so-called printed poly-magnet, which is a type of neodymium magnet that is magnetized in a selected pattern. It will be appreciated that the magnet 306 may be of other types or construction, but must be able to be strongly attracting to the elongated metal slide 308 in order to hold the weight of the LED panel and prevent the mounting sleeve 300 from sliding downward under the weight of the LED panel, while at the same time enabling the mounting sleeve 300 to slide against the magnet 306 when a user presses the mounting sleeve 300 upward in order to secure an LED panel light against the bottom of the can light fixture and ceiling. In some embodiments, the magnet 306 includes a friction layer, such as rubber or polymer covering. For example, the magnet 306 may be encapsulated within or otherwise include a rubber, silicone, plastic, or other polymer material to increase the friction forces applied to the elongated metal slide 308. In some embodiments, the magnet 306 attracts and pulls the elongated metal slide 308 into the friction layer, which increases resistance of movement of the metal slide 308.

As for manufacture and assembly, it will be appreciated, based on the foregoing disclosure and drawings, that the design of the five plastic components, and two lightbulb sockets, will simplify manufacture and assembly of the device. It will also be appreciated that the plastic components of the mounting system can be manufactured using a variety of known techniques, including injection molding. The described plastic components can also be readily manufactured with 3-D printing. The metal and magnetic parts can be easily and quickly assembled by low-skill assembly workers or machinery.

When used, a user attaches the LED panel to the bottom of the mounting sleeve 14 using glue, clips, pins or other known attachment means. The user then attaches the LED driver or other electrical connections to the LED panel, typically by a simple male/female plugging-in action. In one embodiment, the LED panel has an upwardly projecting male light bulb socket, connected to the LED driver (not shown), that can be simply screwed into the female light bulb socket 122. The user then ensures that the mounting sleeve 114 is inserted into the bottom of the barrel 112, and engages the locking ring 116 to the barrel 112. The user must then press the mounting sleeve 114 upwardly far enough to cause the engagement teeth 176 of the locking ring 116 to engage the laddered ratchet teeth 162 of the mounting sleeve 114. However, the user should not immediately press the mounting sleeve 114 upward so far that the sleeve is in the compressed position. The user then screws the male light bulb socket 120 into an existing female light bulb socket in an existing can light fixture by rotating the whole mounting system 110, with LED panel attached.

This action is similar in nature to the twisting action consumers are familiar with to replace existing light bulbs, and requires no wire cutting, wire drilling or turning off of the power at the circuit breaker. Then, the user pushes the LED panel upward, thereby causing the mounting sleeve 114 to slide upward relative to the barrel 112, until the LED panel is snugly fit against the trim or ceiling as desired. The one-way adjustment enabled by the interaction of the engagement teeth 176 of the locking ring, 116 and the laddered ratchet teeth 162 will prevent the LED panel from moving downward after installation.

Figure 41:
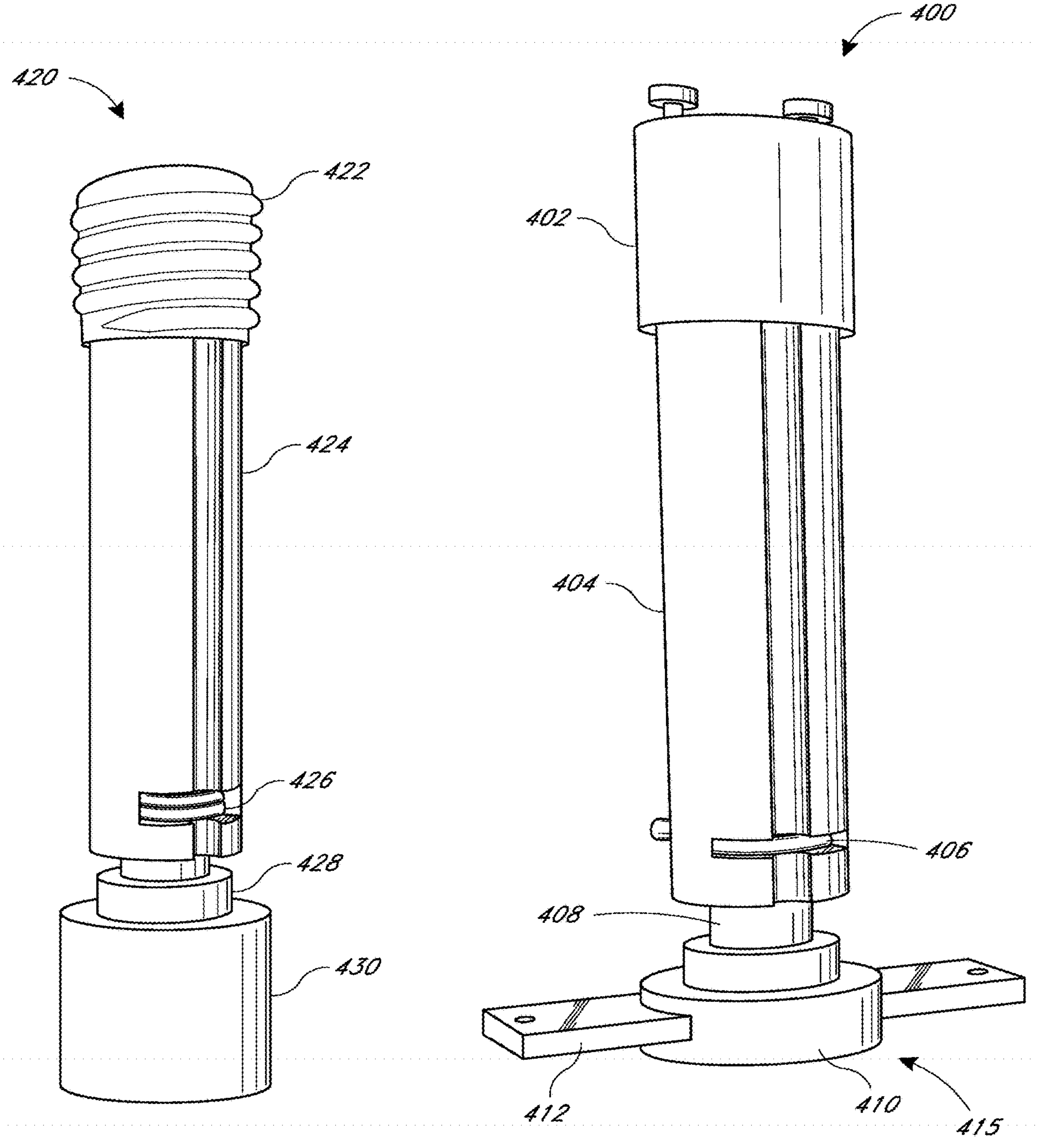
FIG. 41 depicts a front perspective view of embodiments of a mounting system shown in a compressed position.
Figure 42:
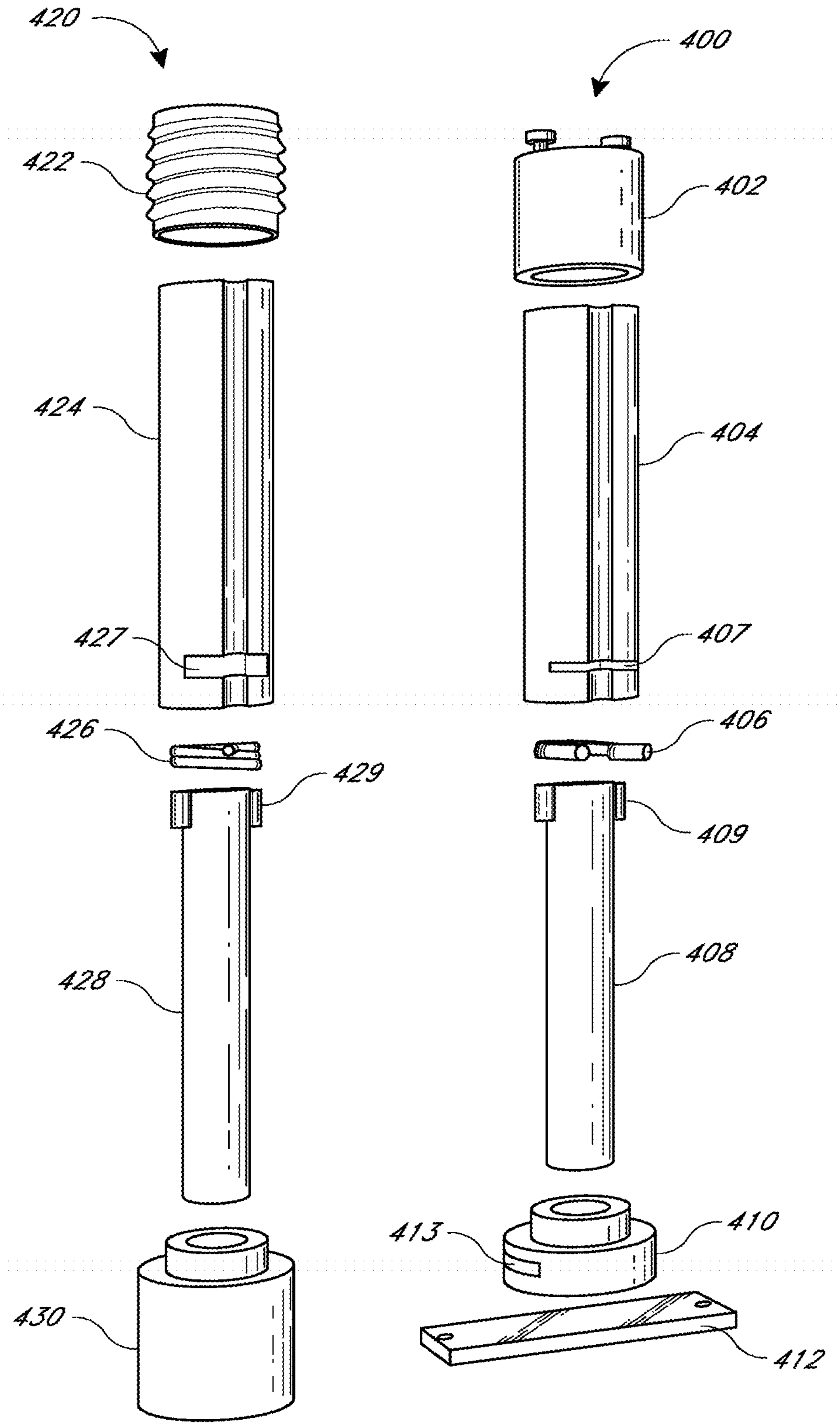
FIG. 42 depicts exploded views of the mounting systems of FIG. 41.
Figure 43:
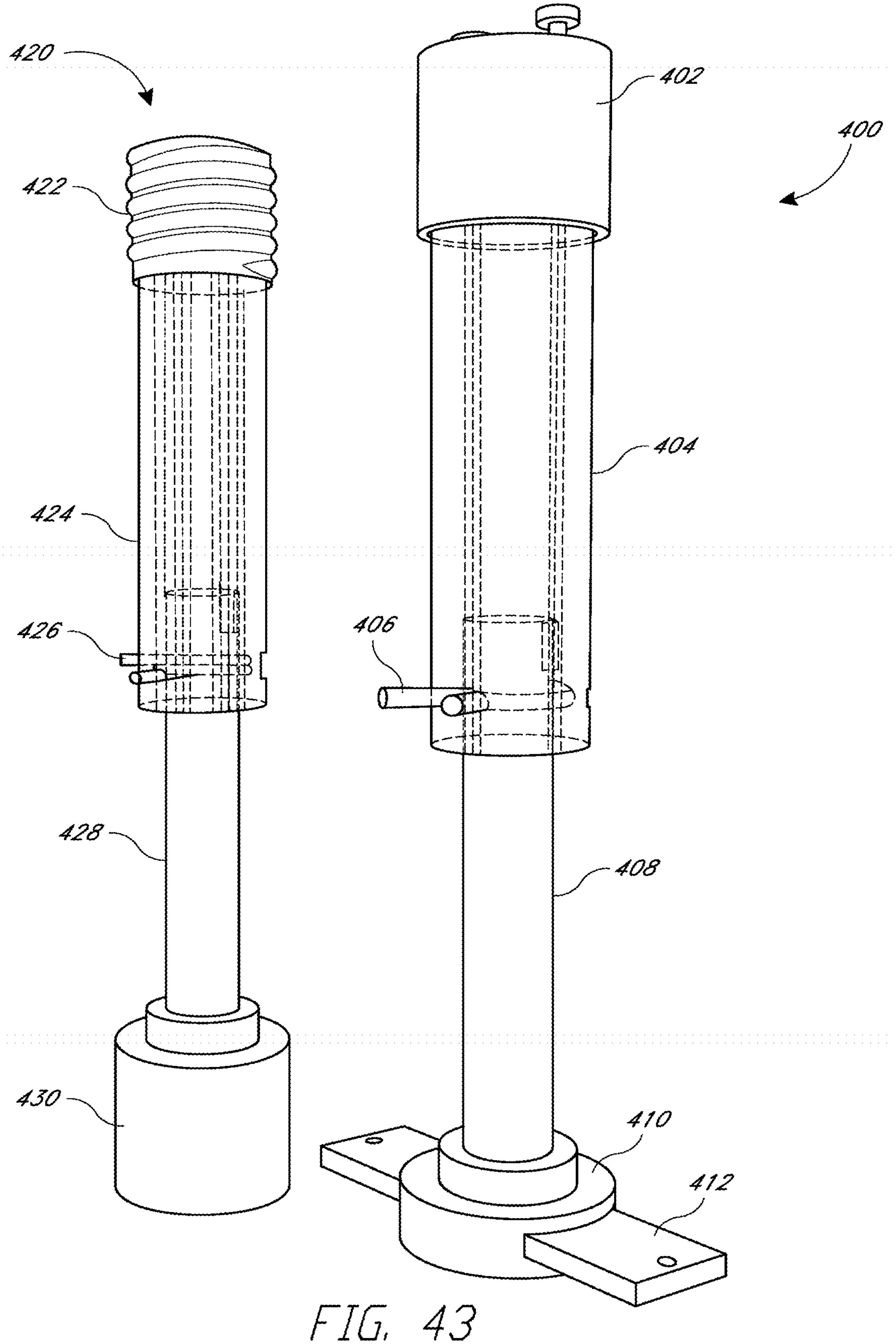
FIG. 43 depicts a partially transparent view of the mounting systems of FIG. 41 shown in an expanded position.
Figure 44:
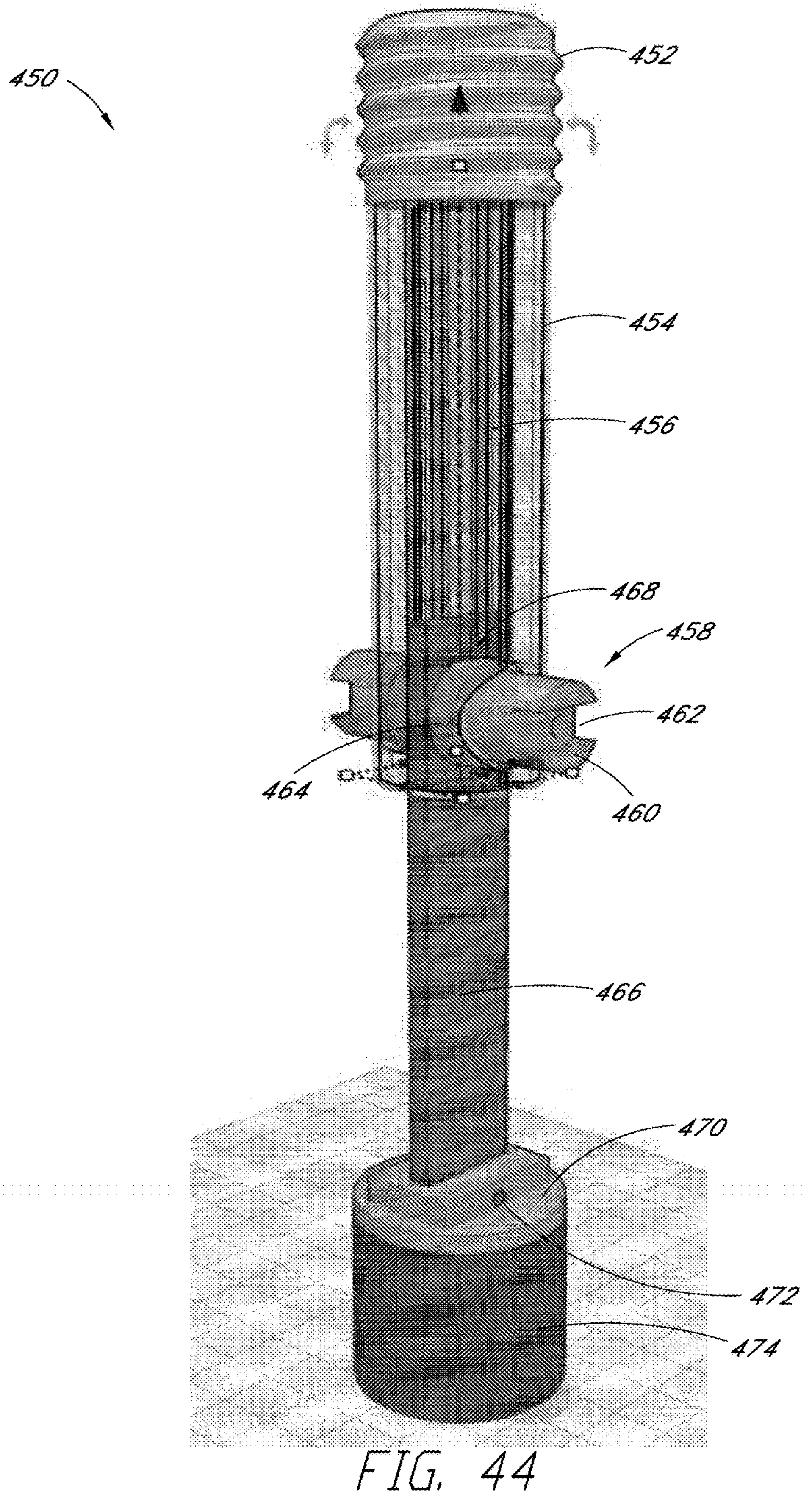
FIGS. 44-49 depict another embodiment of an electronic device mounting system.
Figure 45:
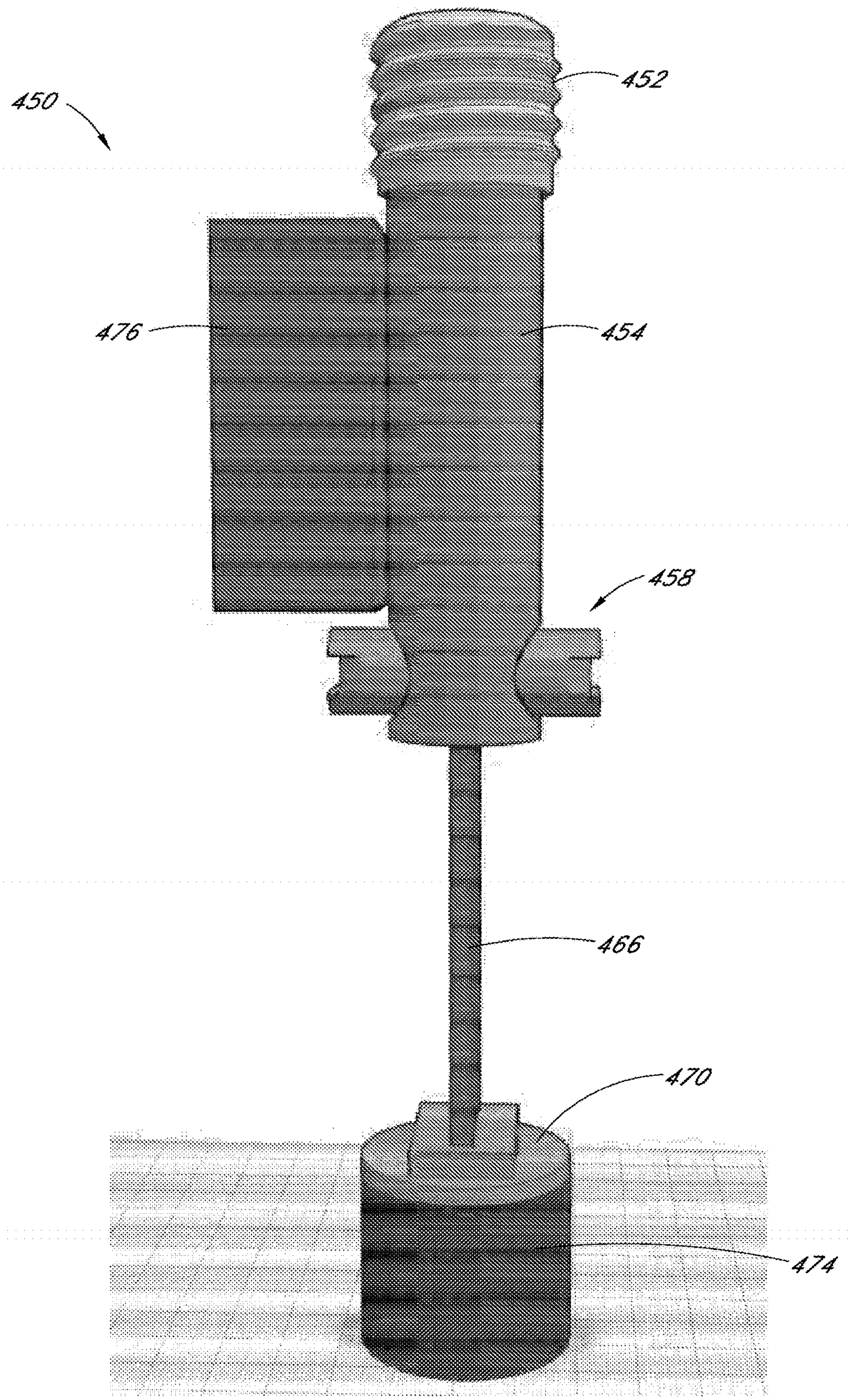
Figure 46:
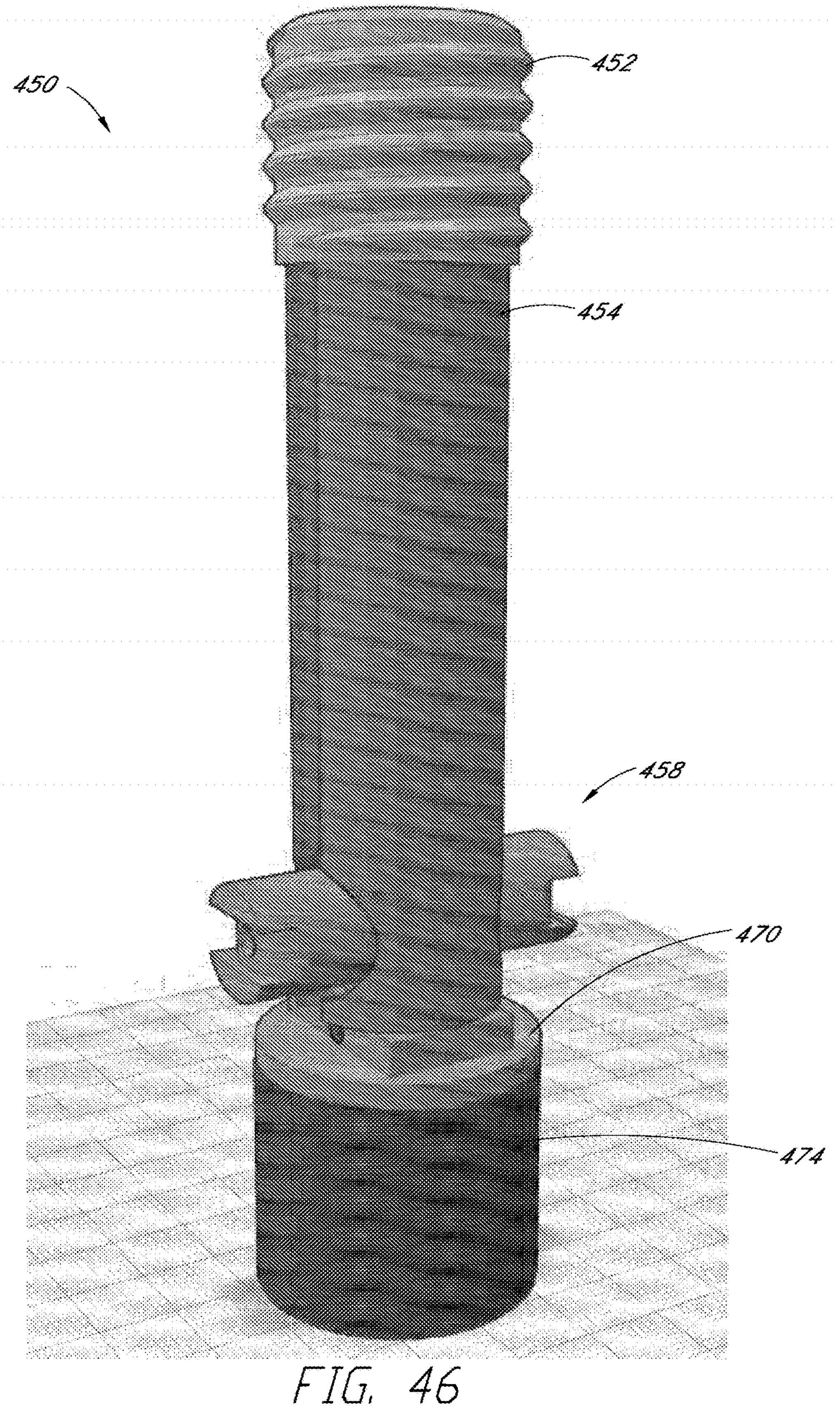
Figure 47:
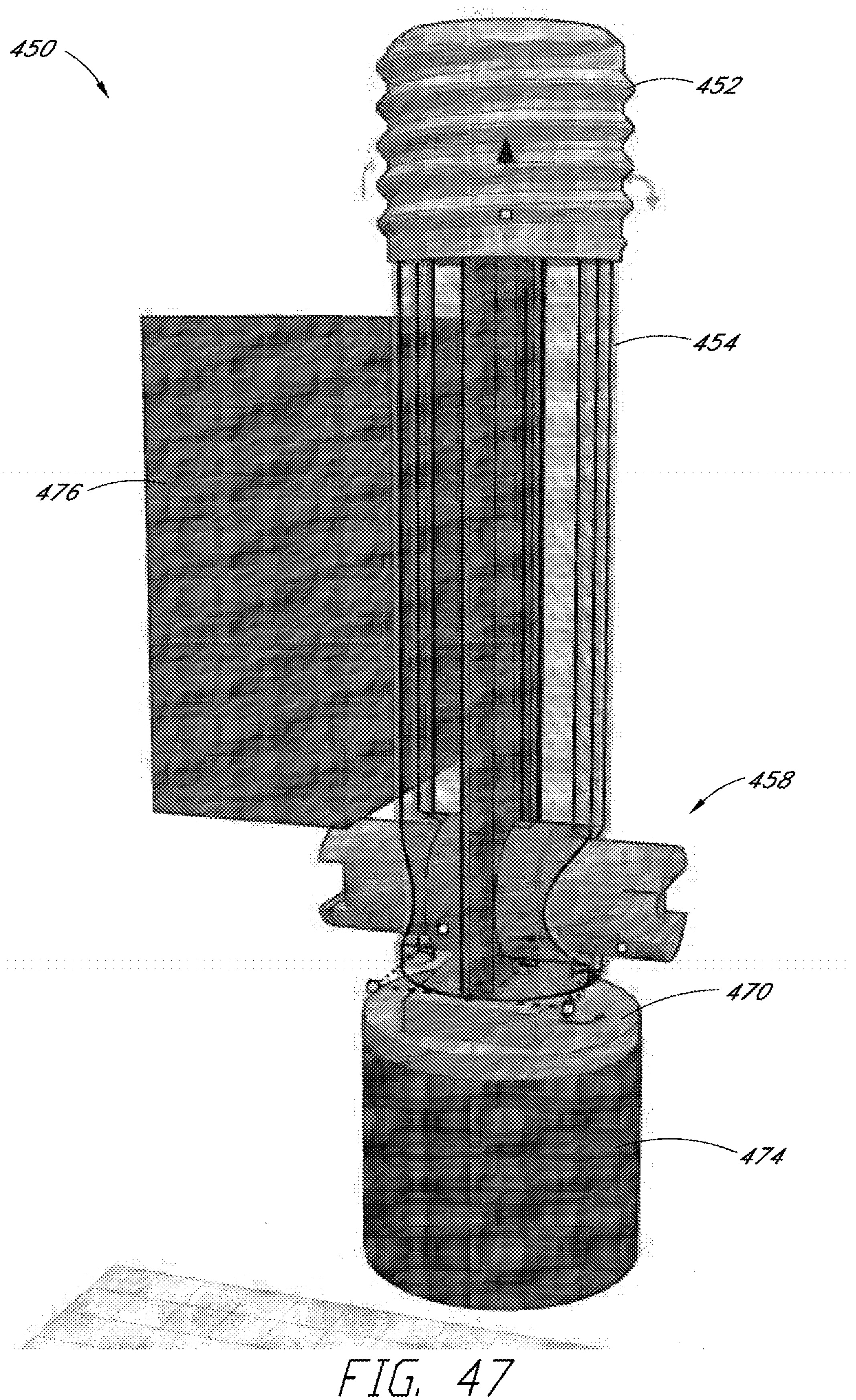
Figure 48:
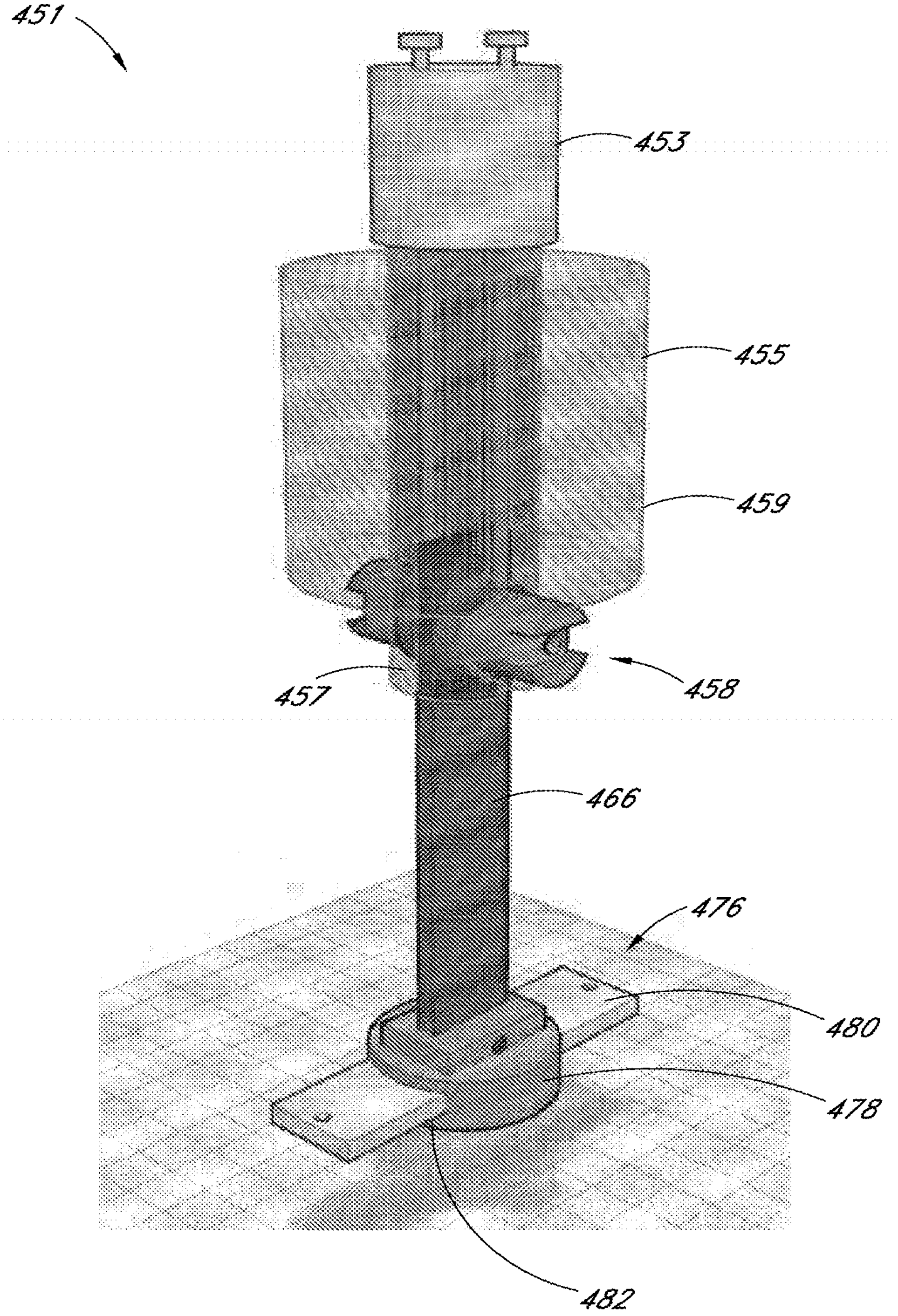
Figure 49:
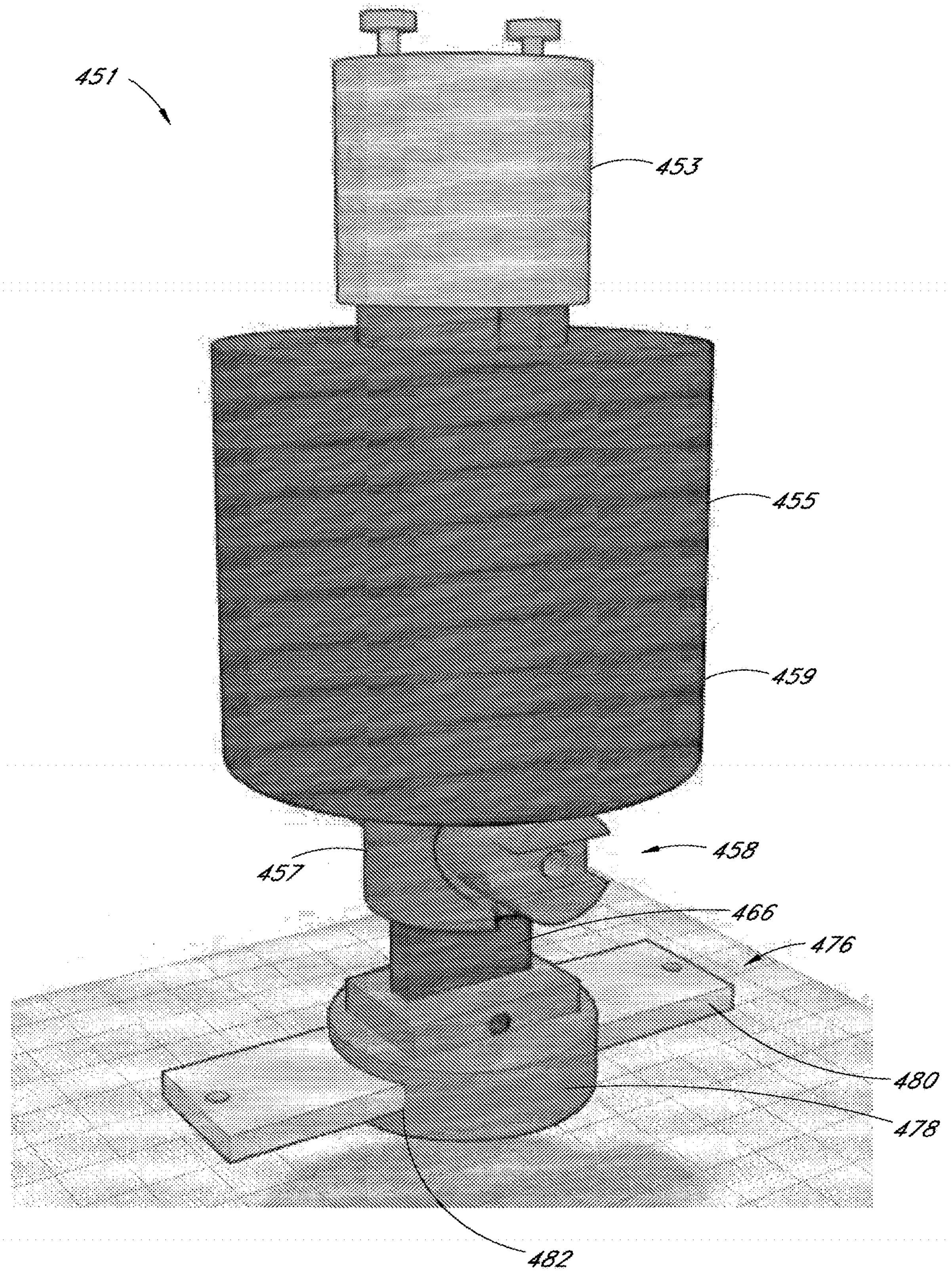
Figure 50:
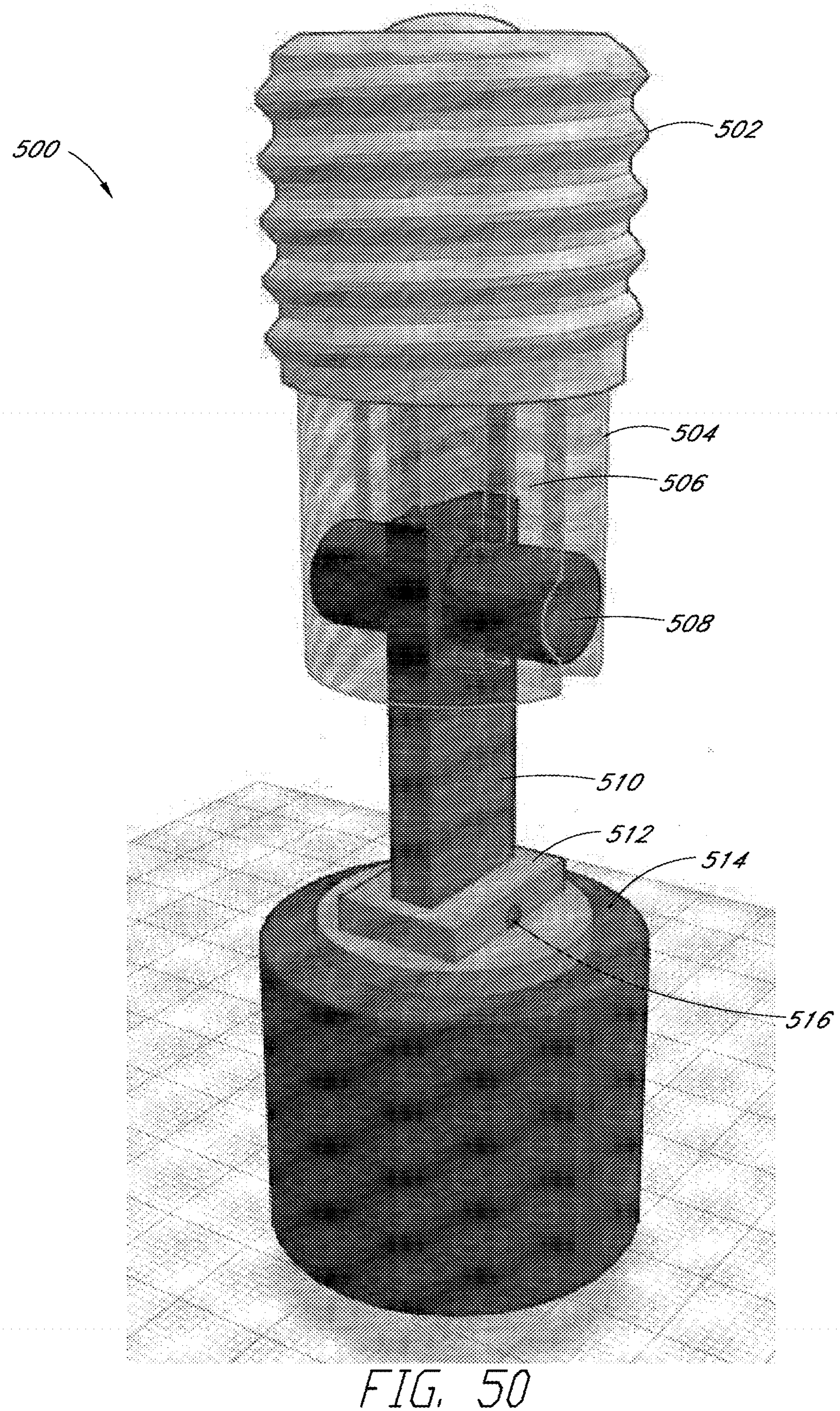
FIGS. 50-53 depict another embodiment of an electronic device mounting system.
Figure 51:
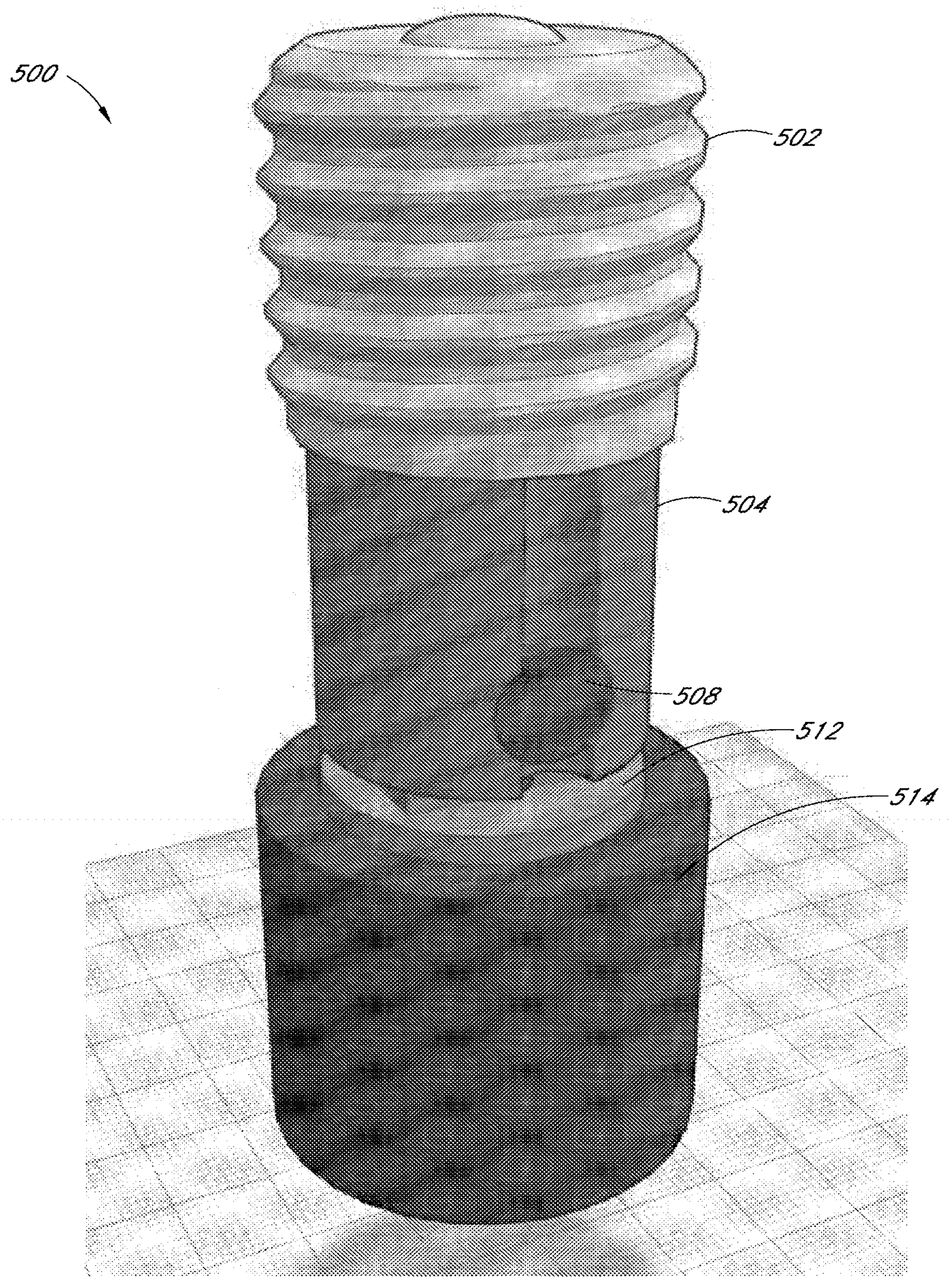
Figure 52:
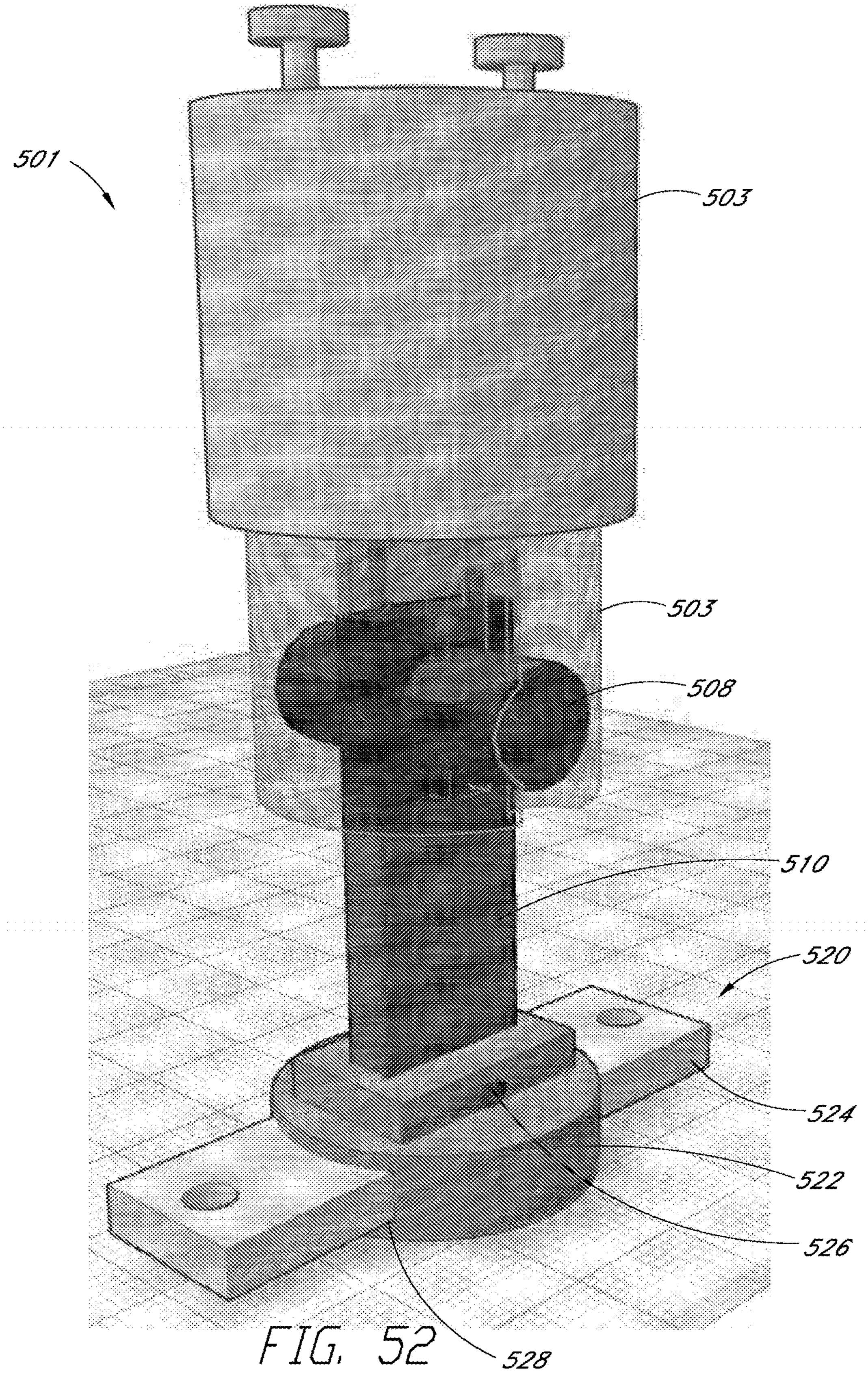
Figure 53:
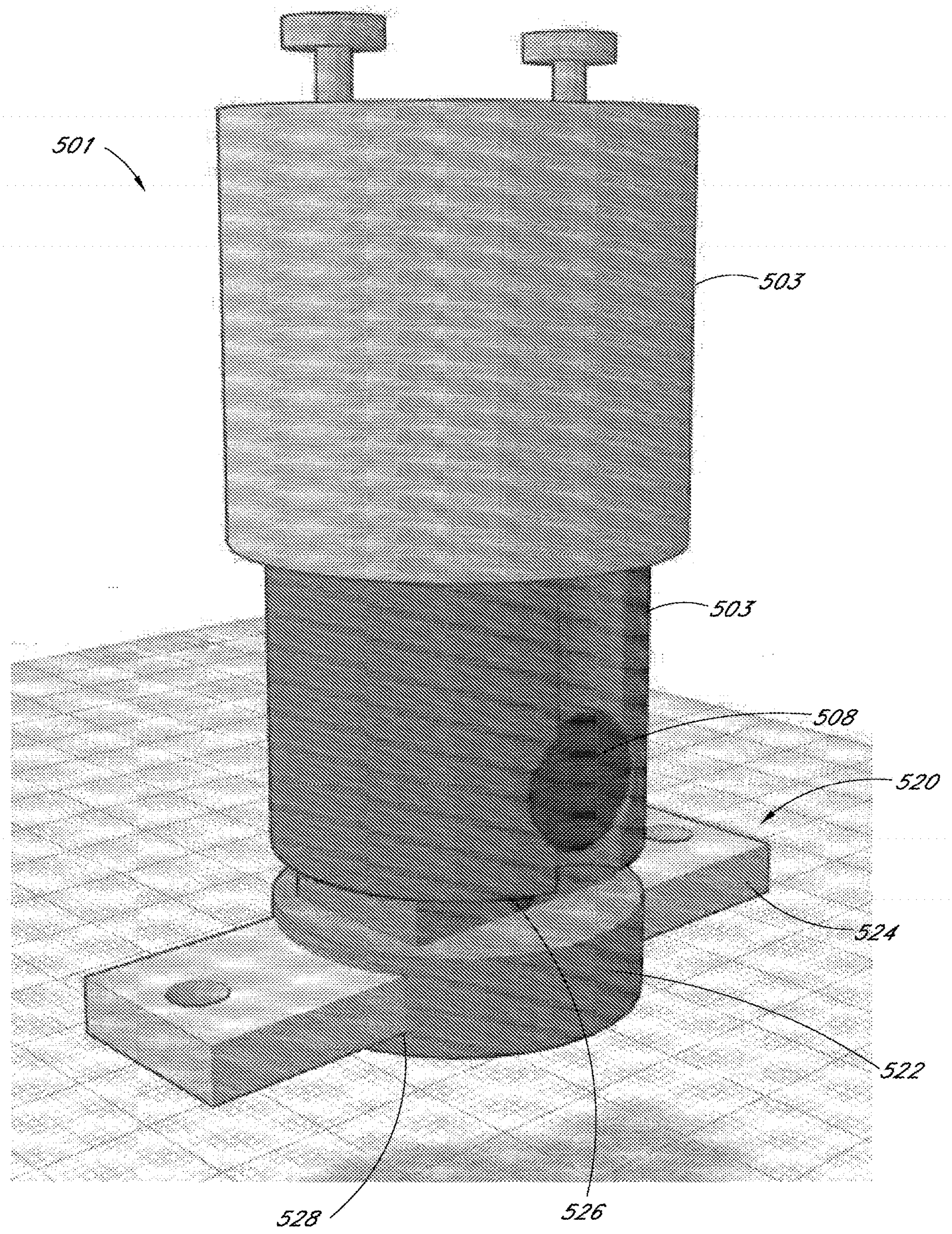

FIGS. 41-43 illustrate additional embodiments of mounting systems adapted to secure an electronic device to a light fixture. The electronic device can include any of the electronic devices described above. The mounting systems 400, 420 each include an electrical connector 402, 422, a tube assembly (sometimes referred to as a housing, or housing assembly) 404, 424, spring 406, 426, a piston 408, 428, and an attachment mechanism 415, 430.

The electrical connector 420, 422 can include a male light fixture screw, clip or mount. The electrical connector 420, 422 is adapted to be attached to a light fixture, such as a can light fixture. A tube assembly 404, 424 is attached to the electrical connector 420, 422. Wires from the electrical connector (not shown) can extend through an inner lumen, or through a channel formed in the inside and/or outside wall of the tube assembly 404, 424. The wires may be attached to an electronic device (not shown) mounted to the mounting system 400, 420.

Each mounting system 400, 420 also includes a spring 406, 426 that squeezes against the outside surface of a piston 408, 428. A portion of the spring 406, 426 is positioned within a slot 407, 427 (see FIG. 42) of the tube assembly 404, 424. A stop 409, 429 is positioned at a first end of the piston 408, 428. When the mounting system 400, 420 is fully extended, the stop 409, 429 contacts the spring 406, 426, which is secured in the slot 407, 427, and prevents the piston 408, 428 from being pulled out of and removed from the tube assembly 404, 424.

The second, opposite end of the piston 408, 428 is attached to an attachment mechanism 415, 430. The attachment mechanism 415 includes a mount 410 and a plate 412. The plate 412 is secured to the mount 410. In one embodiment, the plate 410 extends through a slot that extends across the diameter of the mount 410. The attachment mechanism 430 includes a female electrical socket. An electronic device shown) may be attached to the mounting system 400, 420 by attaching the electronic device to the attachment mechanism 415, 430. In one embodiment, the electronic device is screwed into the plate 412. In another embodiment, the electronic device is screwed into the female electrical socket of the attachment mechanism 430.

To assemble the mounting systems 400, 420, the spring 406, 426 is inserted into the corresponding horizontal channel, or slot at the base of the tube assembly 404, 424. The piston 408, 428 is inserted into the top of the tube assembly 404, 424, with the stop 409, 429 (sometimes referred to as fins, channel fins, or vertical or horizontal channel fins). The spring 406, 426 is slightly opened to allow the piston 408, 428 to travel through it, and until the stop 409, 429 engages the top of the spring 406, 426. The electrical connector 402, 422 is secured to the top end of the tube assembly 404, 424, and an attachment mechanism 415, 430 is secured to the bottom end of the piston 408, 428.

In operation, the bottom of the mounting system 400, 420 is attached to an electronic device, such as an LED light, or any other electronic device described above, using the attachment mechanism 415, 430. The spring 406, 426 is slightly disengaged, or opened, to allow the piston 408, 428 to slide downwardly to put the mounting system 400, 420 in a fully extended position. The mounting system 400, 420 is attached to a light fixture using the electrical connector 402, 424. For example, the mounting system 400, 420 may be screwed into a light socket in a light fixture.

An upward, vertical force (or pressure) is applied to the base of the electronic device, pushing it upward towards the light fixture. The vertical force is carried through the piston 408, 428 to overcome the holding pressure exerted by the spring 406, 426 on the outside surface of the piston 408, 428. The vertical force allows ascending, upward vertical movement of the lighting device with respect to the light fixture, as the mounting assembly 400, 420 is pressed into a collapsed position.

Once the top of the electronic device contacts a face of the ceding, the ceiling mount, or the can, ascending vertical travel will stop. The spring 406, 426 will continue to apply enough holding pressure to the piston 408, 428 to prevent the piston 408, 428 from sliding downward. The stops 409, 429 positioned on the piston 408, 428 prevent the piston 408, 428 from passing beyond the spring 406, 426, which cannot be removed from the tube assembly 404, 424.

FIGS. 44-49 illustrate additional embodiments of mounting systems adapted to secure an electronic device to a light fixture. The electronic device can include any of the electronic devices described above. The mounting systems 450, 451 each include an electrical connector 452, 453, a housing 454, 455, at least one magnet assembly 458, an arm 466, and an attachment mechanism 474, 476. The housing 455 includes an inner housing 457 and an outer housing 459.

The electrical connector 452, 453 can include a male light fixture screw, clip or mount. The electrical connector 452, 453 is adapted to be attached to a light fixture, such as a can light fixture. A housing 454, 455 is attached to the electrical connector 452, 453. Wires from the electrical connector (not shown) can extend through an inner lumen, or through a channel formed in the inside and/or outside wall of the housing 454, 455. The wires may be attached to an electronic device (not shown) mounted to the mounting system 450, 451, such as at the attachment mechanism 474, 476 or at an electronics housing 476.

An arm 466 is positioned within a channel 456 of the housing 454, or inner housing 457. The arm 466 is able to slide within the channel 456 between an extended configuration (see FIGS. 44, 45, 48) and a collapsed configuration (see FIGS. 46, 47, 49). A stop 468, such as a pin, flange, or other mechanical component, prevents the arm 466 from sliding downward past the bottom end portion of the housing 454, or inner housing 457.

One or more magnet assemblies 458 are positioned within an opening of the housing 454, or inner housing 457. The magnet assembly 458 includes a holder 460 and a magnet 464. The magnet can be any of the magnets described above. In addition, the magnet may include an encapsulation, partial covering, or material to increase friction forces between the magnet assembly 458 and the arm 458. The magnet assembly 458 is magnetically attracted to the metallic material of the arm 466. The attractive force causes the arm 466 to slide against the magnet assembly 458 as the mounting system 450, 451 is adjusted between its collapsed and expanded configurations. In addition, the magnet assembly 458 prevents the mounting system 450, 451 from moving to an expanded configuration once it has been adjusted to a desired length. Additional force may be applied to the arm 466 by securing a band, such as a tie wrap, cable, or other securement mechanism within slots 462 provided by the magnet assembly 458.

An attachment mechanism 474, 476 is attached to the lower portion of the arm 466 with a pin 472. In one embodiment, the attachment mechanism 474 includes a mount 470 coupled to an electrical connector. The electrical connector can include a female light socket (see FIGS. 44-47). In another embodiment, the attachment mechanism 476 includes a mount 478. A plate 480 is inserted through a slot 482 in the mount 478 to attach the plate to the mount 478. An electronic device (not shown) can be attached to the attachment mechanism 474 at the electrical connector, mount 470, 478 or plate 480.

One or more electronic components (not shown) can be supported by the mounting system 450, 451, as well. The electronic components (e.g., drivers, or other electronics used to operate, control, power, etc. the electronic device) may be positioned within an electronics housing 476 (see FIGS. 45, 47), 459 (see FIGS. 48, 49). The electronics housing 476, 459 is sized to fit within the inside space of the housing of a light fixture, or can (as discussed above).

In one embodiment, to operate the mounting system, an electronic device (not shown) is attached to the attachment mechanism 474, 476. The mounting system 450, 451 is then adjusted to its expanded configuration. The mounting system 450, 451 is then inserted into and attached to a light fixture. If the light fixture is a ceiling-mounted light fixture, three is applied to the attachment mechanism to move the electronic device towards the ceiling until either the electronic device contacts the ceiling, or until the arm has traveled its length through the housing 454, 457 channel 456. The magnetic and friction forces between the one or more magnets 458 against the arm 466 keep the electronic device in place once adjusted to the desired location.

FIGS. 50-53 illustrate additional embodiments of mounting systems adapted to secure an electronic device to a light fixture. The electronic device can include any of the electronic devices described above. The mounting systems 500, 501 each include an electrical connector 502, 503, a housing 504, at least one magnet assembly 508, an arm 510, and an attachment mechanism 514, 520.

The electrical connector 502, 503 can include a male light fixture screw, clip or mount. The electrical connector 502, 503 is adapted to be attached to a light fixture, such as a can light fixture. A housing 504 is attached to the electrical connector 452, 453. Wires from the electrical connector (not shown) can extend through an inner lumen, or through a channel formed in the inside and/or outside wall of the housing 504. The wires may be attached to an electronic device (not shown) mounted to the mounting system 500, 501, such as at the attachment mechanism 514, 520.

An arm 510 is positioned within a channel 506 of the housing 504. The arm 510 is able to slide within the channel 506 between an extended configuration (see FIGS. 50, 52) and a collapsed configuration (see FIGS. 51, 53). A stop (e.g., positioned above the magnet assembly 508), such as a pin, flange, or other mechanical component, prevents the arm 510 from sliding downward past the bottom end portion of the housing 504.

One or more magnet assemblies 508 are positioned within an opening of the housing 504. The magnet assembly 508 can includes a holder and a magnet. The magnet can be any of the magnets described above. In addition, the magnet may include an encapsulation, partial covering, or any of the materials described above to increase friction forces between the magnet assembly 508 and the arm 510. The magnet assembly 508 is magnetically attracted to the metallic material of the arm 510. The attractive force causes the arm 510 to slide against the magnet assembly 508 as the mounting system 500, 501 is adjusted between its collapsed and expanded configurations. In addition, the magnet assembly 508 prevents the mounting system 500, 501 from moving to an expanded configuration once it has been adjusted to a desired length.

An attachment mechanism 514, 520 is attached to the lower portion of the arm 510 with a pin 516, 526. In one embodiment, the attachment mechanism 514 includes a mount 512 coupled to an electrical connector. The electrical connector cart include a female light socket (see FIGS. 50-51). In another embodiment, the attachment mechanism 520 includes a mount 522. A plate 524 is inserted through a slot 528 in the mount 522 to attach the plate to the mount 522. An electronic device (not shown) can be attached to the attachment mechanism 520 at the electrical connector, mount 512, 522 or plate 524.

In one embodiment, to operate the mounting system, an electronic device (not shown) is attached to the attachment mechanism 514, 520. The mounting system 500, 501 is then adjusted to its expanded configuration. The mounting system 500, 501 is then inserted into and attached to a light fixture. If the light fixture is a ceiling-mounted light fixture, force is applied to the attachment mechanism to move the electronic device towards the ceiling until either the electronic device contacts the ceiling, or until the arm has traveled its length through the housing 504 channel 506. The magnetic and friction forces between the one or more magnets 508 against the arm 510 keep the electronic device in place once adjusted to the desired location.

Figure 54:
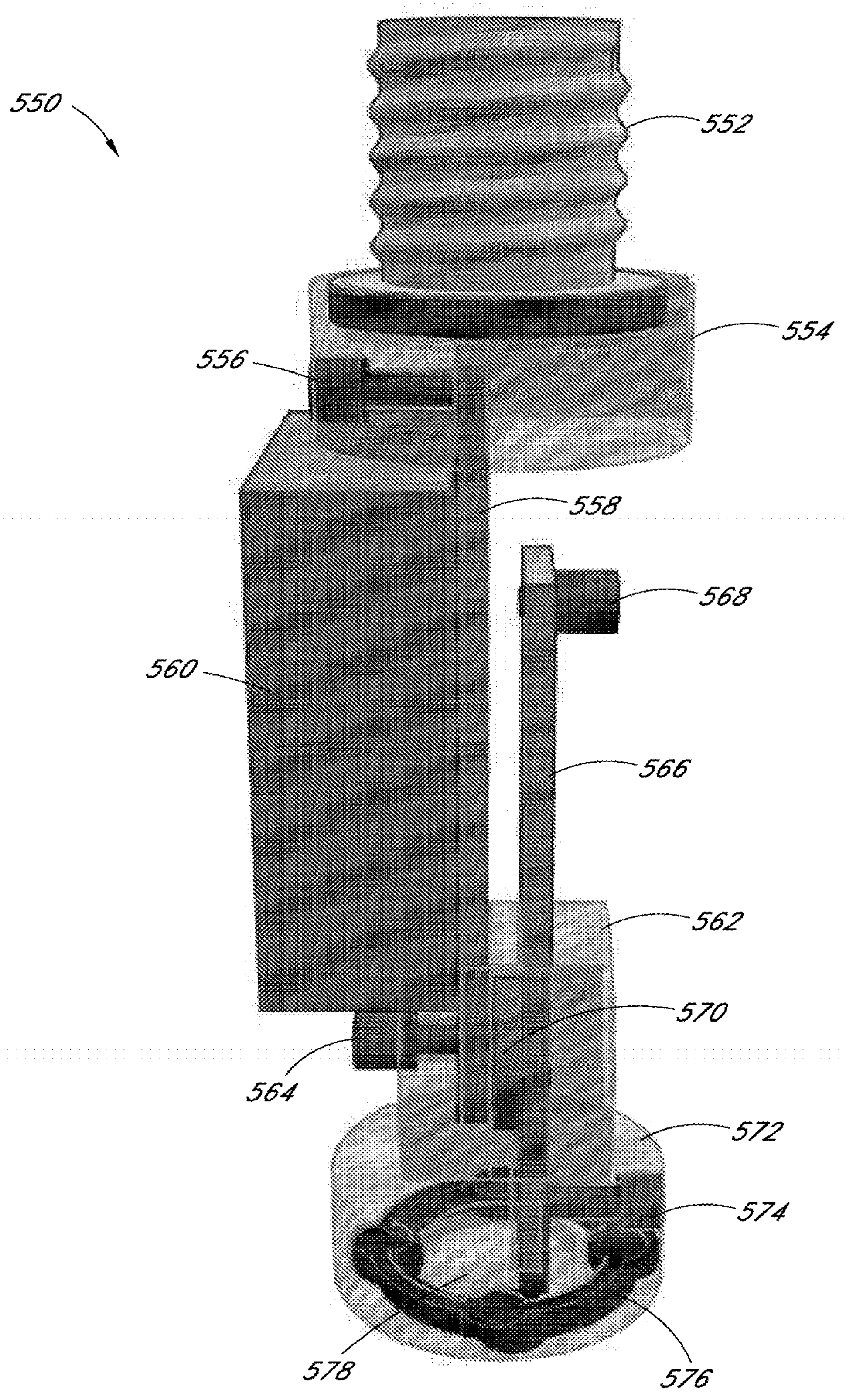
FIGS. 54-56 depict another embodiment of an electronic device mounting system.
Figure 55:
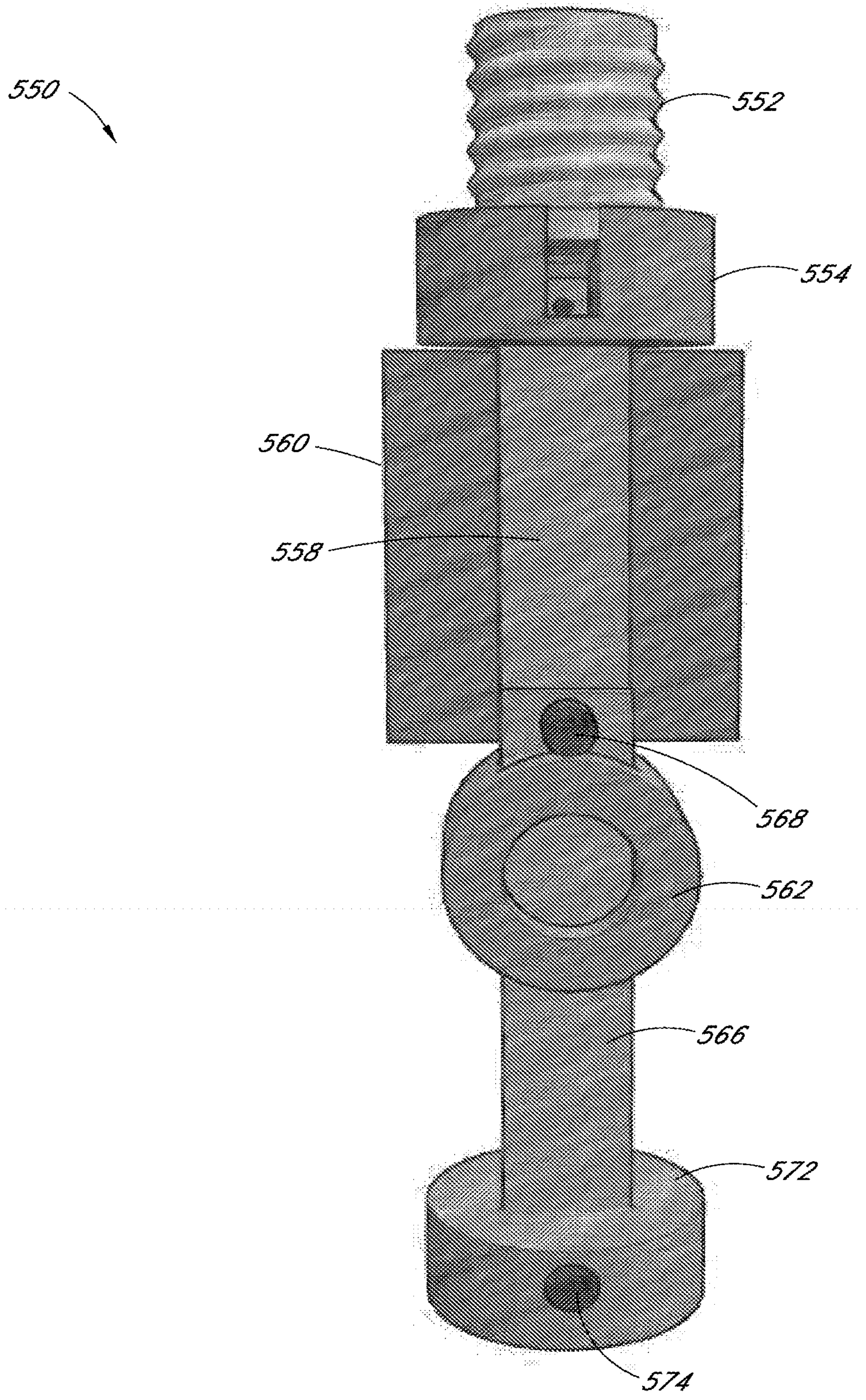
Figure 56:
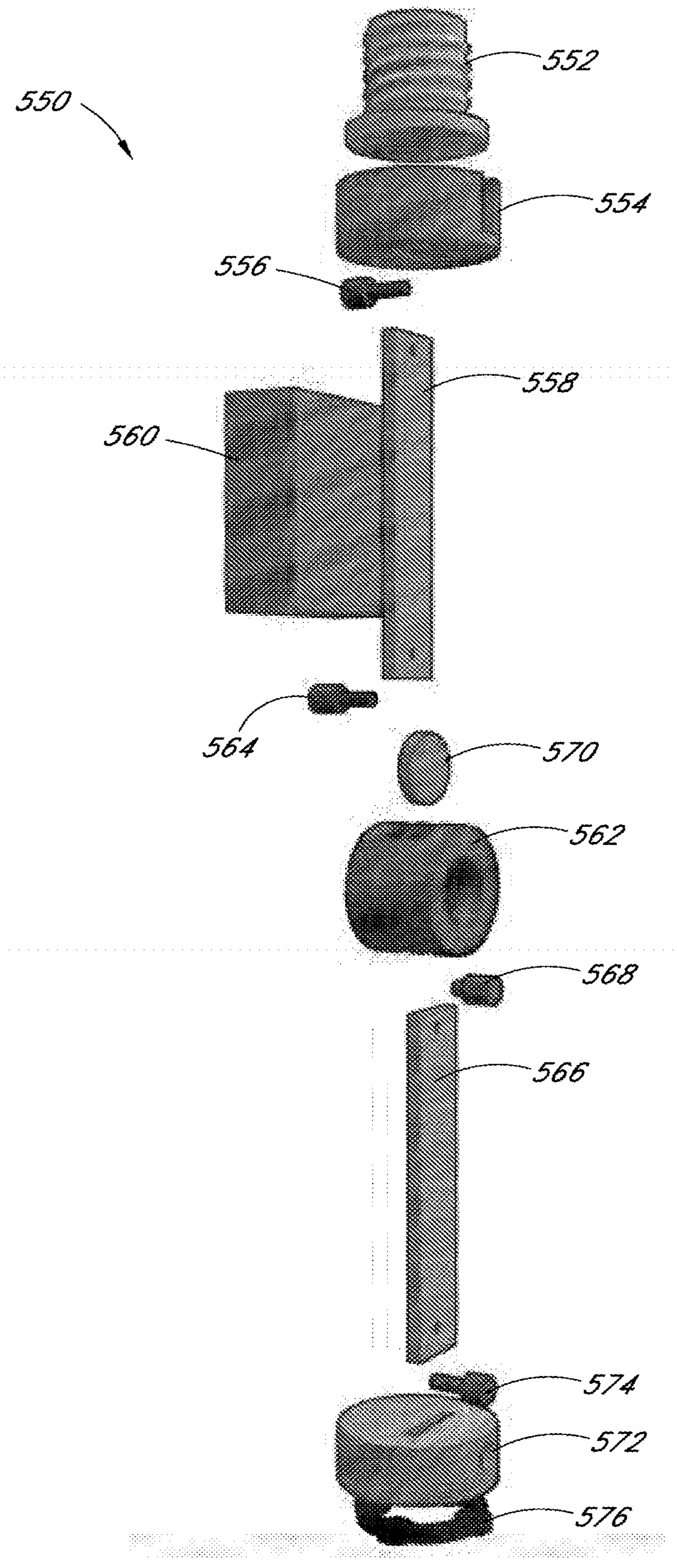

FIGS. 54-56 illustrate additional embodiments of mounting systems adapted to secure an electronic device to a light fixture. The embodiment of FIGS. 54-56 is similar to the embodiment of FIGS. 1-19 (and can include all of the components of the embodiment of FIGS. 1-19), except for the change in design of the central hub 19, 562. The electronic device can include any of the electronic devices described above. The mounting system 550 includes an electrical connector 552, a top hub 554, a center hub 562, and a bottom hub 572. An upper arm 558 extends between the top hub 554 and the center hub 562. The upper arm 582 is secured to the top hub 554 with a fastener 556, such as a screw, pin, etc. The upper arm 582 may be secured to the center hub 562 with a fastener 564, as well. In some embodiments, an electronics housing 560 is provided along the upper arm 558 between the top and center hubs 556, 562.

The electrical connector 552 can include a male light fixture screw, clip or mount. The electrical connector 552 is adapted to be attached to a light fixture, such as a can light fixture. Wires from the electrical connector (not shown) can extend through an inner lumen, or through a channel formed in the inside and/or outside wall of the top hub 554. The wires may be attached to an electronic device (not shown) mounted to the mounting system 550, such as at the bottom hub 572 or at an electronics housing 560. A lower arm 566 extends between the center arm 562 and the bottom hub 572. The lower arm 566 is slidably coupled to the center hub 562 such that the lower arm 566 is able to slide within a slot extending through the center hub 562. By sliding the lower arm 566 through the center hub 562, the mounting system 550 may be adjusted between compressed (FIG. 54) and extended (FIG. 55) configurations.

Movement of the lower arm 566 though the center hub 562 is limited by a stop 568 coupled to an upper end of the lower arm 566. The stop 568 prevents the lower arm 566 from being pulled all the way through, and removed from, the center hub 562. The upper and lower arms 558, 566 are oriented parallel to one another and separated from each other by a gap. The portion of the gap positioned within the center hub 562 defines a cavity. A magnet assembly 570 is positioned within the cavity. The magnet assembly can include any magnet described above.

In addition, the magnet may include an encapsulation, partial covering, or material to increase friction forces between the magnet assembly 570 and the lower arm 566. The magnet assembly 570 is magnetically attracted to the metallic material of the lower arm 566. The attractive force causes the lower arm 566 to slide against the magnet assembly 570 as the mounting system 550 is adjusted between its collapsed and expanded configurations. In addition, the magnet assembly 570 prevents the mounting system 550 from moving to an expanded configuration once it has been adjusted to a desired length.

The bottom hub 572 is attached to the lower arm 566 with a fastener 574, such as a screw, pin, etc. In one embodiment, the bottom hub 572 includes a mounting ring 576 that can be coupled to an electronic device. The electronic device can include an electrical connector, which can include a female light socket (not shown). In another embodiment, the bottom hub 572 includes a mounting ring 576. An electronic device (not shown) can be attached to the mounting ring 576 (e.g., by adhesive, screws, magnets, etc.). The mounting ring 576 can define a cavity 578. A mounting magnet (not shown) may be inserted into and secured to the cavity 578. The mounting magnet can be used to secure the electronic device to the mounting system 550. The mounting magnet can include any of the magnets or magnet assemblies described herein.

One or more electronic components (not shown) can be supported by the mounting system 550, as well. The electronic components (e.g., drivers, or other electronics used to operate, control, power, etc. the electronic device) may be positioned within an electronics housing 560. The electronics housing 560 is sized to fit within the inside space of the housing of a light fixture, or can (as discussed above).

In one embodiment, to operate the mounting system 550, an electronic device (not shown) is attached to the bottom hub 572. The mounting system 550 is then adjusted to its expanded configuration. The mounting system 550 is then inserted into and attached to a light fixture. If the light fixture is a ceiling-mounted light fixture, force is applied to the attachment mechanism to move the electronic device towards the ceiling until either the electronic device contacts the ceiling, or until the lower arm 566 has traveled through the center hub 562. The magnetic and friction forces between the one or more magnets 570 against the lower arm 566 keep the electronic device in place once adjusted to the desired location.

Figure 57:
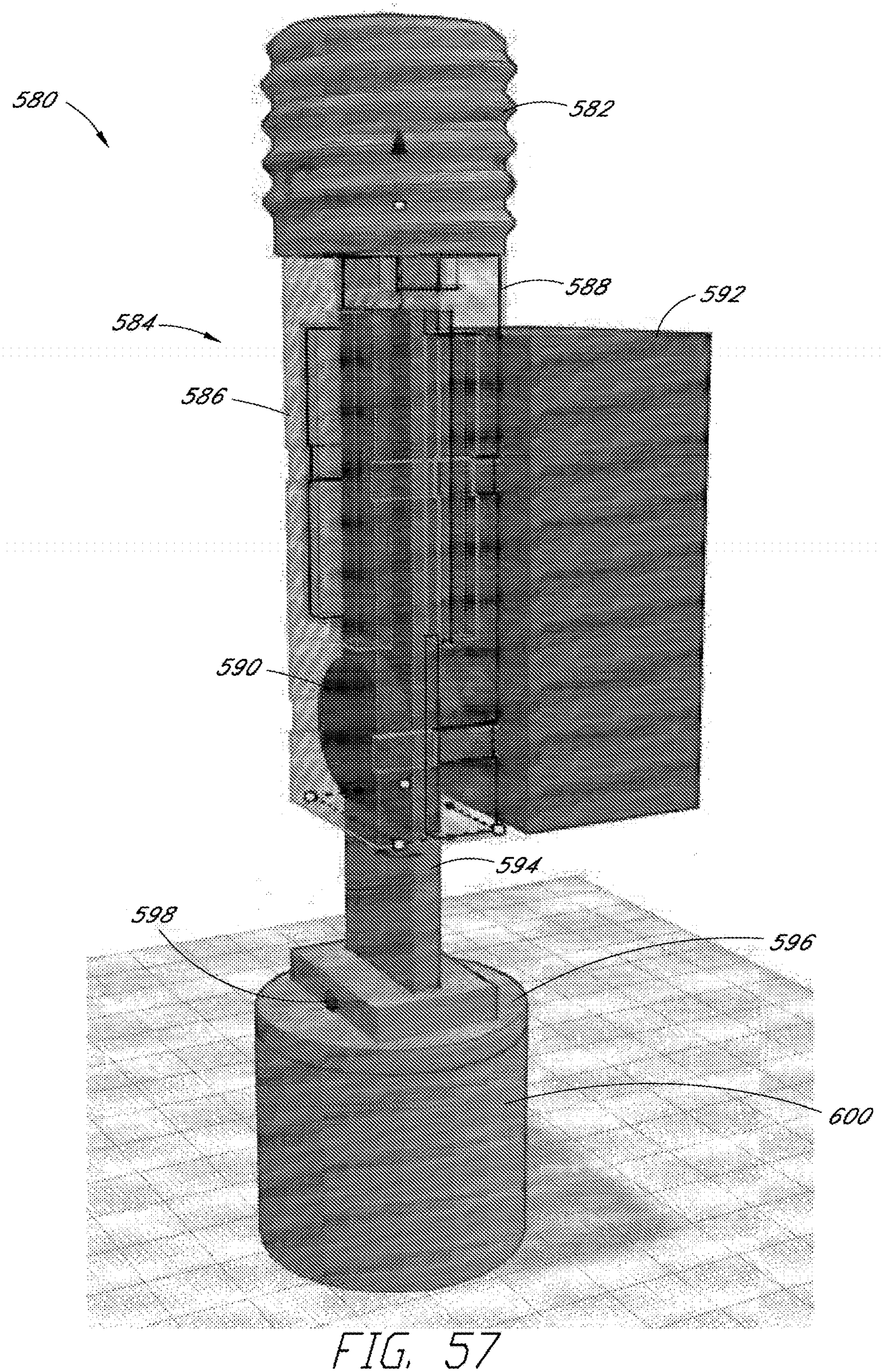
FIGS. 57-59 depict another embodiment of an electronic device mounting system.
Figure 58:
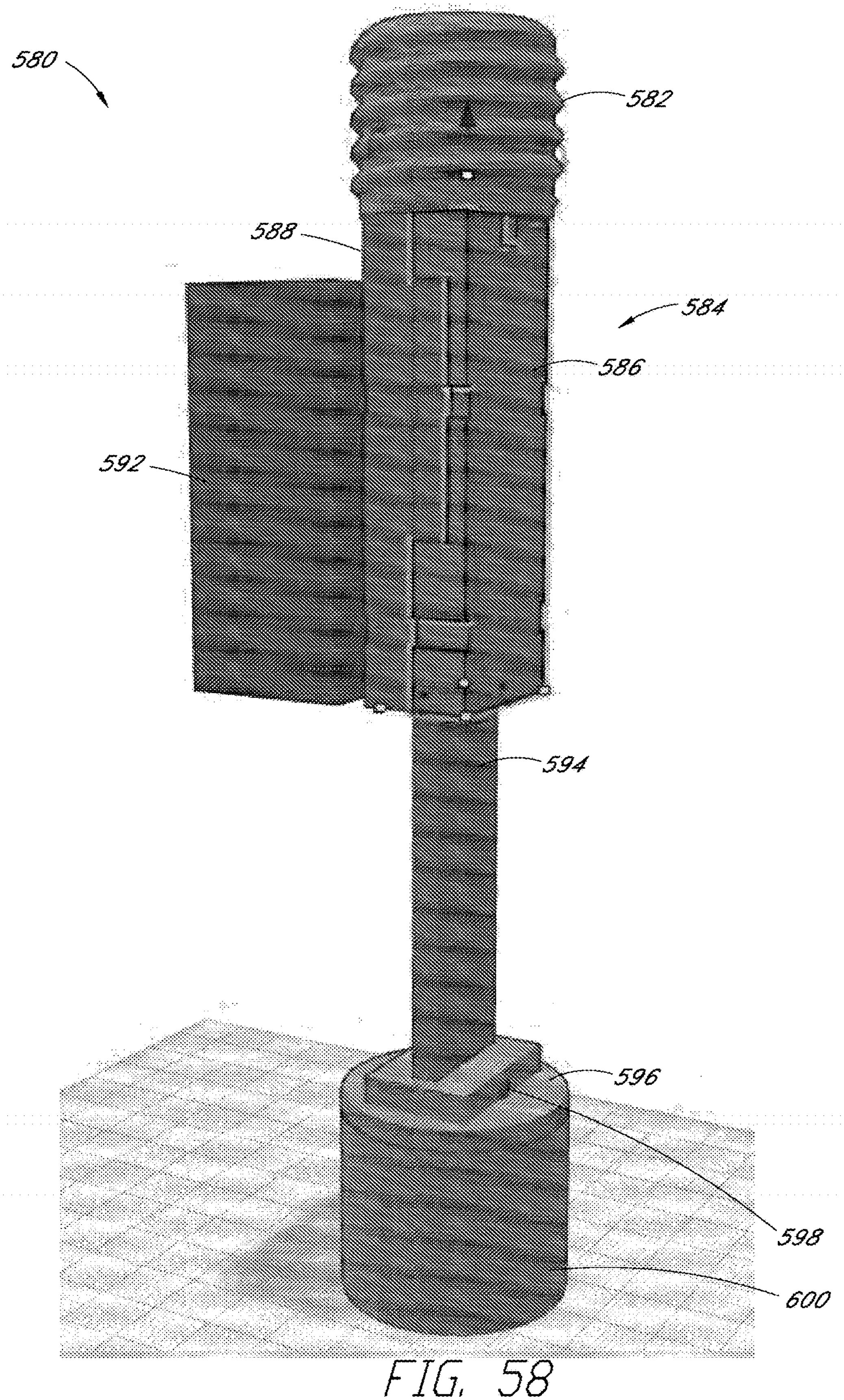
Figure 59:
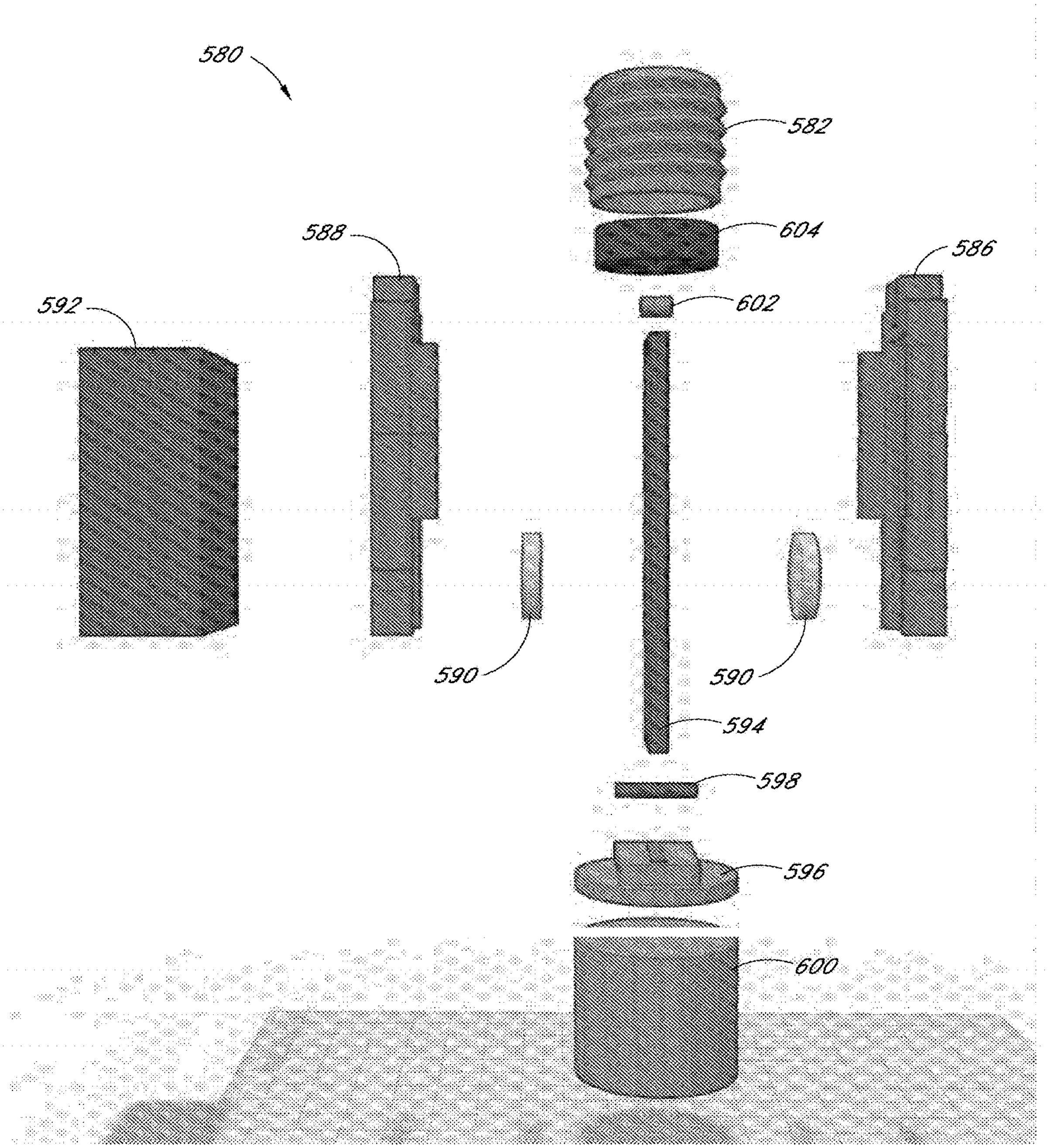

FIGS. 57-59 illustrate another embodiment of a mounting system adapted to secure an electronic device to a light fixture. The electronic device can include any of the electronic devices described above. The mounting system 580 includes an electrical connector 582, a housing 584, at least one magnet assembly 590, an arm 594, and an attachment mechanism 600. The housing 584 includes first housing portion 586 and a second housing portion 588.

The electrical connector 582 can include a male light fixture screw, clip or mount. The electrical connector 582 is adapted to be attached to a light fixture, such as a can light fixture. A housing 584 is attached to the electrical connector 582. Wires from the electrical connector (not shown) can extend through an inner lumen, or through a channel formed in the inside and/or outside wall of the housing 584. The wires may be attached to an electronic device (not shown)

mounted to the mounting system 580, such as at the attachment mechanism 600 or at an electronics housing 592.

An arm 594 is positioned within a channel of the housing 584. The arm 594 is able to slide within the channel between an extended configuration and a collapsed configuration. A stop (e.g., positioned at the top of the arm 594), such as a pin, flange, or other mechanical component, prevents the arm 594 from sliding downward past the bottom end portion of the housing 584.

One or more magnet assemblies 590 are positioned within an opening of the housing 584. In one embodiment, a first magnet assembly 590 is positioned within a cavity of the first housing portion 586. One face of the magnet assembly 590 contacts the first housing portion 586 and a second, opposite and parallel face of the magnet contacts a first side of the arm 594. Similarly, a second magnet assembly 590 is positioned within a cavity of the second housing portion 588. One face of the magnet assembly 590 contacts the second housing portion 588 and a second, opposite and parallel face of the magnet contacts a second, opposite side of the arm 594.

The magnet assembly 590 includes a magnet and optionally an additional friction material. The magnet can be any of the magnets described above. In addition, the magnet may include an encapsulation, partial covering, or other friction material to increase friction forces between the magnet assembly 590 and the arm 594. The magnet assembly 590 is magnetically attracted to the metallic material of the arm 594. The attractive force causes the arm 594 to slide against the magnet assembly 590 as the mounting system 580 is adjusted between its collapsed and expanded configurations. In addition, the magnet assembly 590 prevents the mounting system 580 from moving to an expanded configuration once it has been adjusted to a desired length.

An attachment mechanism 600 is attached to the lower portion of the arm 594 with a pin 598. In one embodiment, the attachment mechanism 600 includes a mount 596 coupled to an electrical connector. The electrical connector can include a female light socket (see FIGS. 57-59). An electronic device (not shown) can be attached to the attachment mechanism 600 at the electrical connector or mount 596.

One or more electronic components (not shown) be supported by the mounting system 580, as well. The electronic components (e.g., drivers, or other electronics used to operate, control, power, etc. the electronic device) may be positioned within an electronics housing 592. The electronics housing 592 is sized to fit within the inside space of the housing of a light fixture, or can (as discussed above).

In one embodiment, the electronic connector 582 is attached to the housing 584 using a fastening ring 604. A pin 602 positioned within an upper portion of the arm 594 acts as a stop, and prevents the arm 594 from being fully withdrawn out of the housing 584.

In one embodiment, to operate the mounting system, an electronic device (not shown) is attached to the attachment mechanism 600. The mounting system 580 is then adjusted to its expanded configuration. The mounting system 580 is then inserted into and attached to a light fixture. If the light fixture is a ceiling-mounted light fixture, three is applied to the attachment mechanism to move the electronic device towards the ceiling until either the electronic device contacts the ceiling, or until the arm has traveled its length through the housing 584 channel. The magnetic and friction forces between the one or more magnets assemblies 590 against the arm 594 keep the electronic device in place once adjusted to the desired location.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments disclosed.

What is claimed is:

1. A mounting system for a light fixture, the mounting system comprising:
- a top hub;
- an electrical connector coupled to the top hub;
- an upper mounting arm coupled to the top hub;
- a central hub coupled to the upper mounting arm;
- a magnet positioned within the central hub;
- a lower mounting arm coupled to the central hub; and
- a bottom hub coupled to the lower mounting arm, the bottom hub configured to receive and secure an electronic device,
- wherein the lower mounting arm is configured to slide through the central hub to adjust the mounting system from an extended configuration to a collapsed configuration to mount the mounting system to the light fixture, and
- wherein the magnet is positioned within the central hub to apply magnetic force to at least one of the upper mounting arm or the lower mounting arm, to control movement of the lower mounting arm through the central hub.

2. The mounting system of claim 1, wherein the electrical connector comprises a male light bulb socket.

3. The mounting system of claim 1, wherein the central hub comprises a housing cavity, and wherein the magnet is positioned within the housing cavity.

4. The mounting system of claim 1, wherein the housing cavity further comprises first and second mounting arm slots, wherein the upper mounting arm is secured to the first mounting arm slot, and wherein the lower mounting arm is positioned such that it can slide through the second mounting arm slot.

5. The mounting system of claim 1, wherein the magnet comprises a cylindrical shape having first and second opposite, parallel, planar faces, and wherein the magnet is positioned within the central hub such that the first planar face is parallel to a planar surface of the lower mounting arm.

6. The mounting system of claim 1, wherein the magnet is positioned between the upper mounting arm and the lower mounting arm.

7. The mounting system of claim 1, wherein the magnet comprises one or more of a neodymium magnet or a printed poly-magnet.

8. The mounting system of claim 1, wherein the magnet comprises one or more of a friction layer, a rubber material, a silicone material, a plastic material, a polymer coating, or an encapsulation.

9. The mounting system of claim 1, wherein the electronic device comprises at least one of a light, an LED panel light, a microphone, a speaker, an audio component, a light fixture, a motor, a pump, a fan, a thermostat, a radio, a wireless transmitter, a wireless receiver, a Bluetooth device, a communications hub, a phone, a router, a switch, or a display.

10. The mounting system of claim 1, wherein a space defined by the top hub, the upper arm, and the central hub, is configured to hold an electronic circuit.

11. The mounting system of claim 10, wherein the electronic circuit is a light emitting diode (LED) driver.

12. A method for a light fixture, the method comprising the steps of:

providing a mounting system comprising:

a top hub;

an electrical connector coupled to the top hub;

an upper mounting arm coupled to the top hub;

a central hub coupled to the upper mounting arm;

a lower mounting arm coupled to the central hub, wherein the lower mounting arm is configured to slide through the central hub to adjust the mounting system from an extended configuration to a collapsed configuration;

a bottom hub coupled to the lower mounting arm, the bottom hub configured to receive and secure an electronic device; and a magnet positioned within the central hub, wherein the magnet is configured to apply a magnetic force to at least one of the upper mounting arm or the lower mounting arm to control movement of the lower mounting arm through the central hub;

securing the electronic device to the bottom hub; and coupling the electrical connector to the light fixture.

13. The method of claim 12, wherein the electrical connector comprises a male light bulb socket.

14. The method of claim 12, wherein a space defined by the top hub, the upper arm, and the central hub, is configured to hold an electronic circuit.

15. The method of claim 12, wherein the central hub comprises a housing cavity, and wherein the magnet is positioned within the housing cavity.

16. The method of claim 12, wherein the housing cavity further comprises first and second mounting arm slots, wherein the upper mounting arm is secured to the first mounting arm slot, and wherein the lower mounting arm is positioned such that it can slide through the second mounting arm slot.

17. The method of claim 12, wherein the magnet comprises a cylindrical shape having first and second opposite, parallel, planar faces, and wherein the magnet is positioned within the central hub such that the first planar face is parallel to a planar surface of the lower mounting arm.

18. The method of claim 12, wherein the magnet is positioned between the upper mounting arm and the lower mounting arm.

19. The method of claim 12, wherein the magnet comprises one or more of a friction layer, a rubber coating, a polymer coating, or an encapsulation.

20. The method of claim 12, wherein the electronic device comprises at least one of a light, an LED panel light, a microphone, a speaker, an audio component, a light fixture, a motor, a pump, a fan, a thermostat, a radio, a wireless transmitter, a wireless receiver, a Bluetooth device, a communications hub, a phone, a router, a switch, or a display.

* * * * *